United States Patent
Schnabl et al.

(10) Patent No.: US 9,858,588 B2
(45) Date of Patent: Jan. 2, 2018

(54) METHODS AND SYSTEMS FOR DISPLAYING ATTRIBUTION CREDIT DATA BASED ON PARAMETERS

(71) Applicant: Google Inc., Mountain View, CA (US)

(72) Inventors: Stefan Schnabl, San Francisco, CA (US); John Chih Chang Huang, Sunnyvale, CA (US); Hongxu Cai, Mountain View, CA (US); William Patrick Kee, San Francisco, CA (US); Bozhena Bidyuk, Huntington Beach, CA (US); Chao Cai, Santa Clara, CA (US); Xiaosa Zhao, Mountain View, CA (US); James Edward Stewart, Saratogo, CA (US); Richard Edward Little, Irvine, CA (US); Todd Morris Jackson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 162 days.

(21) Appl. No.: 14/264,666

(22) Filed: Apr. 29, 2014

(65) Prior Publication Data
US 2015/0161652 A1 Jun. 11, 2015

Related U.S. Application Data

(60) Provisional application No. 61/912,356, filed on Dec. 5, 2013.

(51) Int. Cl.
*G06Q 30/02* (2012.01)
(52) U.S. Cl.
CPC ..... *G06Q 30/0242* (2013.01); *G06Q 30/0243* (2013.01); *G06Q 30/0246* (2013.01)
(58) Field of Classification Search
CPC ............ G06Q 30/0242–30/243; G06Q 30/246
(Continued)

(56) References Cited

U.S. PATENT DOCUMENTS 7,792,598 B2    9/2010    Khosla et al.
8,473,343 B2    6/2013    Chalimadugu et al.
(Continued)

FOREIGN PATENT DOCUMENTS

KR    1020090000221    1/2009
WO    WO-2013/116105 A1    8/2013

OTHER PUBLICATIONS

Cognition—From Memory to Creativity, Weisberg, Reeves, 2013, John Wiley & Sons, pp. 13-40, 519-527.*
(Continued)

*Primary Examiner* — David Stoltenberg
*Assistant Examiner* — Michael Ezewoko
(74) *Attorney, Agent, or Firm* — Foley & Lardner LLP; John D. Lanza

(57) ABSTRACT

Methods and systems for providing for display attribution data associated with one or more events are disclosed. Processor identifies channels from paths including events corresponding to position data identifying a position along the path at which the event was performed. Processor determines attribution credits assigned to each event included in the paths corresponding to the channel. Processor determines a number of attribution credits assigned to the channel. Processor identifies, from the paths, a plurality of event-position pairs. Each event-position pair corresponds to events that correspond to a respective channel and are performed at a respective position of the plurality of paths corresponding to the event-position pair. Processor determines, for each identified event-position pair, a weighting based on an aggregate of the attribution credits assigned to the events to which the event-position pair corresponds. Processor provides, for display, a visual object including an indicator to display the determined weightings.

20 Claims, 15 Drawing Sheets

(58) Field of Classification Search
USPC ..................................................... 705/14.45
See application file for complete search history.

(56) References Cited

U.S. PATENT DOCUMENTS

| | | | |
|---|---|---|---|
| 8,510,326 B2 | 8/2013 | Hsiao et al. | |
| 8,628,927 B2* | 1/2014 | Faham | C12Q 1/6883 435/6.12 |
| 8,788,339 B2 | 7/2014 | Hughes et al. | |
| 2005/0071218 A1 | 3/2005 | Lin et al. | |
| 2006/0247973 A1* | 11/2006 | Mueller | G06N 3/126 705/14.14 |
| 2009/0106081 A1 | 4/2009 | Burgess et al. | |
| 2010/0198680 A1 | 8/2010 | Ma et al. | |
| 2011/0071900 A1 | 3/2011 | Kamath et al. | |
| 2011/0231239 A1 | 9/2011 | Burt et al. | |
| 2011/0307515 A1 | 12/2011 | Chen et al. | |
| 2012/0259854 A1* | 10/2012 | Hsiao | G06Q 30/0251 707/739 |
| 2012/0303447 A1* | 11/2012 | Hughes | G06Q 30/0255 705/14.46 |
| 2013/0030908 A1 | 1/2013 | Gessner et al. | |
| 2013/0035975 A1 | 2/2013 | Cavander et al. | |
| 2013/0066706 A1 | 3/2013 | Wu et al. | |
| 2013/0066711 A1 | 3/2013 | Liyanage et al. | |
| 2013/0138503 A1 | 5/2013 | Brown et al. | |
| 2013/0332264 A1 | 12/2013 | Chittilappilly et al. | |
| 2014/0068407 A1 | 3/2014 | Suh et al. | |
| 2015/0039418 A1 | 2/2015 | Baluja et al. | |

OTHER PUBLICATIONS

Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*
Creativity and Artificial Intelligence, Francisco Camara Pereira, Mouton de Gruyter, 2007, pp. 51-62.*
Computational Intelligence and Pattern Analysis in Biological Informatics, Maulik, Wiley, 2010, pp. 337.*
Pathway Modeling and Algorithm Research, Mastorakis, Nova Science Publishers, 2011, pp. 94.*
Predicting Online Purchase Conversion Using Web Path Analysis, Montgomery et al, 2002, pp. 1-53.*
Statistical Principles and Techniques in Scientific and Social Research, Krzanowski, Oxford University Press, 2007, pp. 206.*
Advanced Artificial Intelligence, Shi, World Scientific, 2011, pp. 430-458.*
Data Mining, Elsevier, Han and Kamber, 2006, pp. 234-274.*
International Search Report & Written Opinion on PCT/US2014/067295 dated Jul. 29, 2015.
Ron Berman, Beyond the Last Touch: Attribution in Online Advertising Preliminary Version, Sep. 20, 2013 pp. 1-44.
Dalessandro et al., Causally Motivated Attribution For Online Advertising, Aug. 2012, Provost pp. 1-9.
Shao, Xuhui et al., Data-driven Multi-touch Attribution Models, Aug. 2011, pp. 1-7.
Avinash Kaushik, Multi-Channel Attribution Modeling The Good Bad and Ugly Models Occams Razor Occam's Razor pp. 1-34, search on Nov. 25, 2013.
U.S. Appl. No. 14/103,453, dated Dec. 11, 2013.
U.S. Appl. No. 14/103,440, dated Dec. 11, 2013.
U.S. Appl. No. 14/103,487, dated Dec. 11, 2013.
U.S. Appl. No. 14/103,589, dated Dec. 11, 2013.
Office Action on U.S. Appl. No. 14/103,487, dated Jan. 15, 2016.
Office Action on U.S. Appl. No. 14/103,440, Nov. 6, 2015.
Office Action on U.S. Appl. No. 14/103,589, dated Oct. 22, 2015.
International Preliminary Report on Patentability on PCT/US2014/067295 dated Jun. 16, 2016.
Office Action on U.S. Appl. No. 14/103,487, dated Apr. 21, 2016.
Office Action on U.S. Appl. No. 14/103,589, dated Apr. 27, 2016.
Computing the Mind, Shimon Edelman, Oxford University Press, 2008, pp. 26-31.
Examiner's Report on Canadian Patent Application No. 2,932,686 dated Mar. 27, 2017.
Language and Mind, Chomsky, Oxford University Press, 2005, p. 62.
Mental Spaces, Gilles Fauconnier, Cambridge University Press, 1998, pp. xxvii-xxix.
Microsoft Computer Dictionary, Fifth Edition, 2002, Microsoft Press, p. 23.
Mind—A Brief Introduction, John R. Searle, 2004, Oxford University Press, pp. 62-67.
Robotics, Science and Systems III, Wolfram Burgard, Oliver Brock, and Cyrill Stachniss, The MIT Press, 2008, pp. 41-48.
U.S. Office Action on U.S. Appl. No. 14/103,440, dated Feb. 10, 2017.
U.S. Office Action on U.S. Appl. No. 14/103,453, dated Apr. 21, 2017.
U.S. Office Action on U.S. Appl. No. 14/103,487, dated Feb. 27, 2017.
U.S. Office Action on U.S. Appl. No. 14/103,589, dated Feb. 28, 2017.
What is Thought, Eric Baum, The MIT Press, 2004, pp. 33-65.
European Extended Search Report on Application No. PCT/US2014/067295 dated May 23, 2017.
U.S. Office Action on U.S. Appl. No. 14/103,440 dated Jun. 5, 2017.
U.S. Office Action on U.S. Appl. No. 14/103,487 dated Jun. 21, 2017.
U.S. Office Action on U.S. Appl. No. 14/103,589 dated Jun. 16, 2017.
Notice of Reasons for Rejection on Application No. JP 2016-536682 dated Jul. 24, 2017.
U.S. Notice of Allowance on U.S. Appl. No. 14/103,440 dated Aug. 29, 2017.
U.S. Notice of Allowance on U.S. Appl. No. 14/103,453 dated Sep. 8, 2017.
U.S. Notice of Allowance on U.S. Appl. No. 14/103,487 dated Oct. 2, 2017.
U.S. Notice of Allowance on U.S. Appl. No. 14/103,487 dated Sep. 8, 2017.
U.S. Notice of Allowance on U.S. Appl. No. 14/103,589 dated Sep. 8, 2017.

* cited by examiner

METHODS AND SYSTEMS FOR DISPLAYING ATTRIBUTION CREDIT DATA BASED ON PARAMETERS

RELATED APPLICATION

The present application claims benefit and priority to U.S. Provisional Application No. 61/912,356, entitled "Methods and Systems for Creating a Data-Driven Attribution Model for Assigning Attribution Credit to a Plurality of Events" and filed on Dec. 5, 2013, which is incorporated herein by reference in its entirety for all purposes.

BACKGROUND

An online user today is exposed to a plethora of media exposures, such as banner ads, email ads, display ads, organic and paid search results, amongst others. These media exposures can be configured to direct a user to a particular website. When the online user performs a converting act, such as making an online purchase, advertisers would like to know which of the various media exposures the user was exposed to were responsible for the user's converting act. Historically, the media exposure the user was last exposed to would get all of the credit for the conversion, while all other media exposures that the user was exposed to would get none. This attribution model is referred to as last click attribution.

SUMMARY

Methods, apparatuses, and systems for creating an attribution model that assigns attribution credit to not only the last media exposure the user was exposed to prior to a converting act, but to other media exposures that were partly responsible for the occurrence of the converting act are described herein. In particular, the attribution model described herein relies on visit related data of visits to a website, including but not limited to conversion probabilities of paths taken by the visitors visiting the website. As such, the present disclosure relates to a data-driven attribution model for assigning attribution credit to various media exposures associated with paths and a conversion probability determination engine that is configured to determine the likelihood of a path converting.

According to one aspect, a method for creating a data-driven attribution model, includes, identifying by a processor, for a given time period, a plurality of visits to a particular website. The processor then identifies, for each visitor identifier associated with the identified plurality of visits, a path associated with the visitor identifier. The path including at least one event that has a corresponding index position indicating a position of the event relative to positions of other events included in the path. The processor then determines, for each path type associated with the identified paths, a path-type conversion probability based on a number of visits corresponding to the path type that resulted in a conversion. The processor then calculates, for each of a plurality of the path types associated with the identified paths, a counterfactual gain for each event based on a conversion probability of the given path type and a conversion probability of a path type that does not include the event for which the counterfactual gain is calculated. The processor determines, for each event of each of the plurality of path types, an attribution credit based on the calculated counterfactual gain of the event. The processor then stores, for each of a plurality of the path types associated with the identified paths, the determined attribution credit for each event included in the path type.

In some implementations, the processor can identify a plurality of visits to a particular website by identifying the plurality of visits from a database storing entries including visit related information associated with the plurality of visits. In some implementations, each entry includes a visitor identifier identifying a visitor device associated with the visit, a conversion indication indicating whether or not a conversion occurred during the visit, or a media exposure corresponding to an event through which the visit to the website occurred. In some implementations, the processor can create, for each of the path types, a rule for assigning attribution credit.

In some implementations, the processor can determine that a calculated counterfactual gain for a given event is less than zero and store an attribution credit of zero for the given event responsive to determining that the calculated counterfactual gain for the given event is less than zero.

In some implementations, the processor can calculate, for a given path type, a counterfactual gain for a given event of the given path type by identifying, for the given path type, a first ordered sequence of events preceding the given event and a second ordered sequence of events subsequent to the given event. The processor can then identify, from path types associated with the identified paths, a comparison path type that includes the first ordered sequence of events immediately followed by the second ordered sequence of events. The processor then calculates, for the given event, the difference between a conversion probability of the given path type and a conversion probability of the comparison path type.

In some implementations, the processor can determine, for each event of each of the plurality of path types, an attribution credit based on the calculated counterfactual gain of the event by determining a ratio of a counterfactual gain for a given event to a sum of counterfactual gains for each of the events included in the path type to which the given event belongs.

In some implementations, the event includes one of a visitor visiting the website through one of a banner content item, an organic search result content item, a paid search result content item, an email content item, a direct visit or a social network referral.

According to another aspect, a system for creating a data-driven attribution model includes a data processing system having a data-driven attribution model creation module. The data processing system further includes a memory storing processor-executable instructions and a processor configured to execute the processor-executable instructions. The processor is configured to identify, for a given time period, a plurality of visits to a particular website. The processor is configured to identify, for each visitor identifier associated with the identified plurality of visits, a path associated with the visitor identifier. The path including at least one event that has a corresponding index position indicating a position of the event relative to positions of other events included in the path. The processor is configured to determine, for each path type associated with the identified paths, a path-type conversion probability based on a number of visits corresponding to the path type that resulted in a conversion. The processor is configured to calculate, for each of a plurality of the path types associated with the identified paths, a counterfactual gain for each event based on a conversion probability of the given path type and a conversion probability of a path type that does not include the event for which the counterfactual gain is calculated. The processor is configured to determine, for each event of each of the plurality of path types, an attribution credit based on the calculated counterfactual gain of the event. The processor is also further configured to store, for each of a plurality of the path types associated with the identified paths, the determined attribution credit for each event included in the path type.

In some implementations, the processor can identify a plurality of visits to a particular website by identifying the plurality of visits from a database storing entries including visit related information associated with the plurality of visits. In some implementations, each entry includes a visitor identifier identifying a visitor device associated with the visit, a conversion indication indicating whether or not a conversion occurred during the visit, or a media exposure corresponding to an event through which the visit to the website occurred. In some implementations, the processor can create, for each of the path types, a rule for assigning attribution credit.

In some implementations, the processor can determine that a calculated counterfactual gain for a given event is less than zero and store an attribution credit of zero for the given event responsive to determining that the calculated counterfactual gain for the given event is less than zero.

In some implementations, the processor can calculate, for a given path type, a counterfactual gain for a given event of the given path type by identifying, for the given path type, a first ordered sequence of events preceding the given event and a second ordered sequence of events subsequent to the given event. The processor can then identify, from path types associated with the identified paths, a comparison path type that includes the first ordered sequence of events immediately followed by the second ordered sequence of events. The processor then calculates, for the given event, the difference between a conversion probability of the given path type and a conversion probability of the comparison path type.

In some implementations, the processor can determine, for each event of each of the plurality of path types, an attribution credit based on the calculated counterfactual gain of the event by determining a ratio of a counterfactual gain for a given event to a sum of counterfactual gains for each of the events included in the path type to which the given event belongs.

According to another aspect, a computer readable storage medium having instructions to provide information via a computer network. The instructions include instructions to identify, for a given time period, a plurality of visits to a particular website. The instructions also include instructions to identify, for each visitor identifier associated with the identified plurality of visits, a path associated with the visitor identifier. The path including at least one event that has a corresponding index position indicating a position of the event relative to positions of other events included in the path. The instructions also include instructions to determine, for each path type associated with the identified paths, a path-type conversion probability based on a number of visits corresponding to the path type that resulted in a conversion. The instructions also include instructions to calculate, for each of a plurality of the path types associated with the identified paths, a counterfactual gain for each event based on a conversion probability of the given path type and a conversion probability of a path type that does not include the event for which the counterfactual gain is calculated. The instructions also include instructions to determine, for each event of each of the plurality of path types, an attribution credit based on the calculated counterfactual gain of the event. The instructions also include instructions to store, for each of a plurality of the path types associated with the identified paths, the determined attribution credit for each event included in the path type.

In some implementations, the instructions to calculate, for a given path type, a counterfactual gain for a given event of the given path type include instructions to identify, for the given path type, a first ordered sequence of events preceding the given event and a second ordered sequence of events subsequent to the given event, instructions to identify, from path types associated with the identified paths, a comparison path type that includes the first ordered sequence of events immediately followed by the second ordered sequence of events and instructions to calculate, for the given event, the difference between a conversion probability of the given path type and a conversion probability of the comparison path type.

In some implementations, the instructions to determine, for each event of each of the plurality of path types, an attribution credit based on the calculated counterfactual gain of the event includes instructions to determine a ratio of a counterfactual gain for a given event to a sum of counterfactual gains for each of the events included in the path type to which the given event belongs.

In some implementations, the instructions to store the determined attribution credit for each event included in the path type includes instructions to create, for each of the path types, a rule for assigning attribution credit.

According to another aspect, a method for creating rules for assigning attribution credit across a plurality of events, includes identifying, by a processor, a plurality of conversions at a particular website. The processor then identifies path types associated with the identified conversions. Each of the identified path types identifying one or more events and a corresponding index position indicating an event's position relative to other events of the path. The processor then identifies a subset of the identified path types to be rewritten according to a path rewriting policy. The processor then rewrites the identified subset of the identified path types according to the path rewriting policy as rewritten path types. The processor determines, for each of the rewritten path types and remaining identified path types associated with the identified conversions, attribution credits for each event included in the path type. The processor then creates, for each of the rewritten path types and remaining identified path types associated with the identified conversions, a rule for assigning the determined attribution credit to each event of the path type for which the rule is created.

In some implementations, the processor can identify a plurality of conversions at a particular website over a given time period. In some implementations, the processor can retrieve, from a website log, visit related data associated with conversions at the website.

In some implementations, the processor can identify, for each conversion, a visitor identifier associated with the conversion. The processor can identify qualifying visits to the website prior to the conversion. The processor can identify, for each qualifying visit, an event through which the visitor visited the website. The processor then arranges events that resulted in the qualifying visits in chronological order.

In some implementations, the processor can determine that a path type is not sufficiently significant and responsive to determining that the path type is not sufficiently significant, remove the path type from the identified path types for which a rule for assigning attribution credit is created.

In some implementations, the processor can identify, for each path type, a number of conversions associated with the path type. The processor then identifies path types having a number of conversions less than a threshold. The processor then removes the identified path types that have a number of conversions that are less than the threshold.

In some implementations, the processor identifies, for each path type, a number of conversions associated with the path type. The processor identifies a threshold frequency based on a number of conversions identified and removes in ascending order of the identified number of conversions associated with the path type, one or more path types until the number of conversions removed exceeds the threshold frequency.

According to another aspect, a system for creating rules for assigning attribution credit across a plurality of events includes a data processing system having a rule creation model. The data processing system further includes a memory storing processor-executable instructions and a processor configured to execute the processor-executable instructions. The processor is configured to identify a plurality of conversions at a particular website. The processor then identifies path types associated with the identified conversions. Each of the identified path types identifying one or more events and a corresponding index position indicating an event's position relative to other events of the path. The processor then identifies a subset of the identified path types to be rewritten according to a path rewriting policy. The processor then rewrites the identified subset of the identified path types according to the path rewriting policy as rewritten path types. The processor determines, for each of the rewritten path types and remaining identified path types associated with the identified conversions, attribution credits for each event included in the path type. The processor then creates, for each of the rewritten path types and remaining identified path types associated with the identified conversions, a rule for assigning the determined attribution credit to each event of the path type for which the rule is created.

In some implementations, the processor can identify a plurality of conversions at a particular website over a given time period. In some implementations, the processor can retrieve, from a website log, visit related data associated with conversions at the website.

In some implementations, the processor can identify, for each conversion, a visitor identifier associated with the conversion. The processor can identify qualifying visits to the website prior to the conversion. The processor can identify, for each qualifying visit, an event through which the visitor visited the website. The processor then arranges events that resulted in the qualifying visits in chronological order.

In some implementations, the processor can determine that a path type is not sufficiently significant and responsive to determining that the path type is not sufficiently significant, remove the path type from the identified path types for which a rule for assigning attribution credit is created.

In some implementations, the processor can identify, for each path type, a number of conversions associated with the path type. The processor then identifies path types having a number of conversions less than a threshold. The processor then removes the identified path types that have a number of conversions that are less than the threshold.

In some implementations, the processor identifies, for each path type, a number of conversions associated with the path type. The processor identifies a threshold frequency based on a number of conversions identified and removes in ascending order of the identified number of conversions associated with the path type, one or more path types until the number of conversions removed exceeds the threshold frequency.

In some implementations, the processor can receive a request to assign attribution credit to a plurality of events of a given path type. The processor can determine that the given path type does not match any of the created rules. The processor can then assign an attribution credit to each of the plurality of events included in the identified path according to a fallback attribution model that is different from an attribution model used to assign attribution credits for events of path types for which a rule is created. In some implementations, the fallback attribution model is a last click attribution model.

In some implementations, the processor can determine, for a given path of the identified subset, that the path has a path length greater than a threshold number of events. The processor can identify, for the given path, a first number of events of the given path corresponding to a first set of events that resulted in a visit to the website. The processor can then identify, for the given path, a second number of events corresponding to a second set of events of the given path immediately preceding the conversion. The processor can also identify, as remaining events, one or more events of the given path that are not identified as the first number of events and not identified as the second number of event. The processor then can replace the remaining events of the given path with a dummy variable that is not assigned any attribution credit.

According to another aspect, a computer readable storage medium having instructions to provide information via a computer network. The instructions include instructions to identify a plurality of conversions at a particular website. The instructions include instructions to identify path types associated with the identified conversions. Each of the identified path types identifying one or more events and a corresponding index position indicating an event's position relative to other events of the path. The instructions include instructions to identify a subset of the identified path types to be rewritten according to a path rewriting policy. The instructions include instructions to rewrite the identified subset of the identified path types according to the path rewriting policy as rewritten path types. The instructions include instructions to determine, for each of the rewritten path types and remaining identified path types associated with the identified conversions, attribution credits for each event included in the path type. The instructions include instructions to create, for each of the rewritten path types and remaining identified path types associated with the identified conversions, a rule for assigning the determined attribution credit to each event of the path type for which the rule is created.

In some implementations, identifying a plurality of conversions at a particular website includes identifying a plurality of conversions at a particular website over a given time period.

In some implementations, the instructions can includes instructions to determine, for a given path of the identified subset, that the path has a path length greater than a threshold number of events. The instructions can include instructions to identify, for the given path, a first number of events of the given path corresponding to a first set of events that resulted in a visit to the website. The instructions can include instructions to identify, for the given path, a second number of events corresponding to a second set of events of the given path immediately preceding the conversion. The instructions can includes instructions to identify, as remaining events, one or more events of the given path that are not identified as the first number of events and not identified as the second number of event. The instructions can include instructions to replace the remaining events of the given path with a dummy variable that is not assigned any attribution credit.

According to one aspect, a method for measuring conversion probabilities of a plurality of path types for an attribution model includes, identifying by a processor, a plurality of paths taken by visitors to visit a particular website. One or more of the paths corresponds to a sequence of events and each event causes a visitor to visit the website. The processor can identify as paths, for each path corresponding to the sequence of events through which the visitor visits the website, one or more subpaths corresponding to each visit to the website. The processor can determine, for each of the identified paths, that the path is converting or non-converting. The processor computes a total path count for each path type. The path type identifies one or more events that have an associated indexed position indicating a position of the event relative to other events. The processor identifies, for each path type, a conversion path count indicating a number of paths taken by visitors that resulted in a conversion at the website. The processor calculates, for each path type, a probability of conversion based on the ratio of the conversion path count and the total path count corresponding to the path type. The processor then provides the calculated probability of conversion for a given path type for an attribution model used in assigning attribution credit to events of a path.

In some implementations, the processor can determine, for a first path of the identified paths, that a first visitor associated with the first path converted after a last event of the first path. The processor can identify that the first path is converting responsive to determining that the first visitor converted after the last event of the first path. The processor can determine, for a second path of the identified paths, that a second visitor associated with a second path did not convert after a last event of the second path and identify that the second path is non-converting responsive to determining that the second visitor did not convert after the last event of the second path.

In some implementations, the event includes one of a visitor visiting the website through one of a banner content item, an organic search result content item, a paid search result content item, an email content item, a direct visit or a social network referral.

In some implementations, the processor identifies a visit to the website by a visitor having an associated visitor identifier. The visitor visits the website via a first event. The processor then determines a time of a last visit to the website by the visitor and determines that the determined time exceeds a threshold time. The processor then identifies that the first event is not part of a path corresponding to the last visit to the website in response to determining that the determined time exceeds the threshold time.

In some implementations, the processor can store in a data structure, for each visit to the website, a visitor identifier unique to the visitor, information associated with an event through which the visitor arrived at the website and a time at which the visitor arrived at the website and a conversion indicator indicating whether the visitor converted during the visit. In some implementations, the processor can store in the data structure, for each visit to the website, a path of the visitor. The path corresponds to one or more events through which the visitor previously arrived at the website.

In some implementations, the processor can identify paths having a path length greater than a threshold number of events. The processor can then rewrite the identified paths having a path length greater than a threshold number of events such that the rewritten paths have a new path length that is not greater than the threshold number of events and wherein the rewritten paths includes a single dummy variable equivalent to one or more events. The processor then identifies the rewritten identified paths as belonging to a particular path type.

According to another aspect, a system for measuring conversion probabilities of a plurality of path types for an attribution model includes a data processing system having a conversion probability determination module. The data processing system further includes a memory storing processor-executable instructions and a processor configured to execute the processor-executable instructions. The processor is configured to identify a plurality of paths taken by visitors to visit a particular website. One or more of the paths corresponds to a sequence of events and each event causes a visitor to visit the website. The processor can identify as paths, for each path corresponding to the sequence of events through which the visitor visits the website, one or more subpaths corresponding to each visit to the website. The processor can determine, for each of the identified paths, that the path is converting or non-converting. The processor computes a total path count for each path type. The path type identifies one or more events that have an associated indexed position indicating a position of the event relative to other events. The processor identifies, for each path type, a conversion path count indicating a number of paths taken by visitors that resulted in a conversion at the website. The processor calculates, for each path type, a probability of conversion based on the ratio of the conversion path count and the total path count corresponding to the path type. The processor then provides the calculated probability of conversion for a given path type for an attribution model used in assigning attribution credit to events of a path.

In some implementations, the processor can determine, for a first path of the identified paths, that a first visitor associated with the first path converted after a last event of the first path. The processor can identify that the first path is converting responsive to determining that the first visitor converted after the last event of the first path. The processor can determine, for a second path of the identified paths, that a second visitor associated with a second path did not convert after a last event of the second path and identify that the second path is non-converting responsive to determining that the second visitor did not convert after the last event of the second path.

In some implementations, the event includes one of a visitor visiting the website through one of a banner content item, an organic search result content item, a paid search result content item, an email content item, a direct visit or a social network referral.

In some implementations, the processor identifies a visit to the website by a visitor having an associated visitor identifier. The visitor visits the website via a first event. The processor then determines a time of a last visit to the website by the visitor and determines that the determined time exceeds a threshold time. The processor then identifies that the first event is not part of a path corresponding to the last visit to the website in response to determining that the determined time exceeds the threshold time.

In some implementations, the processor can store in a data structure, for each visit to the website, a visitor identifier unique to the visitor, information associated with an event through which the visitor arrived at the website and a time at which the visitor arrived at the website and a conversion indicator indicating whether the visitor converted during the visit. In some implementations, the processor can store in the data structure, for each visit to the website, a path of the visitor. The path corresponds to one or more events through which the visitor previously arrived at the website.

In some implementations, the processor can identify paths having a path length greater than a threshold number of events. The processor can then rewrite the identified paths having a path length greater than a threshold number of events such that the rewritten paths have a new path length that is not greater than the threshold number of events and wherein the rewritten paths includes a single dummy variable equivalent to one or more events. The processor then identifies the rewritten identified paths as belonging to a particular path type.

According to another aspect, a computer readable storage medium having instructions to provide information via a computer network. The instructions include instructions to identify a plurality of paths taken by visitors to visit a particular website. One or more of the paths corresponds to a sequence of events and each event causes a visitor to visit the website. The instructions include instructions to identify as paths, for each path corresponding to the sequence of events through which the visitor visits the website, one or more subpaths corresponding to each visit to the website. The instructions include instructions to determine, for each of the identified paths, that the path is converting or non-converting. The instructions include instructions to compute a total path count for each path type. The path type identifies one or more events that have an associated indexed position indicating a position of the event relative to other events. The instructions include instructions to identify, for each path type, a conversion path count indicating a number of paths taken by visitors that resulted in a conversion at the website. The instructions include instructions to calculate, for each path type, a probability of conversion based on the ratio of the conversion path count and the total path count corresponding to the path type. The instructions include instructions to provide the calculated probability of conversion for a given path type for an attribution model used in assigning attribution credit to events of a path.

In some implementations, the instructions include instructions to determine, for a first path of the identified paths, that a first visitor associated with the first path converted after a last event of the first path. The instructions include instructions to identify that the first path is converting responsive to determining that the first visitor converted after the last event of the first path. The instructions include instructions to determine, for a second path of the identified paths, that a second visitor associated with a second path did not convert after a last event of the second path and identify that the second path is non-converting responsive to determining that the second visitor did not convert after the last event of the second path.

In some implementations, the event includes one of a visitor visiting the website through one of a banner content item, an organic search result content item, a paid search result content item, an email content item, a direct visit or a social network referral.

In some implementations, the instructions include instructions to identify a visit to the website by a visitor having an associated visitor identifier. The visitor visits the website via a first event. The instructions include instructions to determine a time of a last visit to the website by the visitor and to determine that the determined time exceeds a threshold time. The instructions include instructions to identify that the first event is not part of a path corresponding to the last visit to the website in response to determining that the determined time exceeds the threshold time.

In some implementations, the instructions include instructions to store in a data structure, for each visit to the website, a visitor identifier unique to the visitor, information associated with an event through which the visitor arrived at the website and a time at which the visitor arrived at the website and a conversion indicator indicating whether the visitor converted during the visit. In some implementations, the instructions include instructions to store in the data structure, for each visit to the website, a path of the visitor. The path corresponds to one or more events through which the visitor previously arrived at the website.

In some implementations, the instructions include instructions to identify paths having a path length greater than a threshold number of events. The instructions include instructions to rewrite the identified paths having a path length greater than a threshold number of events such that the rewritten paths have a new path length that is not greater than the threshold number of events and wherein the rewritten paths includes a single dummy variable equivalent to one or more events. The instructions include instructions to identify the rewritten identified paths as belonging to a particular path type.

According to one aspect, a method for selecting content for display at a device includes, identifying by a processor, a visitor identifier associated with a device on which to display content. The processor can identify a path associated with the visitor identifier. The path corresponding to a sequence of one or more events through which the visitor identifier has visited the website. The processor can identify a conversion probability of the identified path. The conversion probability of the identified path indicates a likelihood that the visitor identifier will convert at the website. The conversion probability of the identified path is a ratio of a number of conversions at the website to a number of visits to the website over a given time period. The processor can select content for display. The content selected based on the identified conversion probability of the identified path.

In some implementations, the processor can identify a visitor identifier in response to receiving a request to provide content, the request identifying the visitor identifier. In some implementations, the processor can retrieve the path of the visitor identifier from a website log storing visit related information relating to visits to the website.

In some implementations, the processor can determine a path associated with the visitor identifier. The path is determined by identifying one or more previous visits of the visitor identifier to the website and arranging the previous visits in chronological order starting with the earliest visit.

In some implementations, the processor can retrieve the conversion probability from a data store. The data store stores conversion probabilities associated with a plurality of identified paths.

In some implementations, the processor can determine a conversion probability of a possible path that can be associated with the visitor identifier, the possible path including one or more additional events subsequent to the sequence of events of the identified path. The processor can select content based on the conversion probability of the possible path in response to determining a conversion probability of the possible path.

In some implementations, the event includes one of a visitor associated with the visitor identifier visiting the website through one of a banner content item, an organic search result content item, a paid search result content item, an email content item, a direct visit or a social network referral.

According to another aspect, a system for selecting content for display at a device includes a data processing system having a content selection module. The data processing system further includes a memory storing processor-executable instructions and a processor configured to execute the processor-executable instructions. The processor can identify a visitor identifier associated with a device on which to display content. The processor can identify a path associated with the visitor identifier. The path corresponding to a sequence of one or more events through which the visitor identifier has visited the website. The processor can identify a conversion probability of the identified path. The conversion probability of the identified path indicates a likelihood that the visitor identifier will convert at the website. The conversion probability of the identified path is a ratio of a number of conversions at the website to a number of visits to the website over a given time period. The processor can select content for display. The content selected based on the identified conversion probability of the identified path.

In some implementations, the processor can identify a visitor identifier in response to receiving a request to provide content, the request identifying the visitor identifier. In some implementations, the processor can retrieve the path of the visitor identifier from a website log storing visit related information relating to visits to the website.

In some implementations, the processor can determine a path associated with the visitor identifier. The path is determined by identifying one or more previous visits of the visitor identifier to the website and arranging the previous visits in chronological order starting with the earliest visit.

In some implementations, the processor can retrieve the conversion probability from a data store. The data store stores conversion probabilities associated with a plurality of identified paths.

In some implementations, the processor can determine a conversion probability of a possible path that can be associated with the visitor identifier, the possible path including one or more additional events subsequent to the sequence of events of the identified path. The processor can select content based on the conversion probability of the possible path in response to determining a conversion probability of the possible path.

According to another aspect, a computer readable storage medium having instructions to provide information via a computer network. The instructions include instructions to identify a visitor identifier associated with a device on which to display content. The instructions include instructions to identify a path associated with the visitor identifier. The path corresponding to a sequence of one or more events through which the visitor identifier has visited the website. The instructions include instructions to identify a conversion probability of the identified path. The conversion probability of the identified path indicates a likelihood that the visitor identifier will convert at the website. The conversion probability of the identified path is a ratio of a number of conversions at the website to a number of visits to the website over a given time period. The instructions include instructions to select content for display. The content selected based on the identified conversion probability of the identified path.

In some implementations, the instructions include instructions to identify a visitor identifier in response to receiving a request to provide content, the request identifying the visitor identifier. In some implementations, the instructions include instructions to retrieve the path of the visitor identifier from a website log storing visit related information relating to visits to the website.

In some implementations, the instructions include instructions to determine a path associated with the visitor identifier. The path is determined by identifying one or more previous visits of the visitor identifier to the website and arranging the previous visits in chronological order starting with the earliest visit.

In some implementations, the instructions include instructions to retrieve the conversion probability from a data store. The data store stores conversion probabilities associated with a plurality of identified paths.

In some implementations, the instructions include instructions to determine a conversion probability of a possible path that can be associated with the visitor identifier, the possible path including one or more additional events subsequent to the sequence of events of the identified path. The instructions include instructions to select content based on the conversion probability of the possible path in response to determining a conversion probability of the possible path.

According to one aspect, a method for providing, for display, attribution data associated with one or more events. A processor identifies a plurality of paths. Each of the plurality of paths including one or more events. Each event corresponds to a channel of a plurality of channels and to parameter data corresponding to one or more parameters associated with the event. The processor identifies, from the plurality of paths, one or more channels for which attribution credits are to be determined. The processor determines using an attribution model, for each of the channels, attribution credits assigned to each event included in the plurality of paths corresponding to the channel and a total number of attribution credits assigned to the channel. The processor identifies, from the plurality of paths, a plurality of event-parameter pairs. Each event-parameter pair corresponds to a respective channel of the identified channels and to the one or more parameters associated with the event. The processor determines, for each identified event-parameter pair, a weighting based on an aggregate of the attribution credits assigned to the events to which the event-parameter pair corresponds. The processor then provides, for display, a visual object including an indicator corresponding to the determined weighting for at least one of the event-parameter pairs.

In some implementations, providing, for display, the visual object includes providing, for display, the visual object including the total number of attribution credits assigned to the channel corresponding to the indicator. In some implementations, determining, for each of the channels, attribution credits assigned to each event included in the plurality of paths corresponding to the channel includes identifying, from the plurality of paths, candidate paths in which at least one event corresponds to the channel, and determining, for each of the candidate paths, an attribution credit assigned to each event of the path based on counterfactual gains.

In some implementations, the parameter data of each of the events identifies a position along a path at which the event is performed and wherein each event-parameter pair includes an event-position pair that corresponds to a position along the path at which the event was performed.

In some implementations, providing the visual object for display includes providing, for display, a visual matrix including a plurality of cells corresponding to intersecting rows and columns. Each row of cells includes the determined weighting for a particular position corresponding to a particular channel to which the row corresponds and a total number of attribution credits assigned to the particular channel.

In some implementations, determining, for each identified event-position pair, the weighting based on the aggregate of the attribution credits assigned to the events to which the event-position pair corresponds includes identifying, from the plurality of paths, candidate paths including the event corresponding to the event-position pair and determining, for the identified candidate paths, attribution credit assigned to each event in the candidate paths. The processor then determines, from the attribution credit assigned to each event in the candidate paths, an aggregate of the attribution credits assigned to the event. The processor aggregates, for each position along the path, the attribution credits assigned to events included in the candidate paths that are performed at the position and determines the weighting for the identified event-position pair based on a ratio of the sum of the attribution credits assigned to events included in the candidate paths that are performed at the position to the aggregate of the attribution credits assigned to the event.

In some implementations, the channels correspond to one or more types of events. In some implementations, providing, for display, the visual object includes providing, for display, the visual object including one or more items whose visual characteristics correspond to the weighting of the event-parameter pair to which the item corresponds.

According to another aspect, a system for providing, for display, attribution data associated with one or more events. The system includes a data processing system having a attribution data display module, the data processing system includes a memory storing processor-executable instructions and a processor configured to execute the processor-executable instructions. The processor identifies a plurality of paths. Each of the plurality of paths including one or more events. Each event corresponds to a channel of a plurality of channels and to parameter data corresponding to one or more parameters associated with the event. The processor identifies, from the plurality of paths, one or more channels for which attribution credits are to be determined. The processor determines using an attribution model, for each of the channels, attribution credits assigned to each event included in the plurality of paths corresponding to the channel and a total number of attribution credits assigned to the channel. The processor identifies, from the plurality of paths, a plurality of event-parameter pairs. Each event-parameter pair corresponds to a respective channel of the identified channels and to the one or more parameters associated with the event. The processor determines, for each identified event-parameter pair, a weighting based on an aggregate of the attribution credits assigned to the events to which the event-parameter pair corresponds. The processor then provides, for display, a visual object including an indicator corresponding to the determined weighting for at least one of the event-parameter pairs.

In some implementations, providing, for display, the visual object includes providing, for display, the visual object including the total number of attribution credits assigned to the channel corresponding to the indicator. In some implementations, determining, for each of the channels, attribution credits assigned to each event included in the plurality of paths corresponding to the channel includes identifying, from the plurality of paths, candidate paths in which at least one event corresponds to the channel, and determining, for each of the candidate paths, an attribution credit assigned to each event of the path based on counterfactual gains.

In some implementations, the parameter data of each of the events identifies a position along a path at which the event is performed and wherein each event-parameter pair includes an event-position pair that corresponds to a position along the path at which the event was performed.

In some implementations, providing the visual object for display includes providing, for display, a visual matrix including a plurality of cells corresponding to intersecting rows and columns. Each row of cells includes the determined weighting for a particular position corresponding to a particular channel to which the row corresponds and a total number of attribution credits assigned to the particular channel.

In some implementations, determining, for each identified event-position pair, the weighting based on the aggregate of the attribution credits assigned to the events to which the event-position pair corresponds includes identifying, from the plurality of paths, candidate paths including the event corresponding to the event-position pair and determining, for the identified candidate paths, attribution credit assigned to each event in the candidate paths. The processor then determines, from the attribution credit assigned to each event in the candidate paths, an aggregate of the attribution credits assigned to the event. The processor aggregates, for each position along the path, the attribution credits assigned to events included in the candidate paths that are performed at the position and determines the weighting for the identified event-position pair based on a ratio of the sum of the attribution credits assigned to events included in the candidate paths that are performed at the position to the aggregate of the attribution credits assigned to the event.

In some implementations, the channels correspond to one or more types of events. In some implementations, providing, for display, the visual object includes providing, for display, the visual object including one or more items whose visual characteristics correspond to the weighting of the event-parameter pair to which the item corresponds.

According to yet another aspect, a computer-readable storage medium has instructions to provide information via a computer network. The instructions are executable by a processor. The processor can identify a plurality of paths. Each of the plurality of paths includes one or more events. Each event corresponds to a channel of a plurality of channels and to position data identifying a position along a path at which the event was performed. The processor can identify, from the plurality of paths, one or more channels for which attribution credits are to be determined. The processor can determine using an attribution model, for each of the channels, attribution credits assigned to each event included in the plurality of paths corresponding to the channel and a total number of attribution credits assigned to the channel. The processor can identify, from the plurality of paths, a plurality of event-position pairs. Each event-position pair corresponds to events that correspond to a respective channel of the identified channels and are performed at a respective position of the plurality of paths. The processor determines, for each identified event-position pair, a weighting based on an aggregate of the attribution credits assigned to the events to which the event-position pair corresponds. The processor provides, for display, a visual object including an indicator corresponding to the determined weighting for at least one of the event-position pairs.

In some implementations, providing, for display, the visual object includes providing, for display, the visual object including the total number of attribution credits assigned to the channel corresponding to the indicator. In some implementations, determining, for each of the channels, attribution credits assigned to each event included in the plurality of paths corresponding to the channel includes identifying, from the plurality of paths, candidate paths in which at least one event corresponds to the channel, and determining, for each of the candidate paths, an attribution credit assigned to each event of the path based on counterfactual gains.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
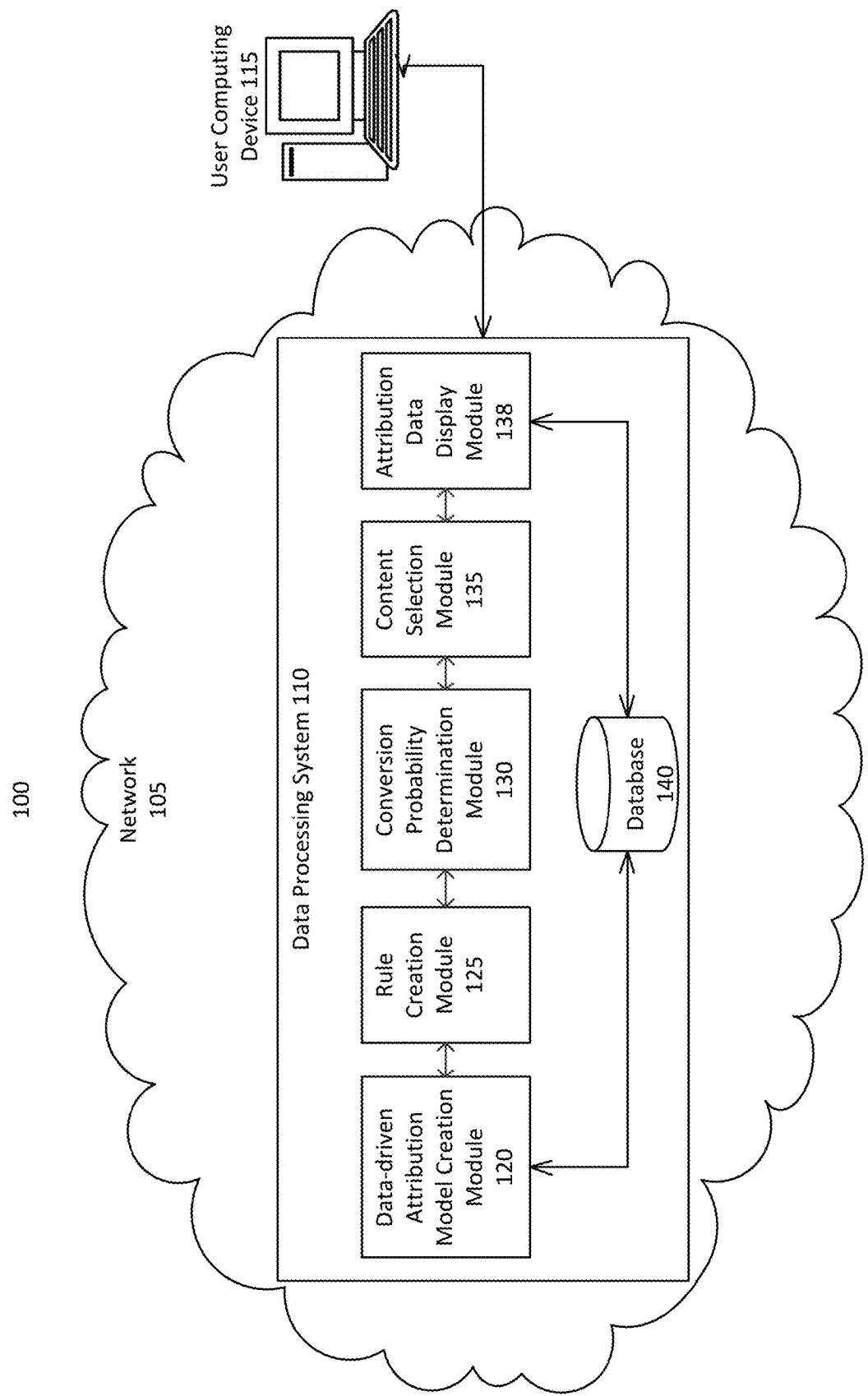
FIG. 1 is a block diagram depicting one implementation of an environment for identifying competitors using content items including content extensions, according to an illustrative implementation.

Following below are more detailed descriptions of various concepts related to, and implementations of, methods, apparatuses, and systems for creating an attribution model that assigns attribution credit to not only the last media exposure the user was exposed to prior to a converting act, but to other media exposures that were partly responsible for the occurrence of the converting act. In particular, the attribution model described herein relies on visit related data of visits to a website, including but not limited to conversion probabilities of paths taken by the visitors visiting the website. As such, the present disclosure relates to a data-driven attribution model for assigning attribution credit to various media exposures associated with paths and a conversion probability determination engine that is configured to determine the likelihood of a path converting. The various concepts introduced above and discussed in greater detail below may be implemented in any of numerous ways, as the described concepts are not limited to any particular manner of implementation. Examples of specific implementations and applications are provided primarily for illustrative purposes.

As described above, an online user today is exposed to a plethora of media exposures or marketing touchpoints, such as banner ads, email ads, display ads, organic and paid search results, social media posts or notifications, amongst others. A user exposed to such media exposures may likely take an action related to the media exposure, for example, click on the media exposure. Generally, upon taking an action on the media exposure to which the user is exposed, the user can be directed to the website linked to the media exposure, resulting in a user visit. In the event that the user performs a converting act at the website, for example, making an online purchase or registering an account, advertisers would like to know whether any of the media exposures to which the user was exposed deserve to get attribution credit for the user's converting act, and if so, the amount of attribution credit.

Historically, in a last click attribution model, the media exposure to which the user was last exposed would get all of the credit for the conversion, while all other media exposures that the user was exposed to would get none. The last click attribution model, however, is not equitable as it fails to give credit to media exposures that deserve attribution credit. It is understood that last click attribution is less than ideal and hence various alternative attribution models have been developed. These attribution models include simple rules based approaches such as dividing the credit equally among all the media exposures to which the user was exposed prior to the converting act. However, none of these existing attribution models rely on historical data associated with visits to a particular website to determine the amount of attribution credit deserving media exposures should receive.

In some implementations, the website can monitor visits to the website and maintain a log of such visits. In some implementations, a data processing system can maintain such a log for the website. In either case, whenever a visitor visits the website, a record of the visit is created. In some implementations, the record can include a visitor identifier unique to the device, browser, account or other identifiable component through which the visitor is visiting the website; a timestamp of the visit; a source from where the visitor arrived at the website, for example, a name of another website; a media exposure type indicating a type of media exposure through which the visitor arrived at the website, for example, a paid advertisement, amongst others; and an indication indicating whether or not the visit resulted in the user performing a conversion act.

For situations in which websites are monitoring visits to the website, the websites are unable to determine the identity of the visitor. To the extent that visitor's paths are recorded, the websites do not store personal information associated with the visitors. The websites may be able to identify and trace visitors' previous visits using the visitor identifier described above, however, the visitor identifier does not include personal information of the visitor associated with the visitor identifier. To the extent that the systems discussed here receive or collect personal information about visitors, or may make use of personal information, the visitors may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined Thus, the user may have control over how information is collected about him or her and used by a content server.

In some implementations, if the visitor has previously visited the website within a predetermined period of time since the last visit, the record can also include a path of the visitor. The path of the visitor includes a sequence of events, in which each event corresponds to a particular previous visit to the website. The path can also include an indication indicating whether or not the user performed a converting act. In some such implementations, the indication can also identify when the converting act occurred relative to other events included in the path. For example, if a visitor visits the website three times—the first visit to the website is through a paid search ad; the second visit to the website is through an email ad; and the third visit to the website is through another paid search ad, the path of the visitor corresponds to 'Paid Search 1'-'Email'-'Paid Search 2'. Each of the visits and the media exposure type through which the visitor visited the website corresponds to an event and each of the events is associated with an index position indicating an event's position relative to other events of the path. As such, the event 'paid search 1' has an index position 1, the event 'email' has an index position 2 and the event 'paid search 2' has the index position 3. Although the types of events described herein relate to media exposure types, the types of events are not limited to such. For instance, instead of the events corresponding to different types of media exposures, the events can correspond to events occurring during different times of the day. In some such implementations, an example path may appear as "Morning-Night-Afternoon-Morning." Other types of events can be media exposure types with more or less granularity. In some such implementations, an example path may appear as 'Paid Search (Sporting Goods)'-'Referral (third-party sports website)'-'Paid Search (Sports news)'. In this example, there are two distinct paid search event types, namely a paid search event type relating to media exposures shown on a sporting goods review website and the other being a paid search ad shown on a sporting news website.

Aspects of the present disclosure relate to methods and systems for creating a data-driven attribution model that relies on historical data associated with visits to a particular website. The attribution model can be specific to the particular website. The attribution model can include one or more rules that are based on conversion probabilities associated with the various types of paths. As such, to create such an attribution model, methods and systems for assigning attribution credit amongst a plurality of event types based on historical data associated with visits to the website can be employed. According to one aspect, a system for assigning attribution credit amongst a plurality of event types based on historical data associated with visits to the website includes a data processing system. The data processing system can identify, for a given time period, a plurality of visits to a particular website. The data processing system can identify, for each visitor from the plurality of visits, one or more paths taken by the visitor to visit the website. Each of the paths may correspond to a sequence of events through which the visitor visits the website. The data processing system can determine, for each path type, a conversion probability based on a number of visits corresponding to the path type that resulted in a conversion. The data processing system can then calculate, for a given path type having a plurality of events, a counterfactual gain for each event based on a conversion probability of the given path type and a conversion probability of a path type that does not include the event for which the counterfactual gain is calculated. The data processing system can then assign attribution credits to the events of the given path type for which counterfactual gains are calculated. In some implementations, the attribution model is created once each event in each path type can be assigned an attribution credit determined according to the system just described. As this attribution model relies on historical data corresponding to visits to a website, this attribution model is a data-driven attribution model.

The data-driven attribution model created by the system described above can be utilized to assign attribution credit to various events of a path associated with a user that performs a converting act. To do so, the data processing system can first identify the path taken by the user to perform the converting act. The data processing system can then determine that the identified path matches a path included in the attribution model, and responsive to determining that the path matches a path of the attribution model, provide an attribution credit to each of the events included in the path taken by the user based on the assigned attribution credits assigned to each of the events of the path included in the attribution model. Additional details of the methods and systems for creating the data-driven attribution model are provided below in Section A.

As described above, the new attribution model relies on determining conversion probabilities of path types based on paths taken by visitors of a particular website. One challenge in creating an attribution model that relies on determining conversion probabilities of path types is the amount of data that would need to be processed. The amount of data that may need to be processed can be based on the total number of paths to the website, the number of events in each of the paths and the number of different types of paths, amongst others. Although the more data that is processed may help achieve greater accuracy in calculating conversion probabilities for each of the path types, the need for greater accuracy should be balanced by the computational resources utilized.

As such, aspects of the present disclosure also relate to methods and systems for processing data to accurately determine conversion probabilities of path types while efficiently utilizing computational resources. In this regard, the present disclosure provides methods and systems for creating rules for the attribution model that balances accuracy and computational resource requirements. According to one aspect, a system for creating rules for an attribution model based on historical data associated with visits to the website includes a data processing system. The data processing system can identify, for a given time period, a plurality of conversions made by visitors of a particular website. The data processing system can identify, for each conversion, a path taken by the visitor making the conversion. The path can identify one or more events and a corresponding index position indicating an event's position relative to other events of the path. The data processing system can determine a number of conversions corresponding to the identified path. The data processing system can identify, from the identified paths, paths that have a path length greater than a threshold number of events. The data processing system can rewrite the identified paths having a path length greater than a threshold number of events according to a path rewriting policy such that the rewritten paths have a new path length that is not greater than the threshold number of events. The rewritten paths can include a single dummy variable equivalent to one or more events. The data processing system can select one or more paths having an associated number of conversions greater than a conversion threshold number to be included in rules. Additional details of the methods and systems for creating rules for an attribution model based on historical data associated with visits to the website are provided below in Section B.

The data-driven attribution model described above relies on the use of prior conversion paths of visitors to determine conversion probabilities of various path types. Based on the conversion probabilities of the various path types, counterfactual gains can be calculated for each event of a given path type, which can be used to determine and assign attribution credits to events of the given path type. For a given path type having more than one event, an attribution credit for each of the events can be determined by calculating counterfactual gains for each event. The counterfactual gains are calculated based on a conversion probability of the given path type and a conversion probability of a path type that does not include the event for which the counterfactual gain is calculated. Accurately calculating the conversion probability of various path types can be quite challenging.

As such, aspects of the present disclosure relate to methods and systems for measuring conversion probabilities of a plurality of path types to create the data-driven attribution model. According to one aspect, a system for measuring conversion probabilities of a plurality of path types for an attribution model includes a data processing system. The data processing system can identify a plurality of paths taken by visitors to visit a particular website. The paths correspond to a sequence of one or more events. For the sake of clarity, a sequence of one event corresponds to a path that includes a single event, while a sequence of more than one event corresponds to a path that includes two or more events in which each of the events has a corresponding index position indicating the event's position relative to other events in the path. An event represents a type of visit to the website. Examples of such events can be a visitor or visitor identifier's interaction with a paid search advertisement, an organic search result, a social network action, a referral link, an email, or an interaction with a web browser that directly leads the visitor to the website, amongst others. In some implementations, the event causes a visitor to visit the website. For each path corresponding to the sequence of events through which the visitor visits the website, the data processing system can identify one or more subpaths corresponding to each visit to the website as paths. The data processing system can determine, for each of the identified paths, that the path is one of converting or non-converting. The data processing system can then compute a total path count for each path type. Each path type identifies one or more events having an associated indexed position indicating a position of the event relative to other events in the path. The data processing system can then determine, for each path type, a conversion path count indicating a number of paths taken by visitors that resulted in a conversion at the website. The data processing system can then calculate, for each path type, a probability of conversion based on the ratio of the conversion path count to the total path count corresponding to the path type. The data processing system can then provide the calculated probability of conversion for a given path type for an attribution model used in assigning attribution credit to events of a path. Additional details of the methods and systems for measuring conversion probabilities of a plurality of path types for an attribution model are provided below in Section C.

As described above, the data-driven attribution model relies on the conversion probabilities of various path types to determine the amount of attribution credit an event of a given path deserves. As described herein, the conversion probabilities of the path types can help determine attribution credits for various events of a given path type. Moreover, the conversion probabilities of the various path types can be immensely valuable for content selection. For instance, marketers and advertisers can use the conversion probability of a path associated with a visitor identifier to determine a likelihood that the visitor identifier will convert in response to being exposed to a particular type of media exposure.

Aspects of the present disclosure relate to methods and systems for providing content for display based on a probability of conversion. In particular, the present disclosure relate to methods and systems for selecting content for display at a device associated with a visitor identifier based on a probability of conversion associated with the visitor identifier. According to one aspect, a data processing system can identify a visitor identifier associated with a website. The visitor identifier can be associated with a path type indicating a sequence of one or more events through which the visitor identifier previously visited the website. The data processing system can identify a conversion probability of the path type associated with the identified visitor identifier. The data processing system can then select a content item for display based on the identified conversion probability of the path type associated with the identified visitor identifier. Additional details of the methods and systems for providing content for display based on a probability of conversion are provided below in Section D.

FIG. 1 is a block diagram depicting one implementation of an environment for creating an attribution model that assigns attribution credit to not only the last media exposure the user was exposed to prior to a converting act, but to other media exposures that were partly responsible for the occurrence of the converting act. In particular, the attribution model described herein relies on visit related data of visits to a website, including but not limited to conversion probabilities of paths taken by the visitors visiting the website. In particular, FIG. 1 illustrates a system 100 for creating and using an attribution model that fairly assigns attribution credit to media exposures that were partly responsible for the occurrence of a converting act. In particular, the attribution model described herein relies on visit related data of visits to a website, including but not limited to conversion probabilities of paths taken by the visitors visiting the website.

The system 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

In some implementations, the data processing system 110 can include a data-driven attribution model creation module 120 configured to create a data-driven attribution model for a particular website. Details of the data-driven attribution model creation module 120 will be provided below in Section A of the present disclosure. The data processing system 110 can also include a rule creation module 125 that is configured to create attribution credit assignment rules based on various path types associated with visits to the particular website. Details of the rule creation module 125 will be provided below in Section B of the present disclosure. The data processing system 110 can also include a conversion probability determination module 130 configured to determine conversion probabilities of paths taken by visitors to the particular website. Details of the conversion probability determination module 130 will be provided below in Section C of the present disclosure. The data processing system 110 can also include a content selection module 135 configured to select content to display at a device associated with a visitor identifier based on a conversion probability of a path associated with the visitor identifier. Details of the content selection module 135 will be provided below in Section D of the present disclosure. The data processing system 110 can also include an attribution data display module 138 configured to provide attribution data for display. Details of the attribution data display module 138 will be provided below in Section E of the present disclosure.

The data processing system 110 can further include one or more processors or other logic devices such as a computing device having a processor to communicate via a network 105 with at least one user computing device 115. In some implementations, the user computing device 115 and the data processing system 110 can communicate with one another via the network 105.

The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The user computing device 115 may be any number of different user electronic devices, for example, a laptop computer, a desktop computer, a tablet computer, a smartphone, a digital video recorder, a set-top box for a television, a video game console, or any other computing device configured to communicate via the network 105. The user computing device 115 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The user computing device 115 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the user computing device 115 (e.g., a built-in display, microphone, etc.) or external to the housing of the user computing device 115 (e.g., a monitor connected to the user computing device 115, a speaker connected to the user computing device 115, etc.), according to various implementations. For example, the user computing device 115 may include an electronic display, which visually displays web pages using webpage data received from one or more content sources and/or from the data processing system 110 via the network 105. In some implementations, a content placement campaign manager or advertiser can communicate with the data processing system 110 via the user computing device 115. In some implementations, the advertiser can communicate with the data processing system 110 via a user interface displayed on the user interface devices of the user computing device 115. Aspects of the user interface are described below with respect to FIG. 3.

The data processing system can also include one or more content repositories or databases 140. The databases 140 can be local to the data processing system 110. In some implementations, the databases 140 can be remote to the data processing system 110 but can communicate with the data processing system 110 via the network 105. The databases 140 can store information associated with a large number of websites for which the data processing system is configured to create an attribution model. Additional details of the contents of the databases 140 will be provided below.

A. Methods and Systems for Creating a Data-Driven Attribution Model Relying on Past Visit Related Data of a Website The data-driven attribution model creation module 120 can be designed, constructed or configured to create an attribution model that fairly assigns attribution credit amongst events of a path that results in a converting act. In some implementations, the data-driven attribution model can be created using visit related data associated with visits to a particular website. As such, the attribution model created can be specific to the particular website. The data-driven attribution model creation module 120 can be configured to access a database that stores visit related data associated with visits to the particular website. In some implementations, the data-driven attribution model creation module 120 can be configured to store the visit related data in one or more databases, such as the database 140.

In some implementations, the data-driven attribution model creation module 120 or some other module of the data processing system 110 can be configured to monitor visits to the particular website. In some implementations, the website can include one or more webpages. In some implementations, each webpage for which visits are to be monitored or recorded can include a script, instructions, or some other computer-executable code, which causes the data-driven attribution model creation module 120 or other module of the data processing system 110 to create records of visits to the website. In some implementations, the data-driven attribution model creation module 120 may not store the visit related data but may be configured to access such data from the database 140.

In some implementations, information associated with each visit is stored as a separate entry in the database. In some implementations, each entry can include a visitor identifier uniquely identifying a visitor device. In some implementations, the visitor identifier can be a cookie corresponding to the website. The entry can also include a timestamp of the visit. The entry can also include an indication of whether or not the visitor performed a converting act during the visit. In addition, the entry can include a source from where the visitor arrived at the website, for example, a name of another website on which the visitor performed a user interaction with a media exposure. The entry can also include an identity of a media exposure type indicating a type of media exposure through which the visitor arrived at the website, for example, a paid advertisement, an email ad, a social network post, amongst others. In some implementations, the entry can also include a path of the visitor. The path can include a sequence of events that caused the visitor to previously visit the site. In some implementations, the module configured to create the record, such as the data-driven attribution model creation module 120 can identify the visitor identifier associated with the visit and identify any previous interactions with the website.

In some implementations, the data-driven attribution model creation module 120 can identify previous interactions with the website that occurred within a predetermined time range, for example, the month of October 2013. In some implementations, the data-driven attribution model creation module 120 can identify all previous interactions with the website that occurred within a predetermined time period, for example, 4 days, of the occurrence of the preceding visit. In some implementations, the data-driven attribution model creation module 120 can identify all previous interactions with the website that occurred within a predetermined time period of the occurrence of the preceding visit and that occurred within a predetermined time range.

The data-driven attribution model creation module 120 can be configured to identify a plurality of visits to a particular website. In some implementations, the data-driven attribution model creation module 120 can identify a plurality of visits to the website over a given time period. In some implementations, the time period can be based on the amount of traffic the website receives over the given time period. In some implementations, the time period can be based on the number of visits to be analyzed. In some implementations, the number of visits to be analyzed can be 1000 visits to over 10 million visits. In some implementations, the data-driven attribution model creation module 120 can be configured to identify a plurality of visits to the website by retrieving the visit related entries from a database in which visit related information is stored, such as the database 140. The data-driven attribution model creation module 120 can be configured to request, from the database, a predetermined number of visit related entries that correspond to a given time period. For example, the request can be to receive 10 million entries that correspond to visits occurring in the month of October 2013.

In some implementations, a visitor identifier is associated with each visit to the website. The visitor identifier can be specific to a particular visitor device. As the visitor identifier visits the website multiple times, the multiple visits results in the creation of a path associated with the visitor identifier. The path can include one or more events. Each event can provide information regarding how the visitor arrived at the website during the visit to which the event corresponds. The event can identify a source indicating a website from where the visitor arrived at the website and a media exposure type indicating a type of media exposure to which the visitor was exposed. In some implementations, the event can be a direct visit to the website. That is, the visitor visited the website without being interacting with a media exposure. For the purposes of the present disclosure, a direct visit to the website can be regarded as a media exposure type. The sequence of the events in the path are important, as such, each of the events can have or can be associated with a corresponding index position indicating a position of the event relative to positions of other events included in the path.

Each of the paths can correspond to a particular path type. Paths that are identical correspond to the same path type. The characteristics of any path type include the types of events, the number of events and the order in which each of the events occurred. If two paths have the same number of events and the order in which each of the event types occurred are identical, the two paths are the same path type. Conversely, if the two paths have a different number of events or the order in which each of the event types occurred are different, the two paths correspond to different path types.

The data-driven attribution model creation module 120 can be configured to identify a visitor identifier associated with the identified visits. The data-driven attribution model creation module 120 can further be configured to identify a path associated with each visitor identifier associated with the identified visits. In some implementations, each time the data-driven attribution model creation module 120 records a visit to the website, the data-driven attribution model creation module 120 identifies the visitor identifier associated with the visit, performs a lookup for previous visits associated with the same visitor identifier and stores a path corresponding to the previous visits with the recorded visit. In this way, the data-driven attribution model creation module 120 can be configured to identify, from the identified plurality of visits, a path associated with each visitor identifier associated with the identified visits.

In some implementations, the data-driven attribution model creation module 120 can identify a path associated with a given visitor identifier associated with one or more of the identified visits. In some implementations, the data-driven attribution model creation module 120 can identify the path by identifying, for the given visitor identifier, one or more entries corresponding to the given identifier. From the identified entries, sorting the entries according to a timestamp of the visit included in the entry. The data-driven attribution model creation module 120 can then arrange the events associated with each of the entries in ascending order starting with the entry corresponding to the earliest timestamp. In this way, the path associated with the given identifier includes the entries arranged in ascending order.

In some implementations, the data-driven attribution model creation module 120 can be configured to determine if the amount of time between two successive events is greater than a threshold time period. In some such implementations, if the data-driven attribution model creation module 120 determines that the amount of time between two successive events is greater than a threshold time period, the data-driven attribution model creation module 120 can be configured to disregard the earlier occurring event of the two successive events and all other events preceding the earlier occurring event when identifying a path associated with the given visitor identifier.

In some implementations, the data-driven attribution model creation module 120 can be configured to determine if the amount of time between one particular type of event and an immediate prior event (of any type) is less than a threshold time period. In some such implementations, if the data-driven attribution model creation module 120 determines that the amount of time between an occurrence of that particular event type and it's immediate predecessor event is less than threshold time period, the data-driven attribution model creation module 120 can be configured to disregard that occurrence of the particular event type when identifying a path associated with the given visitor path. In some implementations, the data-driven attribution model creation module 120 can be configured to disregard one or more events that occur within a threshold time window from a prior event. For example, the data-driven attribution model creation module 120 can be configured to disregard one or more events associated with a direct visit to a website that occur within a threshold time window from a prior event. In some implementations, the threshold time window can be about 24 hours.

Figure 2A:
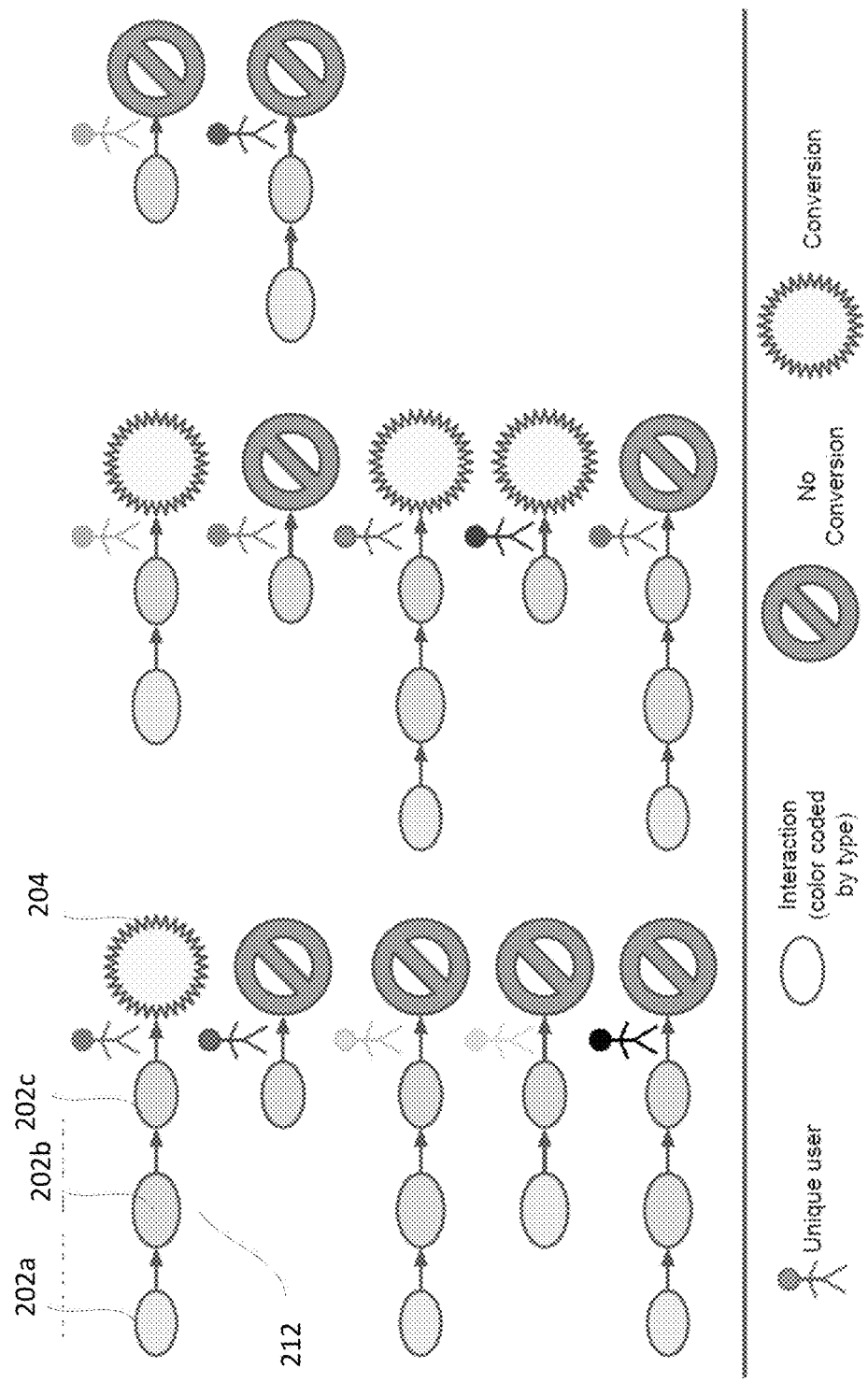
FIG. 2A-2C show conceptual illustrations of a plurality of identified paths.
Figure 2B:
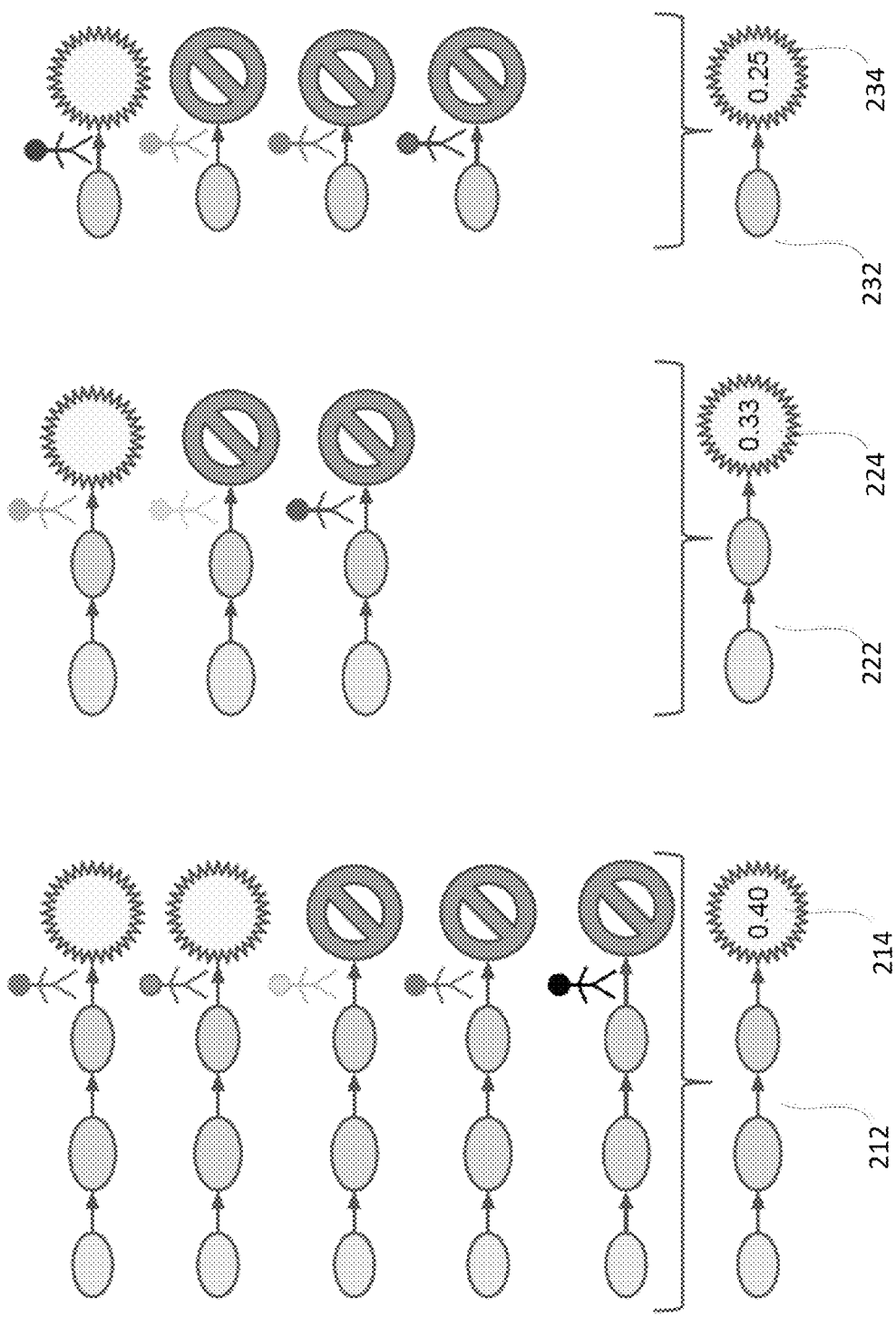

The data-driven attribution model creation module 120 can be configured to determine a conversion probability for each path type. In some implementations, the data-driven attribution model creation module 120 can determine the conversion probability of a given path type based on a number of visits corresponding to the path type that resulted in a conversion. The data-driven attribution model creation module 120 can determine the conversion probability of a given path type by first identifying, from the plurality of identified paths, all paths that correspond to the same path type. FIG. 2A shows a conceptual illustration of a plurality of identified paths, some of which resulted in conversions, while others did not. As shown in FIG. 2A, a path 212 includes a first event 202a followed by a second event 202b followed by a third event 202c followed by a conversion event 204. The data-driven attribution model creation module 120 can then determine a total path count for each path type indicating the total number of paths specific to each path type. The data-driven attribution model creation module 120 can also be configured to determine a conversion path count for each path type indicating the total number of conversions specific to each path type. The conversion probability of a given path type is the ratio of the conversion path count to the total path count for the given path type. FIG. 2B shows a conceptual illustration of the plurality of identified paths shown in FIG. 2A arranged by path types. In FIG. 2B, the three columns represent the three path types. The first path type 212, shown in the left column, includes 5 paths, of which 2 converted. As such, the conversion probability 214 of the first path type is ⅖ or 40%. The second path type 222, shown in the middle column, includes 3 paths, of which 1 converted. As such, the conversion probability 224 of the second path type 222 is ⅓ or 33.33%. The third path type 232, shown in the right column, includes 4 paths, of which 1 converted. As such, the conversion probability 234 of the third path type 232 is ¼ or 25%.

Figure 2C:
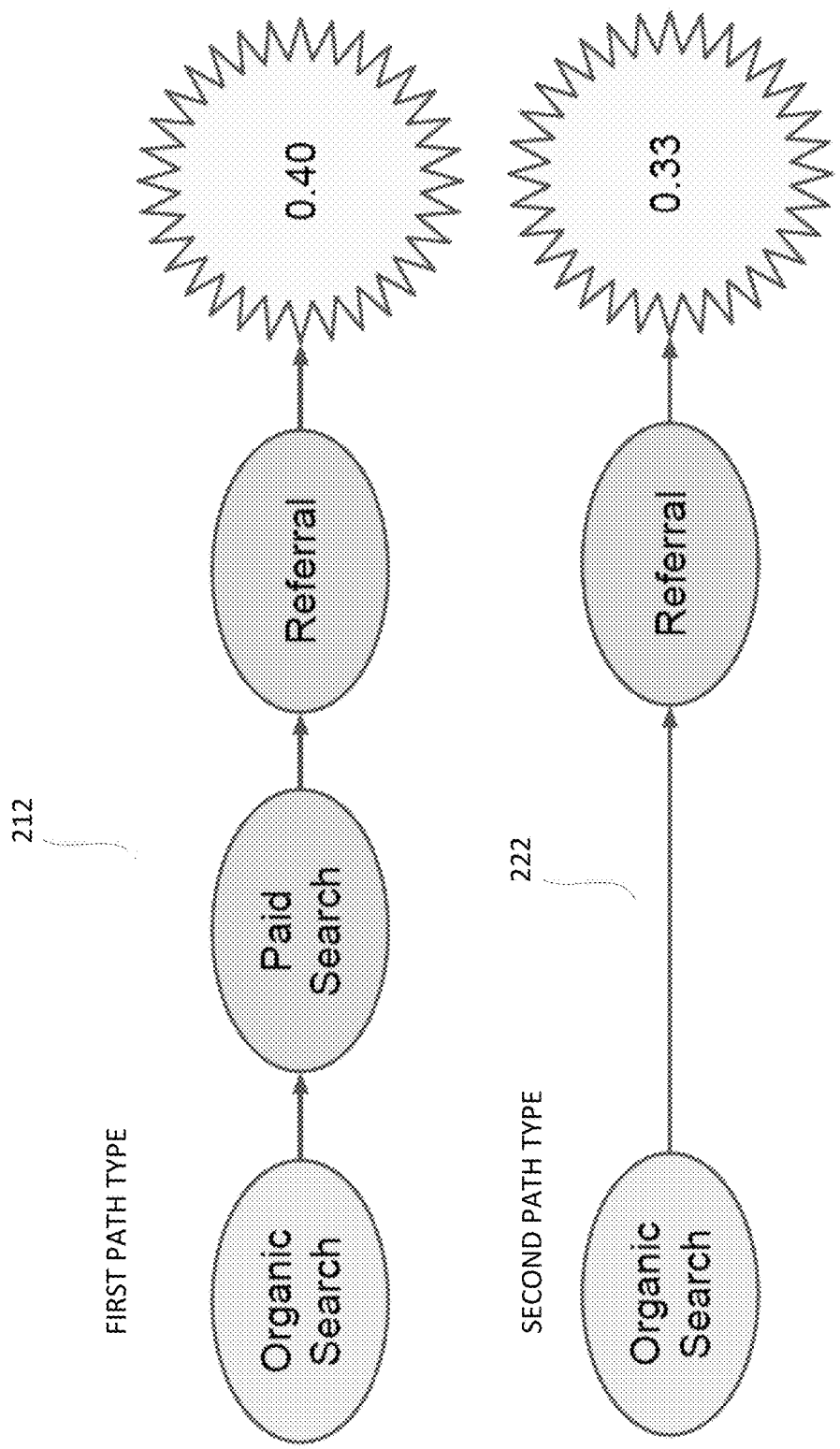

The data-driven attribution model creation module 120 can be configured to calculate, for a given path type having a plurality of events, a counterfactual gain for each event included in the given path type. In some implementations, the data-driven attribution model creation module 120 can be configured to calculate the counterfactual gain for each event based on a conversion probability of the given path type and a conversion probability of a path type that does not include the event for which the counterfactual gain is calculated. FIG. 2C shows two paths of the paths shown in FIG. 2B. As shown in FIG. 2C, the first path type 212 includes a first event 'Organic Search' followed by a second event 'Paid Search' followed by a third event 'Referral' and the conversion probability is 0.4 as described above. The second path type 222 includes a first event 'Organic Search' followed by a second event 'Referral' and the conversion probability is 0.33. The difference between the first path type 212 and the second path type 222 is that the second path type 222 does not include the event 'Paid Search' in between the 'Organic Search' event and the 'Referral' event. The data-driven attribution model creation module 120 can be configured to calculate the counterfactual gain of the 'Paid Search' event of the first path type by determining the difference in the conversion probabilities of the first path type 212 and the second path type 222 that is identical to the first path type except that the second path type 222 does not include the 'Paid Search' event for which the counterfactual gain is to be calculated.

Figure 2D:
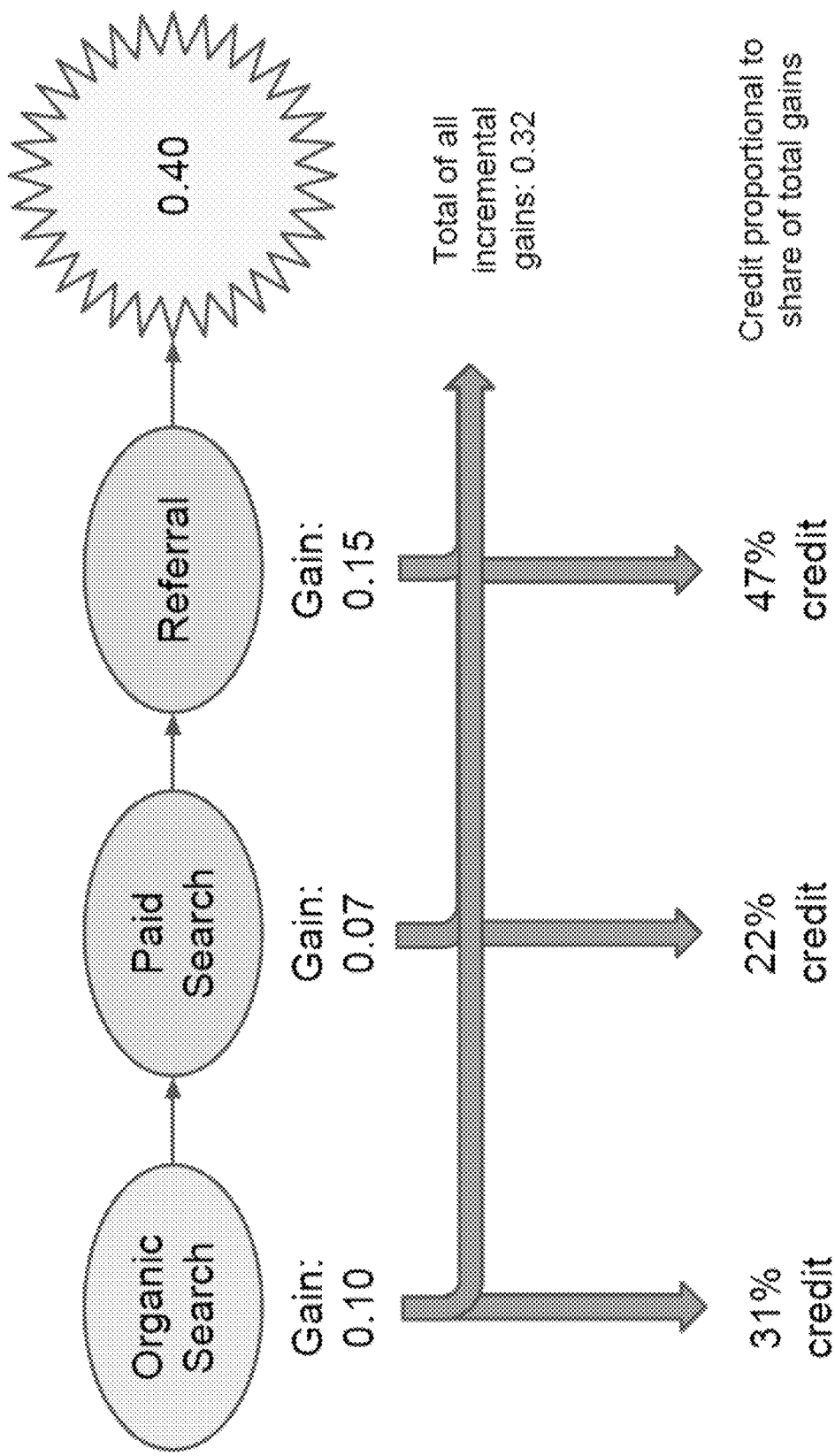
FIG. 2D shows a conceptual illustration depicting counterfactual gains and attribution credits assigned to each event of a path.

The data processing system can be configured to calculate the counterfactual gains for each event included in a particular path type to determine the amount of attribution credit to assign to each of the events of the path type. As shown in FIG. 2D, a conceptual illustration of the counterfactual gains for each event in the first event type 212 is shown. To calculate the counterfactual gain of the 'Organic Search' event, the data-driven attribution model creation module 120 can first determine the conversion probability of a path type that includes only a 'Paid Search' event followed by a 'Referral' event. The difference between the conversion probability of the first event type and the path type that includes only a 'Paid Search' event followed by a 'Referral' event corresponds to the counterfactual gain of the 'Organic Search' event. Similarly, to calculate the counterfactual gain of the 'Referral' event, the data-driven attribution model creation module 120 can first determine the conversion probability of a path type that includes only an 'Organic Search' event followed by a 'Paid Search' event. The difference between the conversion probability of the first event type and the path type that includes only an 'Organic Search' event followed by a 'Paid Search' event followed by a 'Referral' event corresponds to the counterfactual gain of the 'Referral' event.

More generally, the data-driven attribution model creation module 120 can be configured to calculate the counterfactual gain of an event of a given path type by first identifying, for the given path type, a first ordered sequence of events preceding the given event and a second ordered sequence of events subsequent to the given event. In some implementations, if the event is the first event of the given path type, there data-driven attribution model creation module 120 does not identify a first ordered sequence of events. In some implementations, if the event is the last event of the given path type, the data-driven attribution model creation module 120 does not identify the second ordered sequence of events. In some implementations, the sequence of events can include one or more events. The data-driven attribution model creation module 120 can then identify, from the identified path types, a comparison path type that includes the first ordered sequence of events immediately followed by the second ordered sequence of events. Stated in another way, the comparison path type is identical to the given path type except that the comparison path type does not include the event for which the data-driven attribution model creation module 120 is calculating the counterfactual gain. The data-driven attribution model creation module 120 can then calculate the difference between a conversion probability of the given path type and a conversion probability of the comparison path type. The calculated difference is the counterfactual gain of the event.

In some implementations, the counterfactual gain of a particular event in a given path type can be a negative number. However, this can adversely affect how to assign attribution credit to one or more events. For instance, it is possible that the data-driven attribution model creation module 120 can calculate a counterfactual gain for the last event of a particular path type to be a negative number even though the last event can result in a conversion. As such, assigning a negative attribution credit to a particular event is counterintuitive. To account for the possibility of calculating a negative counterfactual gain, the data-driven attribution model creation module 120 can be configured to determine that a calculated counterfactual gain for a given event is less than zero. The data-driven attribution model creation module 120 can modify the counterfactual gain for such an event to zero in response to determining that the calculated counterfactual gain for the given event is less than zero.

The data-driven attribution model creation module 120 can then determine the attribution credit to assign to each of the events of a given path type. The data-driven attribution model creation module 120 can first determine a total gain value corresponding to the sum of the counterfactual gains corresponding to each of the events of the given path type. The data-driven attribution model creation module 120 can then determine the attribution credit for each of the events by determining the ratio of the counterfactual gain of a given event to the total gain value. As shown in FIG. 2D, the total gain value is the sum of the counterfactual gains of each of the 'Organic Search' event, the 'Paid Search' event and the 'Referral' event. For the 'Organic Search' event, the attribution credit is the ratio of 0.1/0.32, which is about 31%. For the 'Paid Search' event, the attribution credit is the ratio of 0.07/0.32, which is about 22%. For the 'Referral event, the attribution credit is the ratio of 0.15/0.32, which is about 47%. The data-driven attribution model creation module 120 can then assign the determined attribution credit to each event in the given path type for which counterfactual gains are calculated. In some implementations, in the event that the total gain value is zero, the data-driven attribution creation module 120 can be configured to assign each event in the path an attribution credit according to a fallback attribution model. In some implementations, the fallback attribution model can be a last-click attribution model. In some implementations, the fallback attribution model can be one that assigns each event an equal amount of attribution credit.

Figure 2E:
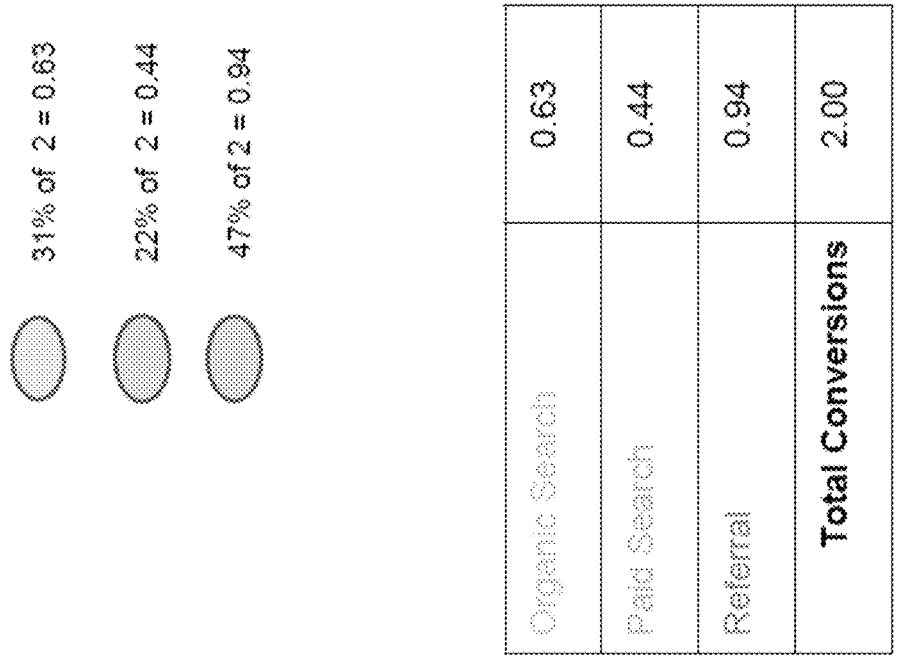
FIG. 2E shows a conceptual illustration of two paths of the same path type.
Figure 2E:
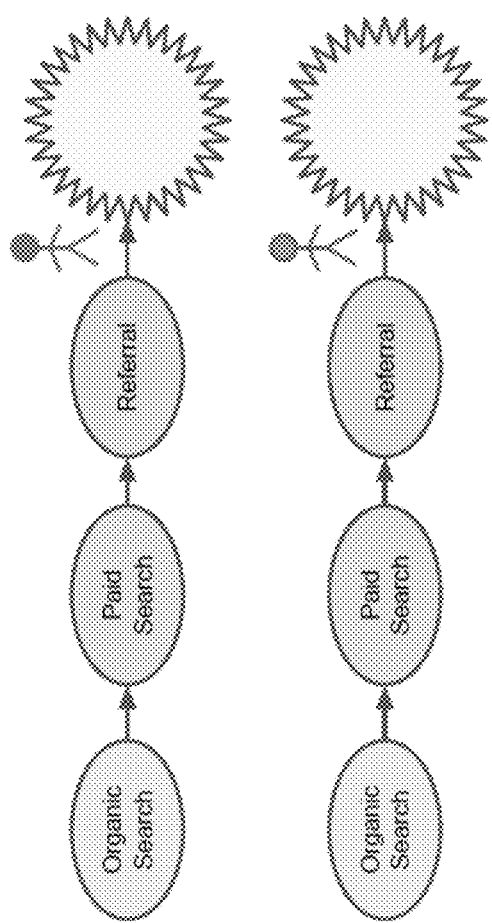

The data-driven attribution model creation module 120 can be configured to determine the amount of attribution credit to apply to each event type for the identified paths that resulted in conversions. FIG. 2E shows a conceptual illustration of two paths of the same path type. As shown in FIG. 2E, the two converting paths of the first path type 212 are shown. The data-driven attribution model creation module 120 can compute the amount of attribution credit each of the events of the first path type deserve by multiplying the attribution credit to the total number of conversions for the first path type. Accordingly, the attribution credit assigned to the 'Organic Search' event is 0.63, the 'Paid Search' event is 0.44 and the 'Referral' event is 0.94, respectively. In contrast, if the last click attribution model was applied, the attribution credit assigned to Organic Search' event and the 'Paid Search' event would be zero, while the attribution credit assigned to the 'Referral' event would be 2.

The data processing system data-driven attribution model creation module 120 can further be configured to store, for each of a plurality of the path types associated with the identified paths, the determined attribution credit for each event included in the path type (BLOCK 430). The data-driven attribution model creation module 120 can be configured to store the determined attribution credits for each event included in the path type in a database, such as the database 140. In some implementations, the data-driven attribution model creation module 120 can store the determined attribution credits of each event of a given path type as a single attribution rule. In this way, the data-driven attribution model creation module 120 can store a plurality of the attribution rules to create an attribution model based on the conversion probabilities of various path types. In some implementations, the data-driven attribution model creation module 120 can store the attribution rules created from the determined attribution credits in such a way that the data-driven attribution model creation module 120 can access the attribution rules at a later time to assign attribution credits to events of a path type that resulted in a conversion.

In some implementations, once the data processing system has created an attribution model using a plurality of the attribution rules, the data processing system can be configured to assign attribution credits to various events of a given path that resulted in a conversion. To do so, the data processing system can first identify a path type of the path that converted. The data processing system can then use the attribution rule corresponding to the identified path type to assign attribution credits to each of the events of the identified path.

In some implementations, the data processing system can be configured to maintain statistics for one or more content publishers. In some implementations, once the data processing system has assigned attribution credits to each of the events of a path, the data processing system can update a conversion table of the website that maintains a tally of the attribution credits associated with various events by adding the attribution credits associated with each of the events to the existing totals of the corresponding events.

Figure 3:
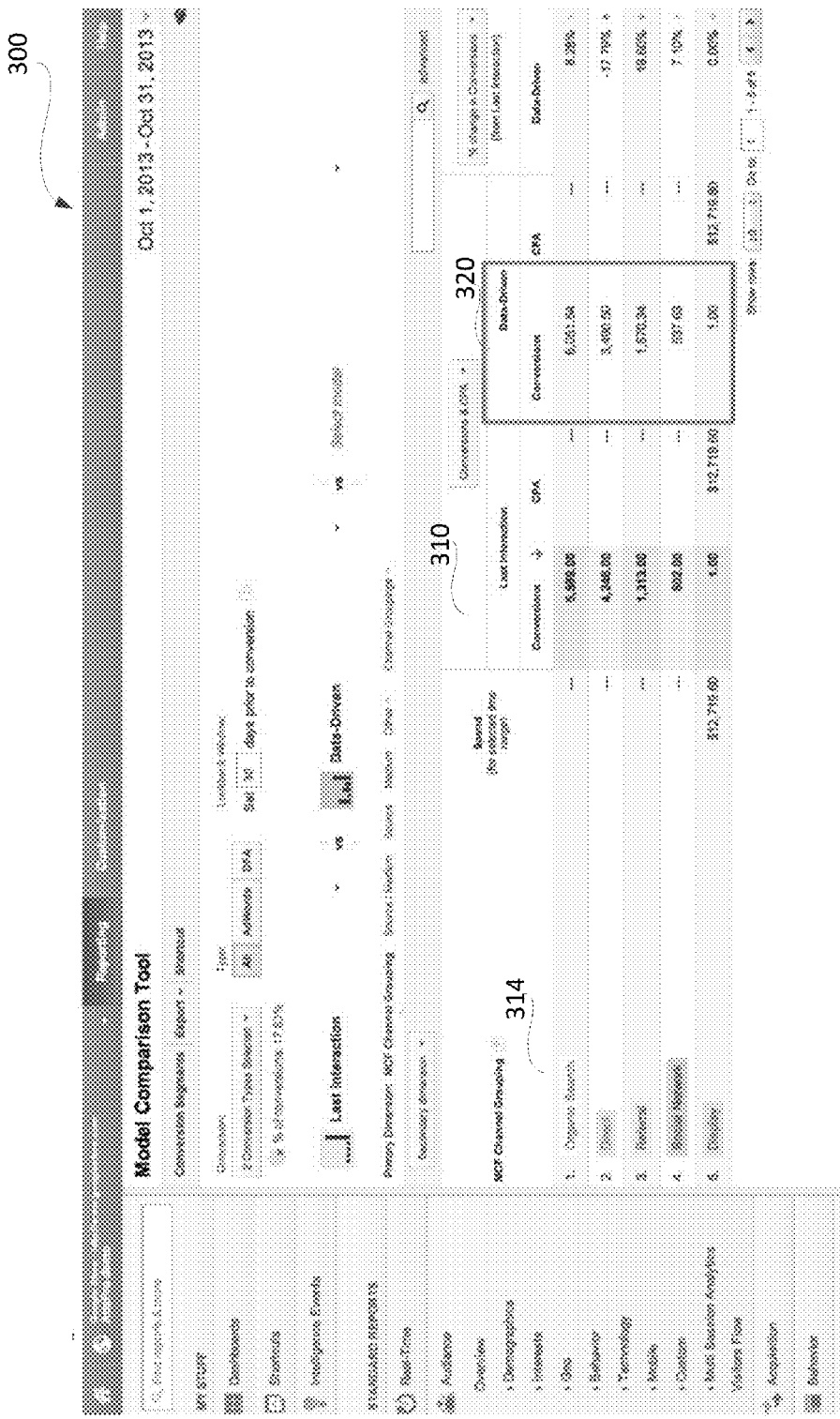
FIG. 3 is a screenshot of a user interface depicting a model comparison tool.

FIG. 3 is a screenshot of a user interface depicting a model comparison tool. The user interface can compare the number of conversions assigned to two different attribution models for a given set of conversions. As shown in FIG. 3, the data shown in the user interface corresponds to a last click attribution model expressed as 'last interaction' and a data-driven attribution model expressed as 'data-driven.' The results of the last click attribution model are shown in the column 310, while the results of the data-driven attribution model are shown in the column 320. Various event types 314, such as Organic search, direct, referral, social network are shown along with their corresponding attribution credits based on the last-click attribution model and data-driven attribution model, respectively. The conversions of each of the different event types 314 are calculated by determining the attribution credit assigned for each event of a first path type that received a conversion. In particular, the data processing system can identify a converting path, determine attribution credits for each of the events of the converted path and add the determined attribution credits corresponding to each event to a running total of the event that is maintained by the data processing system 110. In some implementations, the data used to calculate the conversions is based on a time period, for example, Oct. 1, 2013-Oct. 31, 2013. For this time period, all of the paths that converted can be analyzed, the attribution credits for each event of the converted paths is determined and added to determine the total conversions for a given event type. As shown in FIG. 3, the total number of conversions through 'Organic Search' events or media exposures is 6,051.54 according to the data-driven attribution model. In contrast, the total number of conversions through 'Organic Search' events or media exposures is 5589 according to the last-click attribution model.

Figure 4:
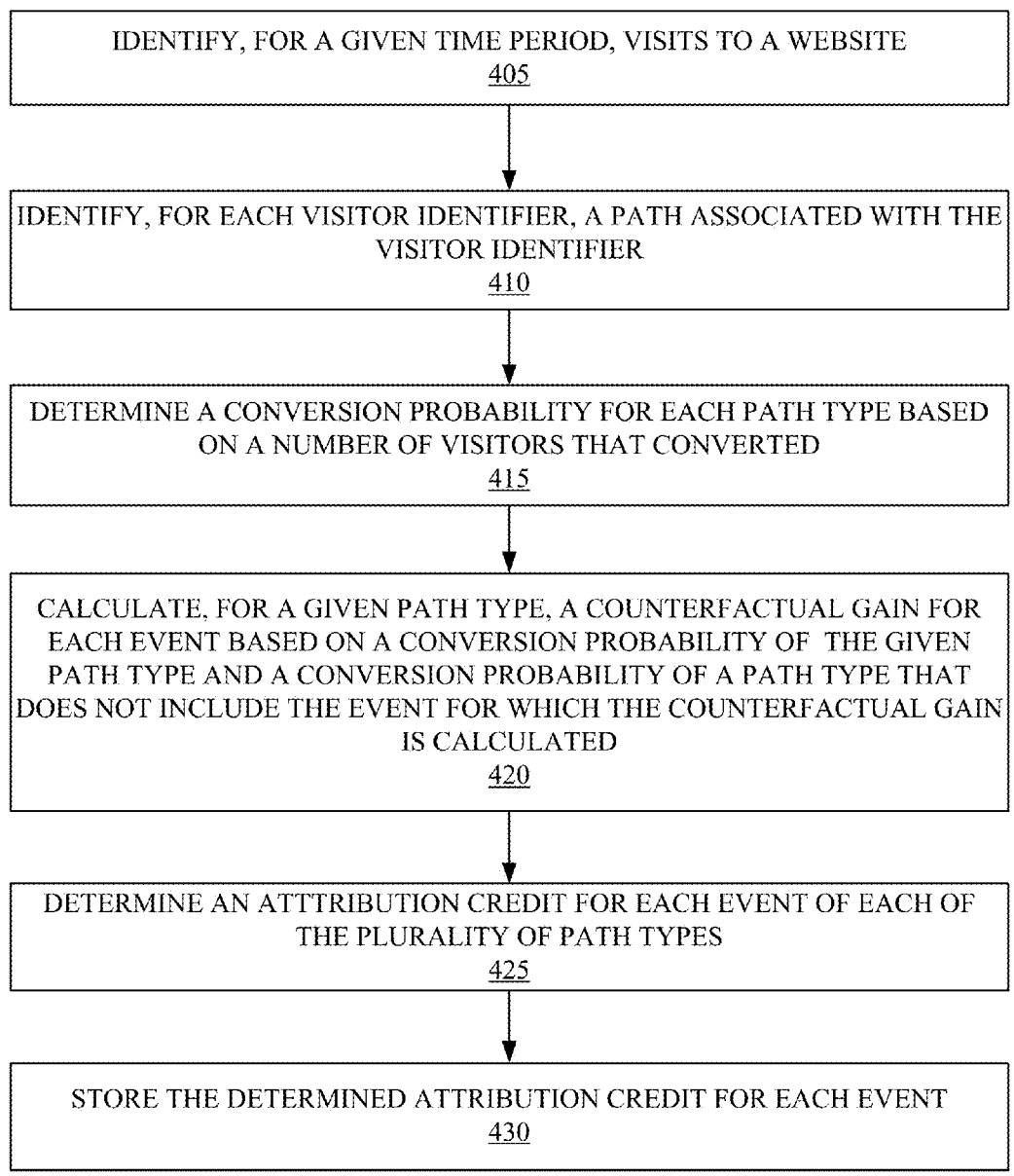
FIG. 4 is a flow diagram depicting one implementation of the steps taken to create a data-driven attribution model.

FIG. 4 is a flow diagram depicting one implementation of the steps taken to create a data-driven attribution model. In brief overview, the data processing system can identify, for a given time period, a plurality of visits to a particular website (BLOCK 405). The data processing system can then identify, for each visitor identifier associated with the identified plurality of visits, a path associated with the visitor identifier (BLOCK 410). The data processing system can determine, for each path type associated with the identified visitor identifiers, a path-type conversion probability based on a number of visits corresponding to the path type that resulted in a conversion (BLOCK 415). The data processing system can then calculate, for each of a plurality of the path type associated with the identified visitor identifiers, a counterfactual gain for each event based on a conversion probability of the given path type and a conversion probability of a path type that does not include the event for which the counterfactual gain is calculated (BLOCK 420). The data processing system can then determine an attribution credit for each event of each of the plurality of path types (BLOCK 425). The data processing system then can store, for each of a plurality of the path types associated with the identified paths, the determined attribution credit for each event included in the path type (BLOCK 430).

In further detail, the data processing system can identify, for a given time period, a plurality of visits to a particular website (BLOCK 405). In some implementations, the data processing system can identify a plurality of visits to the website over a given time period. In some implementations, the time period can be based on the amount of traffic the website receives over the given time period. In some implementations, the time period can be based on the number of visits to be analyzed. In some implementations, the number of visits to be analyzed can be 1000 visits to over 10 million visits. In some implementations, the data processing system can be configured to identify a plurality of visits to the website by retrieving the visit related entries from a database in which visit related information is stored. The data processing system can be configured to request, from the database, a predetermined number of visit related entries that correspond to a given time period. In some implementations, the data processing system can identify a plurality of visits from a database storing entries including visit related information associated with the plurality of visits. In some implementations, one or more of the entries includes a visitor identifier identifying a visitor device associated with the visit, a conversion indication indicating whether or not a conversion occurred during the visit, or a media exposure corresponding to an event through which the visit to the website occurred.

The data processing system can then identify, for each visitor identifier associated with the identified plurality of visits, a path associated with the visitor identifier (BLOCK 410). In some implementations, a visitor identifier is associated with each visit to the website. The visitor identifier can be specific to a particular visitor device. As the visitor identifier visits the website multiple times, the multiple visits results in the creation of a path associated with the visitor identifier. The path can include one or more events. Each event can provide information regarding how the visitor arrived at the website during the visit to which the event corresponds. The event can identify a source indicating a website from where the visitor arrived at the website and a media exposure type indicating a type of media exposure to which the visitor was exposed. In some implementations, the event can be a direct visit to the website. That is, the visitor visited the website without being interacting with a media exposure. For the purposes of the present disclosure, a direct visit to the website can be regarded as a media exposure type. The sequence of the events in the path are important, as such, each of the events can have or can be associated with a corresponding index position indicating a position of the event relative to positions of other events included in the path.

In some implementations, the data processing system can identify a path associated with a given visitor identifier corresponding to one or more of the identified visits. In some implementations, the data processing system can identify the path by identifying, for the given visitor identifier, one or more entries corresponding to the given identifier. From the identified entries, sorting the entries according to a timestamp of the visit included in the entry. The data processing system can then arrange the events associated with each of the entries in ascending order starting with the entry corresponding to the earliest timestamp. In this way, the path associated with the given identifier includes the entries arranged in ascending order. In some implementations, the data processing system can determine if the amount of time between two successive events is greater than a threshold time period. In some such implementations, if the data processing system determines that the amount of time between two successive events is greater than a threshold time period, the data processing system can disregard the earlier occurring event of the two successive events and all other events preceding the earlier occurring event when identifying a path associated with the given visitor identifier. In some implementations, the data processing system can determine if the amount of time between one particular type of event and an immediate prior event (of any type) is less than a threshold time period. In some such implementations, if the data processing system determines that the amount of time between an occurrence of that particular event type and it's immediate predecessor event is less than threshold time period, the data processing system can disregard that occurrence of the particular event type when identifying a path associated with the given visitor path.

The data processing system can determine, for each path type associated with the identified visitor identifiers, a path-type conversion probability based on a number of visits corresponding to the path type that resulted in a conversion (BLOCK 415). The data processing system can be configured to determine a conversion probability for each path type. The data processing system can determine the conversion probability of a given path type by first identifying, from the plurality of identified paths, all paths that correspond to the same path type. The data processing system can then determine a total path count for each path type indicating the total number of paths specific to each path type. The data processing system can also determine a conversion path count for each path type indicating the total number of conversions specific to each path type. The conversion probability of a given path type is the ratio of the conversion path count to the total path count for the given path type.

The data processing system can then calculate, for each of a plurality of the path type associated with the identified visitor identifiers, a counterfactual gain for each event based on a conversion probability of the given path type and a conversion probability of a path type that does not include the event for which the counterfactual gain is calculated (BLOCK 420). The data processing system can be configured to calculate, for a given path type having a plurality of events, a counterfactual gain for each event included in the given path type. In some implementations, the data processing system can be configured to calculate the counterfactual gain for each event based on a conversion probability of the given path type and a conversion probability of a path type that does not include the event for which the counterfactual gain is calculated.

The data processing system can be configured to calculate the counterfactual gains for each event included in a particular path type to determine the amount of attribution credit to assign to each of the events of the path type. The data processing system can be configured to calculate the counterfactual gain of an event of a given path type by first identifying, for the given path type, a first ordered sequence of events preceding the given event and a second ordered sequence of events subsequent to the given event. In some implementations, if the event is the first event of the given path type, the data processing system does not identify a first ordered sequence of events. In some implementations, if the event is the last event of the given path type, the data processing system does not identify the second ordered sequence of events. In some implementations, the sequence of events can include one or more events. The data processing system can then identify, from the identified path types, a comparison path type that includes the first ordered sequence of events immediately followed by the second ordered sequence of events. Stated in another way, the comparison path type is identical to the given path type except that the comparison path type does not include the event for which the data processing system is calculating the counterfactual gain. The data processing system can then calculate the difference between a conversion probability of the given path type and a conversion probability of the comparison path type. The calculated difference is the counterfactual gain of the event.

In some implementations, the counterfactual gain of a particular event in a given path type can be a negative number. However, this can adversely affect how to assign attribution credit to one or more events. For instance, it is possible that the data processing system can calculate a counterfactual gain for the last event of a particular path type to be a negative number even though the last event can result in a conversion. As such, assigning a negative attribution credit to a particular event is counterintuitive. To account for the possibility of calculating a negative counterfactual gain, the data processing system can be configured to determine that a calculated counterfactual gain for a given event is less than zero. The data processing system can modify the counterfactual gain for such an event to zero in response to determining that the calculated counterfactual gain for the given event is less than zero.

The data processing system can then determine an attribution credit for each event of each of the plurality of path types (BLOCK 425). The data processing system can first determine a total gain value corresponding to the sum of the counterfactual gains corresponding to each of the events of the given path type. The data processing system can then determine the attribution credit for each of the events by determining the ratio of the counterfactual gain of a given event to the total gain value. The data processing system can then assign the determined attribution credit to each event in the given path type for which counterfactual gains are calculated. In some implementations, in the event that the total gain value is zero, the data processing system can assign each event in the path an attribution credit according to a fallback attribution model. In some implementations, the fallback attribution model can be a last-click attribution model. In some implementations, the fallback attribution model can be one that assigns each event an equal amount of attribution credit.

The data processing system can store, for each of a plurality of the path types associated with the identified paths, the determined attribution credit for each event included in the path type (BLOCK 430). In some implementations, the data processing system can store the determined attribution credits of each event of a given path type as a single attribution rule. In this way, the data processing system can store a plurality of the attribution rules to create an attribution model based on the conversion probabilities of various path types. In some implementations, the data processing system can store the attribution rules created from the determined attribution credits in such a way that the data processing system can access the attribution rules at a later time to assign attribution credits to events of a path type that resulted in a conversion.

In some implementations, once the data processing system has created an attribution model using a plurality of the attribution rules, the data processing system can be configured to assign attribution credits to various events of a given path that resulted in a conversion. To do so, the data processing system can first identify a path type of the path that converted. The data processing system can then use the attribution rule corresponding to the identified path type to assign attribution credits to each of the events of the identified path.

In some implementations, the data processing system can be configured to maintain statistics for one or more content publishers. In some implementations, once the data processing system has assigned attribution credits to each of the events of a path, the data processing system can update a conversion table of the website that maintains a tally of the attribution credits associated with various events by adding the attribution credits associated with each of the events to the existing totals of the corresponding events.

B. Methods and Systems for Creating Rules for an Attribution Model Based on Historical Data Associated with Visits to the Website The data-driven attribution model briefly described above relies on the use of prior conversion paths of visitors to assign attribution credits to deserving media exposures. The attribution model includes a plurality of rules for assigning attribution credit to events of a given path type. Each of the rules can be unique to a given path type. For a given path type having more than one event, an attribution credit for each of the events included in the given path type can be determined by calculating counterfactual gains for each event as described in Section A. The counterfactual gains are calculated based on a conversion probability of the given path type and a conversion probability of a path type that does not include the event for which the counterfactual gain is calculated.

The attribution model's reliance on calculating a counterfactual gain for each event of a given path type raises challenges not previously acknowledged. One of the challenges in creating such an attribution model is allocating or managing resources for computing the counterfactual gains for each event included in each path type that a visitor may take. For example, to calculate the counterfactual gains for each event of a path type that has 5 events, the data processing system can determine the conversion probability of the path type that has 5 events as well as the conversion probability of at least 4 different path types that have 4 events that include the same events in order of the 5 path type except for the event for which the counterfactual gain is to be calculated. Depending on the number of events in a path, the computation can be quite resource intensive. As such, it may be desirable to create a data-driven attribution model relying on calculating a counterfactual gain for each event of a given path type that balances accuracy with resource utilization.

As described above, the new attribution model relies on determining conversion probabilities of path types based on paths taken by visitors of a particular website. One challenge in creating an attribution model that relies on determining conversion probabilities of path types is the amount of data that would need to be processed to be able to reliably determine conversion probabilities as well as counterfactual gains for each event included in the plurality of path types for which attribution credit is to be assigned. The amount of data that may need to be processed can be based on the total number of paths to the website, the number of events in each of the paths and the number of different types of paths, amongst others. Although having more data be processed may help achieve greater accuracy in calculating conversion probabilities for each of the path types, it can be desirable to balance the need for greater accuracy with the amount of computational resources utilized.

As such, aspects of the present disclosure also relate to methods and systems for processing data to accurately determine conversion probabilities of path types while efficiently utilizing computational resources. In this regard, the present disclosure provides methods and systems for creating rules for the attribution model that balances accuracy with computational resource requirements.

Referring again to FIG. 1, the rule creation module 125 of the data processing system 110 can be configured to perform aspects of the data-driven attribution model creation module 120. In some implementations, the rule creation module 125 can be a part of the data-driven attribution model creation module 120. In some implementations, the rule creation module 125 can be configured to identify a plurality of conversions made by visitors at a particular website. In some implementations, the rule creation module 125 can be configured to identify a plurality of conversions that occurred within a given time period. In some implementations, the given time period can be based on a request from an advertiser. In some implementations, the time period can be based on the amount of traffic the website receives over the given time period. In some implementations, the time period can be based on the number of visits to be analyzed. In some implementations, the rule creation module 125 can be configured to identify a plurality of conversions by retrieving visit related entries from a database in which visit related information of the website is stored, such as the database 140. The rule creation module 125 can be configured to request, from the database, a plurality of conversions that took place at the website within a given time period.

The rule creation module 125 can identify, for each identified conversion of the plurality of conversions, a path associated with the conversion. The path can identify one or more events and a corresponding index position indicating an event's position relative to other events of the path. The path is specific to a particular visitor identifier identifying a visitor device. The path represents a sequence of events that resulted in visits to the website by the visitor device. The events can correspond to interactions by the visitor device and media exposures corresponding to the website. In some implementations, the rule creation module 125 can identify a path associated with the conversion by requesting information from a database that stores visit related information relating to visits to the website.

In some implementations, the rule creation module 125 can determine the path associated with a conversion by identifying, for the visitor identifier associated with the conversion, one or more previous visits to the website. Upon identifying previous visits to the website, the rule creation module 125 can then arrange the previous visits in chronological order according to their timestamps indicating a time at which the visitor visited the website. In some implementations, the rule creation module 125 can determine if a time period between two successive visits to the website exceeds a threshold time period. If the time period between the two successive visits exceeds the threshold time period, the rule creation module 125 can disregard all visits preceding the later of the two successive visits. The threshold time period can be predetermined. In some implementations, the threshold time period can range from a few hours to a few months. In some implementations, the rule creation module 125 can determine if the amount of time between one particular type of event and an immediate prior event (of any type) is less than a threshold time period. In some such implementations, if the data-rule creation module 125 determines that the amount of time between an occurrence of that particular event type and it's immediate predecessor event is less than threshold time period, rule creation module 125 can disregard that occurrence of the particular event type when identifying a path associated with the given visitor path.

In some implementations, the rule creation module 125 can be configured to identify, from the identified paths or corresponding conversions, a plurality of path types associated with each of the identified conversions. Each path type is characterized by a particular sequence of events. In some implementations, the rule creation module 125 can identify a conversion count associated with each path type. The conversion count of a given path type is a number of conversions from the identified conversions that correspond to the given path type.

The rule creation module 125 can further be configured to identify a subset of path types that are to be rewritten. In some implementations, the rule creation module 125 can identify the subset of path types to be rewritten according to a path rewriting policy. The path rewriting policy can include one or more rules for identifying path types to be rewritten as well as the manner in which the identified path types are to be rewritten.

In some implementations, the path rewriting policy can include one or more rules for rewriting paths such that one or more different paths can be treated the same when determining attribution credits for the events included in the paths. In some implementations, the path rewriting policy can include one or more rules to simplify one or more path types.

In some implementations, the path rewriting policy can be configured to rewrite path types having a path length greater than a threshold number of events. In some implementations, a path length of one or more of the paths can exceed a threshold number of events. The path length of a path is the number of events included in the path before the path resulted in a conversion. For such paths that have a path length that exceeds a threshold number of events, it may be desirable to assign attribution credits to only a subset of the events included in the paths. Imagine a path having 50 events that spans 2 months of activity—it is unlikely that each and every event of the 50 events deserves attribution credit, and even if each of the events do, the amount of attribution credit the events deserve may be so insignificant that it can be ignored when assigning attribution credits to events. As such, it makes sense to disregard some of the events of paths that have a path length that exceeds a threshold number of events. However, determining which events to disregard can be difficult. Accordingly, the rule creation module 125 can rewrite paths to include events to assign attribution credit, while disregarding events for which to not assign attribution credit. In some implementations, the threshold number of events can range from 3-10. In some implementations, the threshold number of events can be based on the total number of conversions per path type.

In some implementations, the path rewriting policy can include two parameters, a first subset length and a second subset length. For every path where the path length is greater than the sum of the first subset length and a second subset length, the path is rewritten by introducing a dummy variable in between the events corresponding to the first subset length and the events corresponding to the second subset length. In some implementations, the first subset length can be one and the second subset length can be two. The dummy variable, represented herein as 'ANY', can be a token that represents one or more events of any type and is assigned an attribution credit of zero. For example, a first path may correspond to paid search-email-paid search-social network-referral-email. The first path may be rewritten as paid search-ANY-referral-email. In another example, a second path may correspond to paid search-email-social network-paid search-email-paid search-referral-email. The second path, similar to the first path, may be rewritten as paid search-ANY-referral-email.

In some implementations, the rule creation module 125 can be configured to determine that one or more path types corresponding to the identified conversions are not statistically significant. In some implementations, the rule creation module 125 can arrange the path types in order of decreasing frequency. Upon arranging the path types in order of decreasing frequency, the rule creation module can remove all path types whose cumulative frequency is less than a threshold frequency. In some implementations, the threshold frequency can be determined to be a percentage of the overall number of conversions identified. As such, if the overall number of conversions is 10 million, the threshold frequency can range from 100,000 for a 99% inclusion rate to 1 million for a 90% inclusion rate. In some implementations, the threshold frequency can bet set to any predetermined inclusion rate.

In some implementations, the rule creation module 125 can also remove any path type that has a frequency that is less than a threshold frequency amount. In some implementations, the threshold frequency amount can be based on the overall number of conversions identified. For example, the threshold frequency amount can be 1000 conversions.

In some implementations, the rule creation module 125 can further be configured to determine the attribution credit for each of the events of the path. The rule creation module 125 can utilize the process for determining attribution credits for events of a path described with respect to Section A. In brief detail, the rule creation module can be configured to determine the attribution credit for each of the events of the path by determining the conversion probabilities of each path type and then determining the attribution credit for each event by calculating the counterfactual gain of the event for which the attribution credit is being determined.

In some implementations, the rule creation module 125 can create a plurality of rules corresponding to the path types for which attribution credits are determined. In some implementations, the rule creation module 125 can create an associative array that includes one or more of the created rules. The associative array can include a key that corresponds to a path type associated with the conversions. As such, each entry in the array can correspond to a unique path type and can be considered a single attribution rule. For instance, after processing 10 million conversions, the rule creation module 125 can include an attribution rule for the path 'paid search'-'email'-'paid search' that has a frequency of 34,222. That is, of the 10 million conversions identified by the rule creation module, the attribution rule corresponding to the path 'paid search'-'email'-'paid search' led to 34,222 conversions.

In some implementations, the rule creation module 125 can include rules corresponding to the rewritten paths. In this way, the associative array does not include rules corresponding to paths that have path lengths that exceed the threshold number of events. In some implementations, the associative array can also keep track of the number of conversions that correspond to each of the rules. In some implementations, the rule creation module can associate conversions belonging to multiple paths that correspond to a single rewritten path as conversions of the single rewritten path. In this way, multiple paths that do not have a high number of conversions but can be treated similarly can be rewritten in such a way so as to be associated with a single rewritten path.

In some implementations, each of the rules created by the rule creation module 125 includes the attribution credits determined according to the process described in Section A. These attribution credits correspond to each of the events of the given path type with which the rule is associated. For those path types for which a rule has not been created or for which attribution credits to the constituent events cannot be assigned, attribution credits can be assigned according a fallback attribution model, such as last click attribution. In some implementations, the attribution credits can be assigned according to a configurable attribution model selected by an advertiser or other entity, for example, an attribution model in which the first event and the last event each get 25% of the attribution credit while the remaining 50% is shared amongst the other events of the path type.

Figure 5:
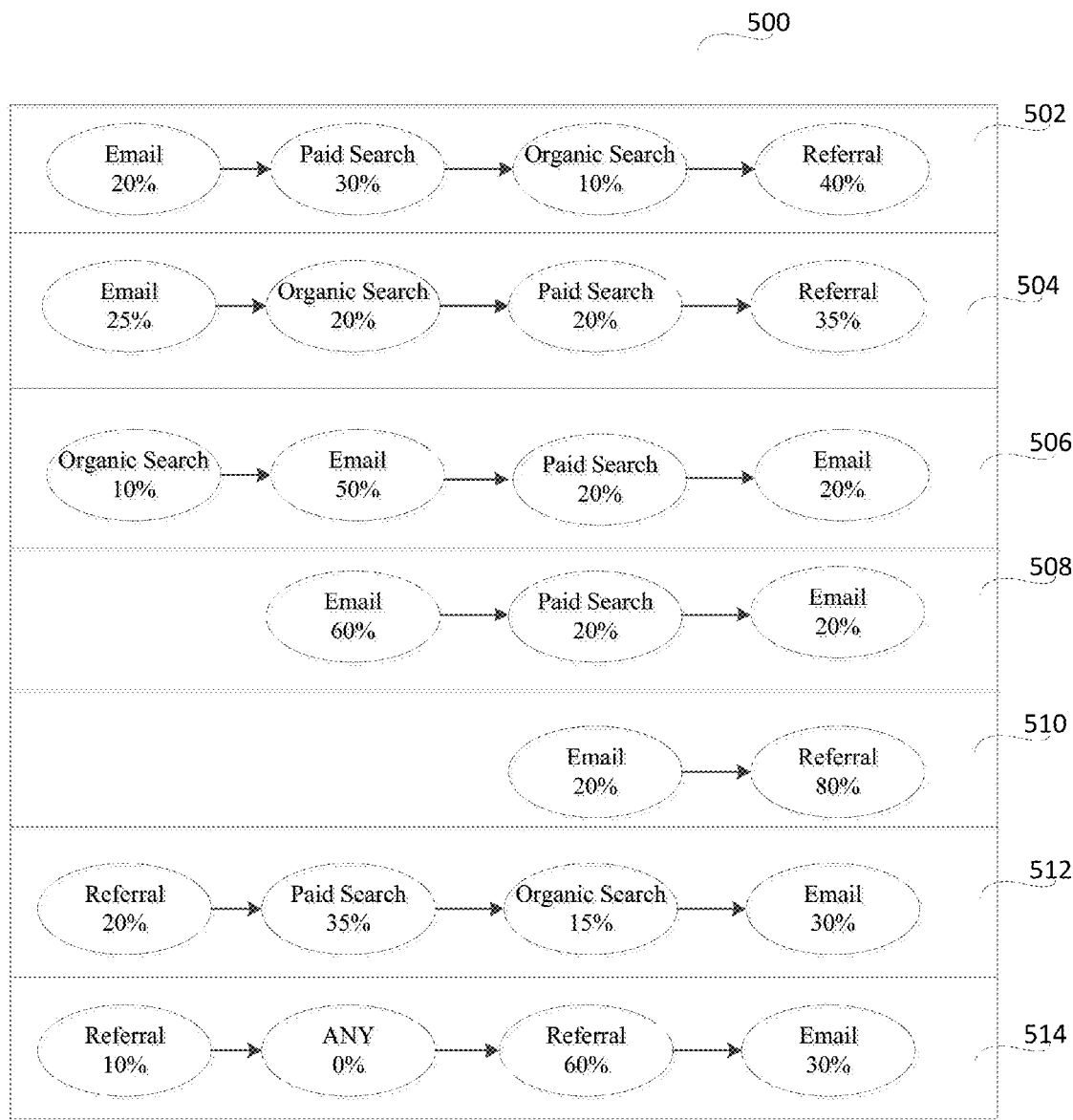
FIG. 5 shows a portion of an associative array including a plurality of rules that comprise a data-driven attribution model.

FIG. 5 shows a portion of an associative array including a plurality of rules that comprise a data-driven attribution model. The associative array 500 includes a plurality of rules 502-514, each of which corresponds to a particular path type. Each path type includes a sequence of events. Each event in the path type is assigned an attribution credit value. The sum of the attribution credit values of each of the events of a particular path type is equal to 100%.

The associative array 500 can be stored in a database, such as the database 140. The data processing system 110 can access the associative array 500 to determine how to assign attribution credit for a given path type. In the event that a conversion occurs at the website, the data processing system 110 can be configured to identify a path type associated with the conversion. The data processing system 110 can then match the identified path type with a rule included in the associative array 500. If the data processing system 110 determines that the path type matches a rule of the associative array, the data processing system assigns attribution credit to the events of the path corresponding to the conversion in accordance with the assigned attribution credit associated with the rule of the associative array. If the data processing system 110 determines that the path type does not match a rule of the associative array, the data processing system 110 assigns attribution credit to the events of the path corresponding to the conversion in accordance with a fallback attribution model, such as last click attribution.

It should be understood that the greater the number of rules included in the associative array, the more likely a conversion path is likely to match a rule in the associative array, thereby reducing the time in which attribution credits can be assigned to each of the events of the conversion path. However, to generate a greater number of rules, the rule creation module 125 has to employ greater computational resources to process the identified plurality of conversions and determine the attribution credits for each event of each rule. Moreover, as the data-driven attribution model is more accurate than any fallback attribution model employed by the data processing system 110, there is a loss of accuracy in assigning attribution credits according to a fallback attribution model in the event of a conversion. As such, in an attempt to reduce the utilization of computational resources by generating a fewer number of rules, the data processing system is also reducing the accuracy in which attribution credits are assigned to events of the conversion path.

Figure 6:
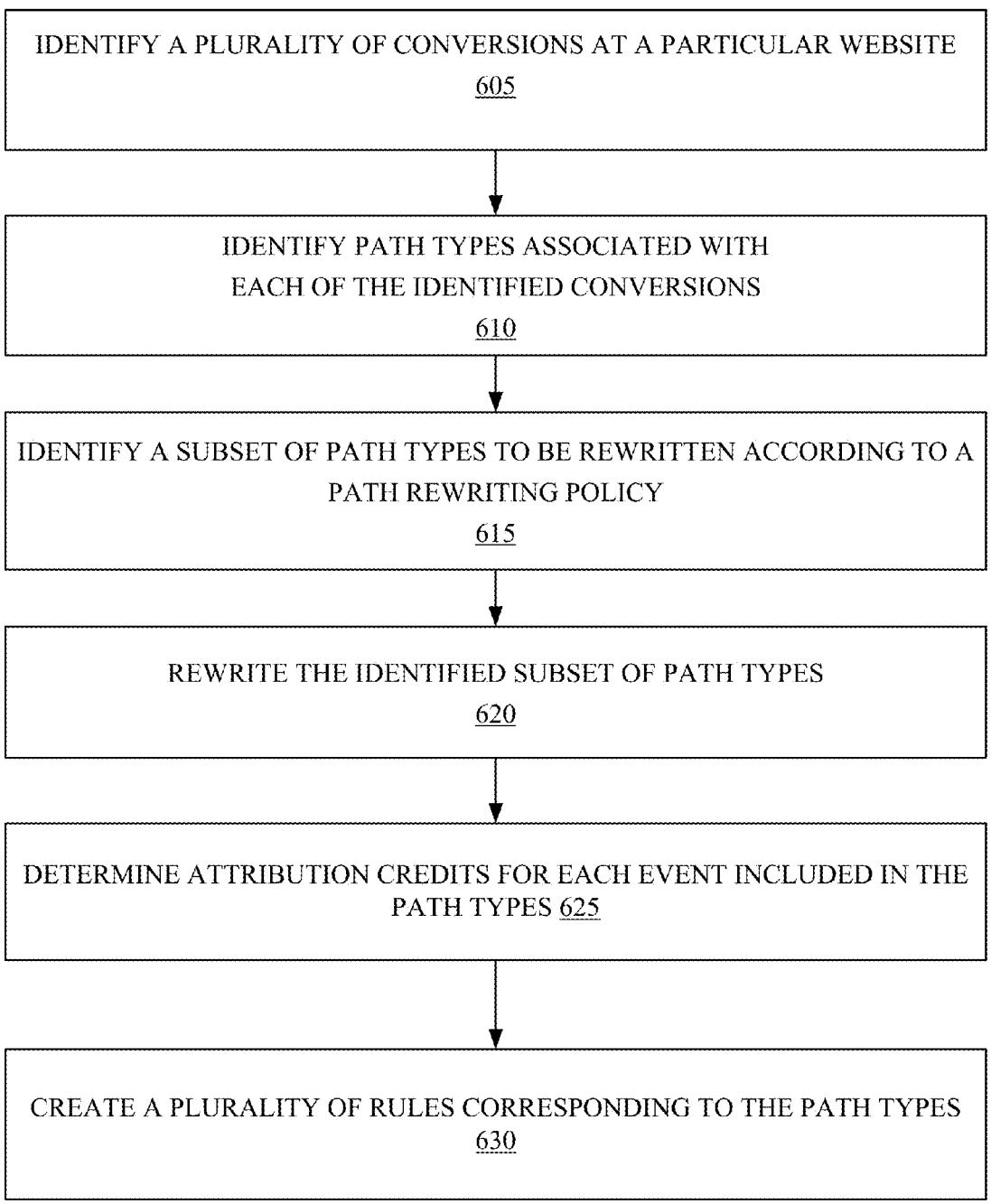
FIG. 6 is a flow diagram depicting one implementation of the steps taken to create rules for a data-driven attribution model that assigns attribution credit across a plurality of events included in a conversion path.

FIG. 6 is a flow diagram depicting one implementation of the steps taken to create rules for a data-driven attribution model that assigns attribution credit across a plurality of events included in a conversion path. In particular, FIG. 6 is a flow diagram depicting one implementation of the steps taken to create rules for assigning attribution credit across a plurality of events. The data processing system can identify a plurality of conversions made by visitors of a particular website (BLOCK 605). The data processing system can identify path types associated with the identified conversions (BLOCK 610). The data processing system can then identify a subset of the identified path types to be rewritten according to a path rewriting policy (BLOCK 615). The data processing system can then rewrite the identified subset of the identified path types according to the path rewriting policy as rewritten path types (BLOCK 620). The data processing system can determine, for each of the rewritten path types and remaining identified path types associated with the identified conversions, attribution credits for each event included in the path type (BLOCK 625). The data processing system can then create, for each of the rewritten path types and remaining identified path types associated with the identified conversions, a rule for assigning the determined attribution credit to each event of the path type for which the rule is created (BLOCK 630).

In further detail, the data processing system can identify a plurality of conversions at a particular website (BLOCK 605). In some implementations, the data processing system can be configured to identify a plurality of conversions that occurred at the website within a given time period. In some implementations, the given time period can be based on a request from an advertiser. In some implementations, the time period can be based on the amount of traffic the website receives over the given time period. In some implementations, the time period can be based on the number of visits to be analyzed. In some implementations, the data processing system can be configured to identify a plurality of conversions by retrieving visit related entries from a database in which visit related information of the website is stored. The data processing system can request, from the database, a plurality of conversions that took place at the website within a given time period. In some implementations, the data processing system can identify a plurality of conversions at a particular website by retrieving, from a website log, visit related data associated with conversions at the website.

The data processing system can identify path types associated with the identified conversions (BLOCK 610). Each path type is characterized by a particular sequence of events. In some implementations, the data processing system can identify a conversion count associated with each path type. The conversion count of a given path type is a number of conversions from the identified conversions that correspond to the given path type. The data processing system can identify path types by identifying, for each conversion, a visitor identifier associated with the conversion. The data processing system can then identify qualifying visits to the website prior to the conversion. A qualifying visit can include any previous visit that occurs within a threshold amount of time before a given visit. In this way, if the threshold amount of time is 1 day, any visit that occurs less than 1 day before a given visit is a qualifying visit. In some implementations, the data processing system can then identify, for each qualifying visit, an event through which the visitor visited the website. Examples of events include a user's interaction with any of a plurality of media exposures, such as a paid search ad, a display ad, a social network post, an email ad, a direct visit, amongst others. The data processing system can then arrange events that resulted in the qualifying visits in chronological order.

The data processing system can then identify a subset of the identified path types to be rewritten according to a path rewriting policy (BLOCK 615). The path rewriting policy can include one or more rules for identifying path types to be rewritten as well as the manner in which the identified path types are to be rewritten. In some implementations, the path rewriting policy can include one or more rules for rewriting paths such that one or more different paths can be treated the same when determining attribution credits for the events included in the paths. In some implementations, the path rewriting policy can include one or more rules to simplify one or more path types. In some implementations, the path rewriting policy can be configured to rewrite path types having a path length greater than a threshold number of events. In some implementations, a path length of one or more of the paths can exceed a threshold number of events. The path length of a path is the number of events included in the path before the path resulted in a conversion.

In some implementations, the data processing system can then identify a subset of the identified path types to be rewritten by identifying path types that have a path length that exceeds a threshold number of events. In some implementations, the data processing system can identify paths that have a sequence of repeating events to be rewritten as well. For example, a path type that includes 6 "Direct" events in a row can be identified to be rewritten according to the path rewriting policy.

The data processing system can then rewrite the identified subset of the identified path types according to the path rewriting policy as rewritten path types (BLOCK 620). The data processing system can rewrite the identified subset of the identified path types as rewritten path types by first determining, for a given path of the identified subset, that the path has a path length greater than a threshold number of events. The data processing system can then identify, for the given path, a first number of events of the given path corresponding to a first set of events that resulted in a visit to the website and a second number of events corresponding to a second set of events of the given path immediately preceding the conversion. The data processing system can then identify one or more events of the given path that are not identified as the first number of events and not identified as the second number of events, as remaining events. The data processing system can then replace the remaining events of the given path with a dummy variable that is not assigned any attribution credit.

In some implementations, the data processing system can rewrite path types that have a path length that exceeds a threshold number of events by keeping a portion of the events while removing the other events included in the path type. The events to keep and remove may be selected based on conversion path trends. In some implementations, the data processing system can arrange all path types according to the last event preceding the conversion event. The data processing system can then further arrange the path types according to the last two events preceding the conversion event, and so forth. The data processing system can then determine whether to merge one or more path types that have a portion of events just preceding the conversion sequence of events by rewriting the path types to disregard events that are not common to the one or more merging path types.

In some implementations, the data processing system can determine that a path type is not sufficiently significant. The data processing system can then remove the path type from the identified path types for which a rule for assigning attribution credit is created in response to determining that the path type is not sufficiently significant. In some implementations, the data processing system can determine that a path type is not sufficiently significant by first identifying a number of conversions associated with the path type. The data processing system can then identify path types having a number of conversions less than a threshold. The data processing system can remove the identified path types that have a number of conversions that are less than the threshold.

In some implementations, the data processing system can determine that a path type is not sufficiently significant by identifying, for each path type, a number of conversions associated with the path type. The data processing system can then identify a threshold frequency based on a number of conversions identified. In some implementations, the threshold frequency can be 1% of the number of conversions identified (see BLOCK 605). The data processing system can then remove path types in ascending order of the identified number of conversions associated with the path type until the number of conversions removed exceeds the threshold frequency. In some implementations, the data processing system can remove path types starting with the path type having the lowest frequency.

The data processing system can determine, for each of the rewritten path types and remaining identified path types associated with the identified conversions, attribution credits for each event included in the path type (BLOCK 625). In some implementations, the data processing system can utilize the process for determining attribution credits for events of a path described with respect to Section A. In brief detail, the data processing system can determine the attribution credit for each of the events of the path by determining the conversion probabilities of each path type and then determining the attribution credit for each event by calculating the counterfactual gain of the event for which the attribution credit is being determined.

The data processing system can then create, for each of the rewritten path types and remaining identified path types associated with the identified conversions, a rule for assigning the determined attribution credit to each event of the path type for which the rule is created (BLOCK 630). In some implementations, the data processing system can create an associative array that includes one or more of the created rules. The associative array can include a key that corresponds to a path type associated with the conversions. As such, each entry in the array can correspond to a unique path type and can be considered a single attribution rule.

In some implementations, the data processing system can include rules corresponding to the rewritten paths. In this way, the associative array does not include rules corresponding to paths that have path lengths that exceed the threshold number of events. In some implementations, the associative array can also keep track of the number of conversions that correspond to each of the rules. In some implementations, the data processing system can associate conversions belonging to multiple paths that correspond to a single rewritten path as conversions of the single rewritten path. In this way, multiple paths that do not have a high number of conversions but can be treated similarly can be rewritten in such a way so as to be associated with a single rewritten path.

In some implementations, the rules created by the data processing system include the determined attribution credits. These attribution credits correspond to each of the events of the given path type with which the rule is associated. For those path types for which a rule has not been created or for which attribution credits to the constituent events cannot be assigned, attribution credits can be assigned according a fallback attribution model, such as last click attribution. In some implementations, the attribution credits can be assigned arbitrarily such that the first event and the last event each get 25% of the attribution credit while the remaining 50% is shared amongst the other events of the path type.

In some implementations, the data processing system can receive a request to assign attribution credit to a plurality of events of a given path type. The data processing system can determine that the given path type does not match any of the created rules. The data processing system can then assign an attribution credit to each of the plurality of events included in the identified path according to a fallback attribution model that is different from an attribution model used to assign attribution credits for events of path types for which a rule is created. In some implementations, the fallback attribution model is a last click attribution model. In some implementations, the fallback attribution model can be any other attribution model.

C. Methods and Systems for Measuring Conversion Probabilities of a Plurality of Path Types for an Attribution Model The data-driven attribution model described herein relies on the use of prior conversion paths of visitors to determine conversion probabilities of various path types. Based on the conversion probabilities of the various path types, counterfactual gains can be calculated for each event of a given path type, which can be used to determine and assign attribution credits to events of the given path type. For a given path type having more than one event, an attribution credit for each of the events can be determined by calculating counterfactual gains for each event. The counterfactual gains are calculated based on a conversion probability of the given path type and a conversion probability of a path type that does not include the event for which the counterfactual gain are calculated. Accurately calculating the conversion probability of various path types can be quite challenging.

To determine attribution credit using the data-driven attribution model described herein, a methodology that can measure a website visitor's propensity to convert as a function of multiple events as well as the order of those events is needed. The methodology should be able to discern a website visitor's propensity to convert as a function of number of events, types of events, and the relative order in which the events occur is needed. For example, a methodology that is able to discern between a website visitor's propensity to convert after an i) event via an email campaign click only; ii) an event via an email campaign click followed by a paid advertisement click; and iii) an event via a paid ad click followed by email campaign click.

As such, aspects of the present disclosure relate to methods and systems for measuring conversion probabilities of a plurality of path types to create the data-driven attribution model. Referring again to FIG. 1, the conversion probability determination module 130 of the data processing system can be configured to determine conversion probabilities of a plurality of path types.

The conversion probability determination module 130 can be configured to identify a plurality of paths taken by visitors to visit a particular website. As described above, a path corresponds to a sequence of events. Each event can correspond to a media exposure or marketing touchpoint through which the visitor exposed to the media exposure visits the website. In some implementations, the event corresponds to an interaction between the visitor and the media exposure, for example, a click on a paid search ad, an email ad, a social networking post, or entering a web address of the website in a web browser.

To determine a more accurate conversion probability, the conversion probability determination module 130 can be configured to identify one or more subpaths associated with each of the identified plurality of paths. A subpath is a path corresponding to a previous visit of the visitor to the website. For example, a path 'Paid Search'-'Email'-'Referral' that results in a conversion can be associated with two subpaths 'Paid Search' and 'Paid Search-'Email'. The conversion probability determination module 130 can treat the identified subpaths as paths for the purposes of counting a number of converting paths and a number of non-converting paths.

One of the challenges in identifying subpaths associated with each of the identified plurality of paths is the resource consumption needed to perform such a function. Imagine if the number of identified paths is 10 million and 2 million of them have ten or more events prior to a conversion. The number of subpaths that can be derived from the 10 million paths can be significantly larger than the 10 million initially identified paths. As such, in some implementations, the conversion probability determination module 130 can apply a path rewriting policy to rewrite one or more of the identified paths. In some implementations, the conversion probability determination module 130 can rewrite paths that have a path length greater than a threshold number of events. Details of rewriting the paths are provided above with respect to the rule creation module described above in Section B.

The conversion probability determination module 130 can be configured to determine if a given path or subpath is a converting path or a non-converting path. A converting path is a path in which the visitor performs a converting act during the visit that resulted from the last event of the particular path. Conversely, a non-converting path is a path in which the visitor does not perform a converting act during the visit that resulted from the last event of the particular path. Using the example above, the path 'Paid Search'-'Email'-'Referral' is a converting path, while the subpaths 'Paid Search' and 'Paid Search-'Email' are non-converting paths. In some implementations, once the conversion probability determination module 130 has identified all of the paths, the conversion probability determination module 130 can be configured to determine whether each of the identified paths is a converting path or a non-converting path. For the sake of clarity, the paths include both the paths initially identified by the conversion probability determination module 130 as well as subpaths derived from the initially identified paths.

In some implementations, a path can include multiple interactions that result in multiple conversions. For example, a path 'Organic Search'-'Paid Search'-'Conversion 1'-'Social'-'Email'-'Conversion 2'-'Conversion 3' corresponds to three conversions. The conversion probability determination module 130 can derive the following paths from this example path.

Subpath 1: 'Organic Search'-Not Converting.
Subpath 2: 'Organic Search'-'Paid Search'-Converting.
Subpath 3: 'Organic Search'-'Paid Search'-'Social'-Not Converting.
Subpath 4: 'Organic Search'-'Paid Search'-'Social'-'Email'-Converting.

Accordingly, the conversion probability determination module 130 can be configured to derive a single path into a four separate subpaths of which two of them are converting paths and the other two are non-converting paths.

The conversion probability determination module 130 can also be configured to determine a conversion path count for a given path type. The conversion path count indicates a number of times a given path has resulted in a conversion at the website. In some implementations, the conversion probability determination module 130 can determine a separate conversion path count for each path type. Moreover, the conversion probability determination module 130 can also be configured to determine a total path count for a given path type. The total path count indicates a number of times a given path has resulted in a conversion or failed to result in a conversion. The conversion probability determination module 130 can determine a separate total path count for each given path type.

The conversion probability determination module 130 can be configured to calculate, for each of the path types, a conversion probability indicating a likelihood of conversion of a particular path type. The conversion probability can be based on the ratio of the conversion path count of the given path type to the total path count of the same path type.

The conversion probability determination module 130 can be configured to use or share the conversion probability of one or more path types to calculate counterfactual gains for events included in the path type and to determine attribution credits for each of the events included in the path type. In some implementations, the conversion probability determination module 130 can determine the counterfactual gains and attribution credits for events according to the methods and systems described above with respect to section a. In some implementations, the conversion probability determination module 130 can be configured to share the conversion probabilities of the various path types with the data-driven attribution model creation module 120 for use in creating a data-driven attribution model that uses counterfactual gains to assign attribution credit to events included in a given path.

Figure 7:
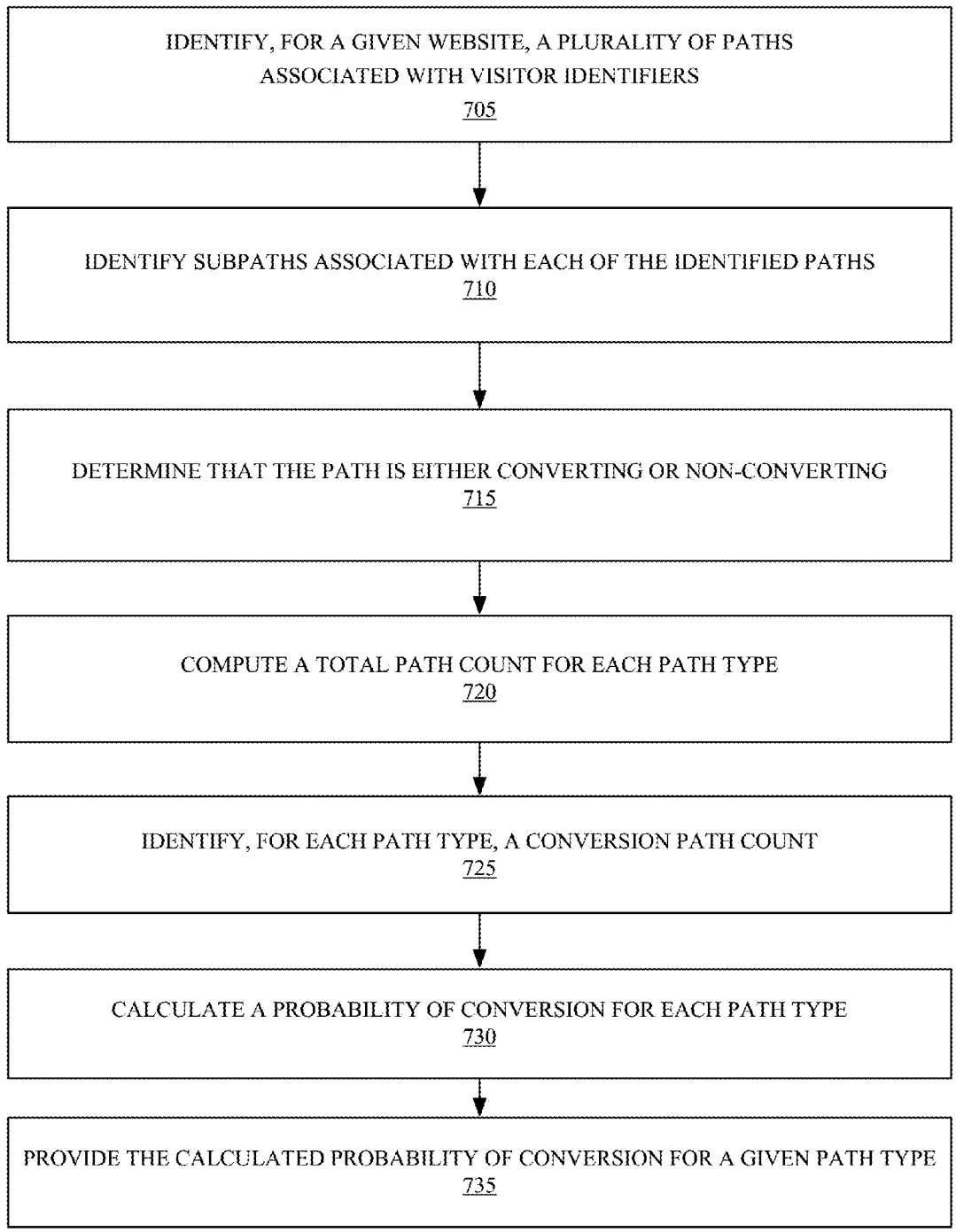
FIG. 7 is a flow diagram depicting one implementation of the steps taken to measure conversion probabilities of a plurality of path types to create the data-driven attribution model.

FIG. 7 is a flow diagram depicting one implementation of the steps taken to measure conversion probabilities of a plurality of path types to create the data-driven attribution model. The data processing system can identify a plurality of paths associated with visitor identifiers corresponding to one or more visits to a particular website (BLOCK 705). The data processing system can identify one or more subpaths associated with each of the identified plurality of paths (BLOCK 710). The data processing system can determine if a given path or subpath is a converting path or a non-converting path. (BLOCK 715). The data processing system can then determine a conversion path count for a given path type (BLOCK 720). The data processing system can determine a total path count for a given path type (BLOCK 725). The data processing system can then calculate, for each of the path types, a conversion probability indicating a likelihood of conversion of a particular path type (BLOCK 730). The data processing system can then provide the conversion probability of one or more path types to calculate counterfactual gains for events included in the path type and to determine attribution credits for each of the events included in the path type (BLOCK 735).

In further detail, the data processing system can identify a plurality of paths associated with visitor identifiers corresponding to one or more visits to a particular website (BLOCK 705). In some implementations, the data processing system can maintain a website log that stores visit related information associated with visits to the website. In some implementations, the data processing system can identify a plurality of paths associated with visit The data processing system can identify one or more subpaths associated with each of the identified plurality of paths (BLOCK 710). A subpath is a path corresponding to a previous visit of the visitor to the website. For example, a path 'Paid Search'-'Email'-'Referral' that results in a conversion can be associated with two subpaths 'Paid Search' and 'Paid Search-'Email'. The data processing system can treat the identified subpaths as paths for the purposes of counting a number of converting paths and a number of non-converting paths.

The data processing system can determine if a given path or subpath is a converting path or a non-converting path. (BLOCK 715). A converting path is a path in which the visitor performs a converting act during the visit that resulted from the last event of the particular path. Conversely, a non-converting path is a path in which the visitor does not perform a converting act during the visit that resulted from the last event of the particular path. Using the example above, the path 'Paid Search'-'Email'-'Referral' is a converting path, while the subpaths 'Paid Search' and 'Paid Search-'Email' are non-converting paths. In some implementations, once the data processing system has identified all of the paths, the data processing system can be configured to determine whether each of the identified paths is a converting path or a non-converting path. For the sake of clarity, the paths include both the paths initially identified by the data processing system as well as subpaths derived from the initially identified paths.

The data processing system can also determine a conversion path count for a given path type (BLOCK 720). The conversion path count indicates a number of times a given path has resulted in a conversion at the website. In some implementations, the data processing system can determine a separate conversion path count for each path type.

Moreover, the data processing system can determine a total path count for a given path type (BLOCK 725). The total path count indicates a number of times a given path has resulted in a conversion or failed to result in a conversion. The data processing system can determine a separate total path count for each given path type.

The data processing system can calculate, for each of the path types, a conversion probability indicating a likelihood of conversion of a particular path type (BLOCK 730). The conversion probability can be based on the ratio of the conversion path count of the given path type to the total path count of the same path type.

The data processing system can provide the conversion probability of one or more path types to calculate counterfactual gains for events included in the path type and to determine attribution credits for each of the events included in the path type (BLOCK 735). In some implementations, the data processing system can be configured to use the conversion probability of one or more path types to calculate counterfactual gains for events included in the path type. In some implementations, the data processing system can share the conversion probability of one or more path types with one or more other modules of the data processing system, including but not limited to the data-driven attribution model creation module or the rule creation module. In some implementations, the data processing system can determine the counterfactual gains and attribution credits for events according to the methods and systems described above with respect to Section A. In some implementations, the data processing system can be configured to share the conversion probabilities of the various path types with the data-driven attribution model creation module 120 for use in creating a data-driven attribution model that uses counterfactual gains to assign attribution credit to events included in a given path.

D. Methods and Systems for Automatic Content Selection Using Real-Time Conversion Probabilities of Paths As described above, the data-driven attribution model relies on the conversion probabilities of various path types to determine the amount of attribution credit an event of a given path deserves. As described herein, the conversion probabilities of the path types can help determine attribution credits for various events of a given path type. Moreover, the conversion probabilities of the various path types can be immensely valuable for content selection. For instance, marketers and advertisers can use the conversion probability of a path associated with a visitor identifier to determine a likelihood that the visitor identifier will convert in response to being exposed to a particular type of media exposure. For example, a visitor has previously visited a website twice. The visitor's first visit was through a paid search event and the second visit was through an email event. By knowing the visitor's likelihood or probability of conversion for the path "paid search-email-paid search," the advertiser can make decisions on whether to serve the visitor a paid search ad based on the visitor's likelihood of conversion for the path "paid search-email-paid search." In this way, advertisers and marketers can take advantage of the knowledge of conversion probabilities to determine whether to bid on a paid search ad and in some implementations, determine an amount to bid for the paid search ad when participating in an ad placement auction. In another example, if the website publisher knows a visitor's conversion probability, the website publisher can select content to display based on the conversion probability. For instance, if the visitor has a high conversion probability or a high likelihood that the visitor will convert during this visit, the website publisher can display content relating to products that the visitor may be interested in purchasing. Conversely, if the visitor has a low conversion probability, the website publisher can select content that may convince the visitor to convert, for example, show content that provides an additional discount in an effort to get the visitor to convert.

Aspects of the present disclosure relate to methods and systems for providing content for display based on a probability of conversion. In particular, the present disclosure relate to methods and systems for selecting content for display at a device associated with a visitor identifier based on a probability of conversion associated with the visitor identifier.

Referring again to FIG. 1, the content selection module 135 of the data processing system 110 can be configured to perform aspects of the data-driven attribution model creation module 120, the rule creation module 125 and the conversion probability determination module 130. In some implementations, the rule creation module 125 can be a part of any of the data-driven attribution model creation module 120, the rule creation module 125 and the conversion probability determination module 130. The content selection module 135 can generally be configured to select content for display at a visitor device associated with a given visitor identifier. The content selection module 135 can further be configured to provide information to one or more other modules or entities such that those modules or entities can select content for display.

The content selection module 135 can be configured to identify a visitor identifier associated with a website. In some implementations, the content selection module 135 can be configured to identify a visitor identifier in response to receiving a request for content from the visitor identifier. In some implementations, the content selection module 135 can identify a plurality of visitor identifiers associated with a given website for which an attribution model has been created or updated.

The content selection module 135 can be further configured to identify a path associated with the identified visitor identifier. As described above with respect to Sections A, B and C, the path can correspond to a sequence of one or more events through which the visitor identifier has visited the website. In some implementations, the content selection module 135 can identify a path associated with the identified visitor identifier by accessing a database that stores visit related information for the website. In some implementations, the content selection module 135 can determine a path of the visitor identifier by identifying one or more visits to the website associated with the visit identifier and arranging the visits in chronological order starting with the earliest visit. In some implementations, the path can be determined from qualifying visits, for example, visits that happened within a threshold period of time of one another.

The content selection module 135 can also be configured to identify a conversion probability of the identified path. The conversion probability of the identified path can indicate a likelihood that the visitor identifier will convert at the website. In some implementations, the content selection module 135 can identify the conversion probability by identifying a path type corresponding to the identified path and identifying the conversion probability associated with the path type. In some implementations, the content selection module can be configured to perform a lookup in a database in which the conversion probability previously determined has been stored. In some implementations, the conversion probability associated with the path type can be calculated in an offline process and stored in a database accessible by the content selection module 135. In some implementations, the conversion probability of various path types can be determined by the conversion probability determination module 130 in a manner described above with respect to Section C. In some implementations, the conversion probability of the identified path may be calculated and stored for one or more other processes, such as for creating a data-driven attribution model, as described in Section A. In some implementations, the conversion probability can be determined according to other conversion probability determination methods. In some implementations, the conversion probability of the path type to which the path is associated can be calculated in real-time according to the techniques described above in Sections A, B and C.

In some implementations, if the conversion probability of the path type is not identified, for example, because it was not previously determined and stored in the database, the content selection module 135 can be configured to identify one or more paths to which the identified path is associated. As previously described, one or more paths may be rewritten according to a path rewriting policy. Examples of some such paths can be paths that include a number of events that exceeds a threshold number of events. As such, the content section module can be configured to determine if the identified path may be associated with a rewritten path. In some implementations, the content selection module 135 can be configured to rewrite the identified path according to the path rewriting policy. In some implementations, the content selection module 135 can then use the rewritten path to identify a path type that matches the rewritten path. The content selection module 135 can then match the path type associated with the rewritten path to determine the conversion probability of the rewritten path.

The content selection module 135 can also be configured to select a content item for display based on the identified conversion probability of the path. In some implementations, the content selection module 135 can be configured to select a content item for display based on the amount of attribution credit a particular media exposure will receive in response to a conversion at the website. The amount of attribution credit a particular media exposure will receive can be determined using the data-driven attribution model described herein.

In some implementations, the content selection module 135 can be configured to determine a conversion probability of one or more possible paths that can be associated with the visitor identifier. These possible paths can include one or more additional events at the end of the sequence of events included in the path of the visitor identifier identified by the content selection module 135. For instance, if the path identified by the visitor is 'Paid Search'-'Email', the content selection module 135 can be configured to determine conditional probabilities for the paths 'Paid Search'-'Email'-'Paid Search'; 'Paid Search'-'Email'-'Email'; 'Paid Search'-'Email'-'Referral'; 'Paid Search'-'Email'-'Social'; 'Paid Search'-'Email'-'Organic'; amongst others. In some implementations, the content selection module 135 can be configured to determine conditional probabilities for the paths 'Paid Search'-'Email'-'Paid Search'-'Organic' or any other paths that include one or more events after the original events 'Paid Search'-'Email' included in the identified path. The conversion probabilities of the possible paths can allow the content selection module to select a media exposure to expose to the visitor identifier in an effort to get the visitor to convert during a subsequent visit to the website. In one example, if the path 'Paid Search'-'Email'-'Paid Search' has a conversion probability of 0.4; the path 'Paid Search'-'Email'-'Email' has a conversion probability of 0.7; and the path 'Paid Search'-'Email'-'Referral' has a conversion probability of 0.5, the content selection module 135 can be configured to select an email based media exposure to present to the visitor identifier in an effort to get the visitor to convert during a subsequent visit to the website.

In some implementations, the content selection module 135 can be configured to execute an automated bidding algorithm for one or more advertisers. The automated bidding algorithm can include one or more instructions to assist content providers, such as advertisers, in increasing the conversion rate at a website associated with the content provider. The automated bidding algorithm can be configured to modify bids of content providers based on the conversion probabilities associated with a visitor identifier for which content is being selected. For instance, using the example above, the automated bidding algorithm may increase a bid amount for an email media exposure with the expectation the visitor has a 70% chance of converting if the visitor visits the website through the email media exposure.

In some implementations, the content selection module 135 can periodically identify one or more visitor identifiers associated with a given website and store paths associated with the identified visitor identifiers in a content repository or database, such as the database 140. The content selection module 135 can periodically update the paths associated with each of the identified visitor identifiers. The content selection module 135 can then assign to each of the visitor identifiers, a conversion probability of a visitor identifier based on the path associated with the visitor identifier. As such, when a visitor identifier for which a conversion probability has previously been stored submits a request for content, the content selection module 135 can identify the conversion probability of the visitor identifier.

Figure 8:
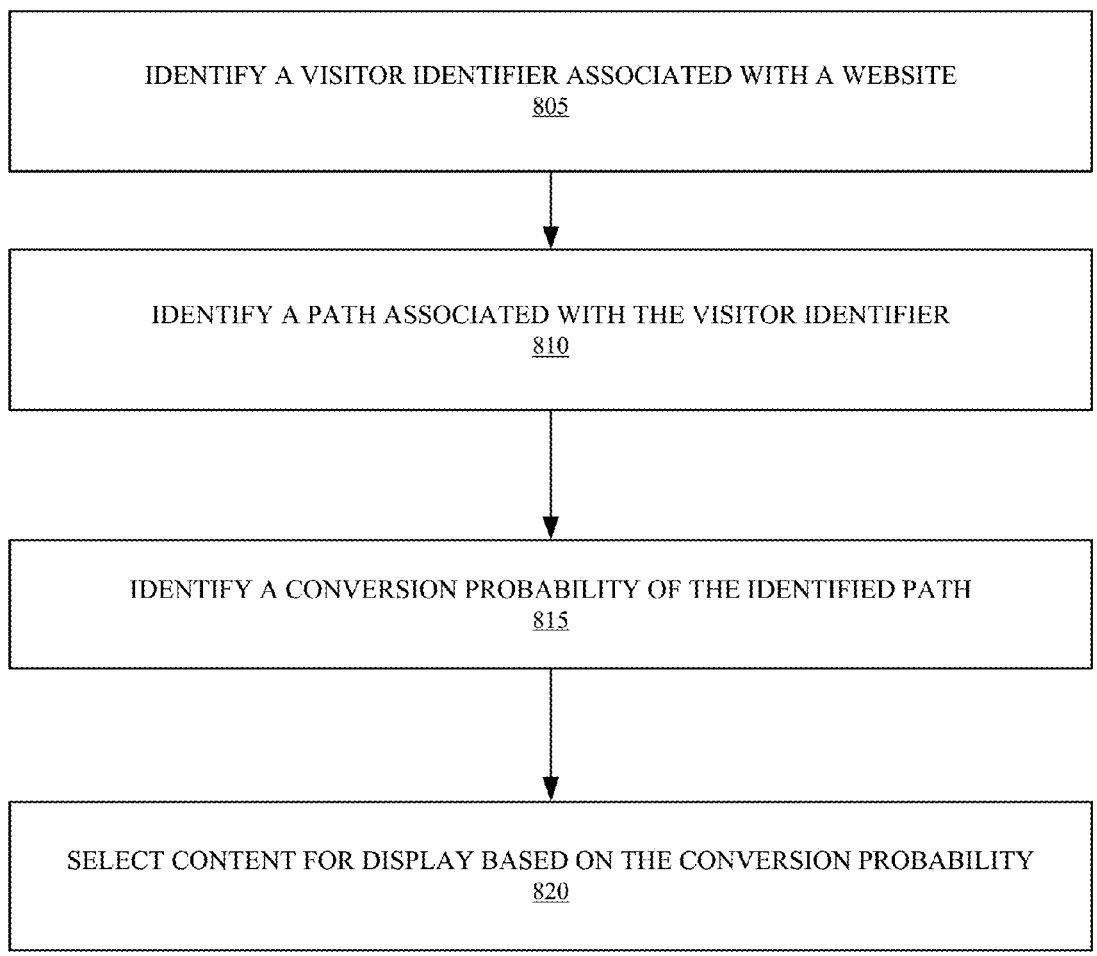
FIG. 8 is a flow diagram depicting one implementation of the steps taken to provide content for display based on a probability of conversion.

FIG. 8 is a flow diagram depicting one implementation of the steps taken to provide content for display based on a probability of conversion. In particular, the flow diagram depicts one implementation of the steps taken to select content for display at a device associated with a visitor identifier based on a probability of conversion associated with the visitor identifier. The data processing system can identify a visitor identifier associated with a website (BLOCK 805). The visitor identifier can be associated with a device on which to display content associated with the website. The data processing system can then identify a path associated with the visitor identifier (BLOCK 810). The data processing system can then identify a conversion probability of the identified path (BLOCK 815). The data processing system can then select content for display based on the conversion probability (BLOCK 820).

The data processing system can identify a visitor identifier associated with a website (BLOCK 805). The visitor identifier can be associated with a device on which to display content associated with the website. In some implementations, the data processing system can be configured to identify a visitor identifier in response to receiving a request for content associated with the visitor identifier. In some implementations, the data processing system can identify a plurality of visitor identifiers associated with a given website for which an attribution model has been created or updated. In some implementations, the data processing system can identify one or more visitor identifiers from a log of a website that stores visit related information associated with the website. In some implementations, the data processing system can identify a particular visit identifier from the website log responsive to receiving a request identifying the visit identifier. In some implementations, the request can be a request for content. In some implementations, the request can be a request to identify a conversion probability of a path associated with the visitor identifier.

The data processing system can then identify a path associated with the visitor identifier (BLOCK 810). The path can correspond to a sequence of one or more events through which the visitor identifier has visited the website. In some implementations, the data processing system can identify a path associated with the identified visitor identifier by accessing the website log that that stores visit related information for the website. In some implementations, the data processing system can determine a path of the visitor identifier by identifying one or more visits to the website associated with the visit identifier and arranging the visits in chronological order starting with the earliest visit. In some implementations, the path can be determined from qualifying visits, for example, visits that happened within a threshold period of time of one another.

In some implementations, the data processing system can periodically identify one or more visitor identifiers associated with a given website and store paths associated with the identified visitor identifiers in a content repository or database, such as the database 140. The data processing system can periodically update the paths associated with each of the identified visitor identifiers. The data processing system can then assign to each of the visitor identifiers, a conversion probability of a visitor identifier based on the path associated with the visitor identifier. As such, when a visitor identifier for which a conversion probability has previously been stored submits a request for content, the data processing system can identify the conversion probability of the visitor identifier based on an updated path associated with the visitor identifier.

The data processing system can then identify a conversion probability of the identified path (BLOCK 815). The conversion probability of the identified path can indicate a likelihood that the visitor identifier will convert at the website during the particular visit. In some implementations, the data processing system can identify the conversion probability of the identified path by identifying a path type corresponding to the identified path. Once the path type has been identified, the data processing system can retrieve a conversion probability of the path type from a database that has previously calculated the conversion probability of the path. In some implementations, the data processing system can calculate the conversion probability in real time. In either case, the conversion probability can be calculated by determining, for the website over a given time period, a ratio of the number of converting paths that match the identified path type to the total number of paths that match the identified path type. In some implementations, the data processing system can determine a conversion path count indicating a number of converting paths that match the identified path type using the techniques described above with respect to Sections B and C. In some implementations, the data processing system can determine a total path count of the identified path type a sum of converting and non-converting paths that match the identified path type. In some implementations, the data processing system can perform a lookup in a database in which the conversion probability previously determined has been stored to retrieve the conversion probability of the identified path type.

In some implementations, the conversion probability associated with the path type can be calculated in an offline process and stored in a database accessible by the data processing system. In some implementations, the conversion probability of various path types can be determined in a manner described above with respect to Section C. In some implementations, the conversion probability of the identified path may be calculated and stored for one or more other processes, such as for creating a data-driven attribution model, as described in Section A.

In some implementations, the conversion probability of the path type may not be identified, for example, because it was not previously determined and stored in the database. In some such implementations, the data processing system can be configured to identify one or more paths to which the identified path is associated. As previously described, one or more paths may be rewritten according to a path rewriting policy. Examples of some such paths can be paths that include a number of events that exceeds a threshold number of events. As such, the content selection module can be configured to determine if the identified path may be associated with a rewritten path. In some implementations, the data processing system can be configured to rewrite the identified path according to the path rewriting policy. In some implementations, the data processing system can then use the rewritten path to identify a path type that matches the rewritten path. The data processing system can then match the path type associated with the rewritten path to determine the conversion probability of the rewritten path.

The data processing system can then select content for display based on the identified conversion probability of the identified path (BLOCK 820). In some implementations, the data processing system can select a content item for display based on the amount of attribution credit a particular media exposure will receive in response to a conversion at the website. The amount of attribution credit a particular media exposure will receive can be determined using the data-driven attribution model described herein.

In some implementations, the data processing system can select content upon analyzing the conversion probabilities of one or more possible paths that the visitor identifier can take. These possible paths can include one or more additional events at the end of the sequence of events included in the path of the visitor identifier identified by the data processing system. In some implementations, the data processing system can be configured to determine conditional probabilities for paths that include one or more events after the original events included in the identified path. The conversion probabilities of the possible paths can allow the content selection module to select a media exposure to expose to the visitor identifier in an effort to get the visitor to convert during a subsequent visit to the website.

In some implementations, the data processing system can provide the conversion probabilities of various path types to content providers. The content providers can then use the conversion probabilities to adjust their advertising strategies. In auction based content placement systems, content providers, such as advertisers, may modify their ad spending budgets based on the conversion probabilities of various paths and corresponding events. For instance, from the conversion probabilities, a content provider can determine that the likelihood of converting a visitor identifier decreases when a particular media exposure, such as a paid search is shown to a visitor identifier associated with a given path. As such, the content provider can adjust its advertising bidding strategy such that for visitors associated with the given path, the content provider can choose not to bid on a paid search ad to display to the visitor identifier.

In some implementations, the data processing system can be configured to assign attribution credits according to the data-driven attribution model described herein. To do so, the data processing system can receive an indication of a conversion at the website. The data processing system can receive the indication via a script embedded at the website that allows the data processing system 110 to identify when a conversion occurs at the website. The data processing system can identify a path associated with the conversion based on the visitor identifier associated with the conversion.

Upon identifying the path, the data processing system can determine a rule of the attribution model according to which to assign credit to the events included in the path. In some implementations, the data processing system 110 can identify the rule based on a path type of the path. In some implementations, the attribution model can include a plurality of rules, each of which corresponds to a given path type. In some implementations, the data processing system 110 can perform a lookup in a database, such as the database 140 that stores the rules of the attribution model to identify a rule that matches the identified path. If a rule matches the identified path, the data processing system 110 determines the attribution credit associated with each event of the path from the rule. The data processing system 110 can then assign to each of the events the determined attribution credit. In some implementations, the total sum of attribution credits across all of the events of a path that led to a conversion should be equal to 1. In a last click attribution model, the entire attribution credit is assigned to the last event, while in the data-driven attribution model described herein, the attribution credit can be split across multiple events of the path. Conversely, if none of the rules of the attribution model match the identified path, the data processing system 110 can assign attribution credits to one or more events of the path according to a fallback attribution model, such as last click attribution.

In some implementations, the data processing system 110 can maintain website traffic related statistics for the website at which the conversion occurred. In some implementations, the website traffic related statistics can include information regarding a number of conversions each type of media exposure or event gained. In some implementations, the website traffic related statistics can also include information relating to a weighting of an event at a particular position in the path. To maintain these statistics, the data processing system 110 can be configured to maintain, for each conversion that takes place, a record of the assignment of attribution credits across the various events of the path that led to the conversion. The record can include a position of each event in the path and an amount of attribution credit assigned to each of the events in the path.

The data processing system 110 can then, over a period of time, tally up the recorded information. For instance, the data processing system 110 can determine, for a given time period, such as a month, a number of conversions that took place during the given time period and identify records associated with each of those conversions. To calculate the number of conversions assigned to a particular event, such as Paid Search, the data processing system 110 can then identify, for each of the conversions that took place in the given time period, the attribution credit assigned to the particular event (Paid Search). The data processing system 110 can then add each of the identified attribution credits assigned to Paid Search to determine a total number of conversions assigned to Paid Search. The process can be repeated for the different types of events.

Figure 9:
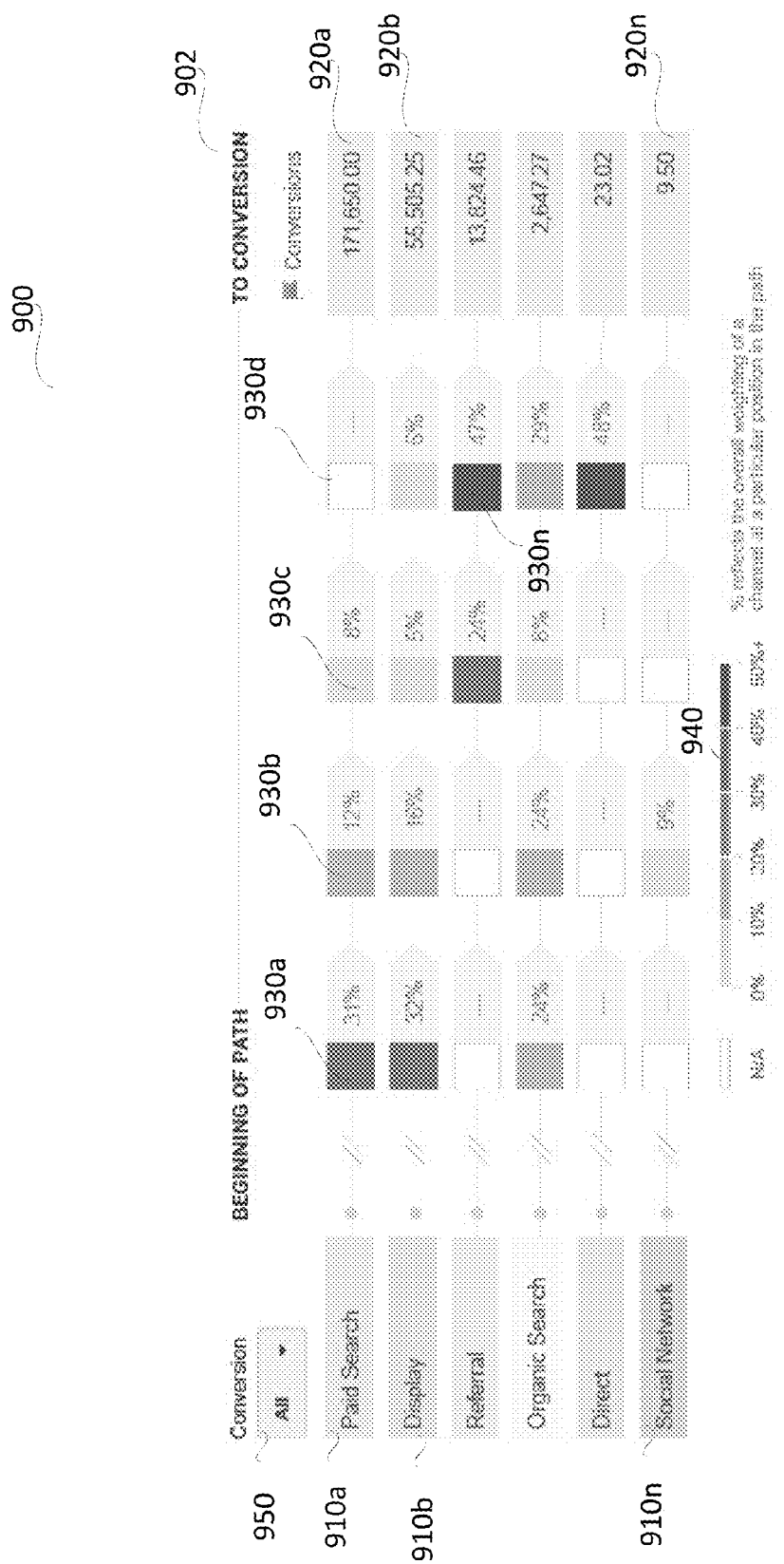
FIG. 9 is a screenshot of a portion of a user interface identifying a plurality of events and corresponding conversion credits.

Moreover, the data processing system 110 can be configured to determine a percentage of weights across various positions of the paths. In some implementations, the last event, which is the event before the conversion is assigned an index position of 1, the second last event is assigned an index position of 2, and so forth. As shown in FIG. 9, only the last four events of paths are shown. To determine the weighting of conversions at a particular index position of a particular event, the data processing system 110 can determine a position specific aggregate number of conversions. The position specific aggregate number of conversions can be determined by identifying, from the conversions that took place during the given time period, conversions in which the event associated with the particular index position received attribution credit. The data processing system 110 can then compute the position specific aggregate number of conversions by adding the attribution credits received by the events associated with the particular index position. The data processing system 110 can then determine a ratio of the position specific aggregate number of conversions to the total number of conversions assigned to the particular event.

For example, to determine the weighting of conversions for the 'Paid Search' event having an index position of 3, the data processing system 110 identifies all conversions that correspond to paths in which the event having an index position of 3 is the 'Paid Search' event. The data processing system 110 can then determine, for each of these conversions, the attribution credit assigned to the 'Paid Search' event having the index position of 3. The data processing system 110 can then determine the position specific aggregate number of conversions for the 'Paid Search' event having the index position of 3 by adding the determined attribution credit assigned to the 'Paid Search' event having the index position of 3 of each of the conversions that correspond to paths in which the event having an index position of 3 is the 'Paid Search' event. The data processing system 110 can then determine the ratio of the position specific aggregate number of conversions for the 'Paid Search' event having the index position of 3 to the total number of conversions (shown as 171650 in FIG. 10). The determined ratio is the weighting (12%) of the index position of 3 for the event 'Paid Search'.

E. Methods and Systems for Displaying Attribution Credit Data Based on One or More Parameters There is a desire to aggregate data corresponding to the amount of attribution credit assigned to various marketing touchpoints or event in individual paths and provide the aggregated data for display. In this way, advertisers can identify the relative weight the attribution model may assign to a given event across various values of one or more parameters associated with the event. In some implementations, a parameter value can correspond to a position of the event relative to a converting event. In other implementations, the parameter value can be a time the event was performed relative to a time at which the converting event was performed. In some implementations, the parameter value can be a time between the event was performed and any other event, including but not limited to events in the path. For example, the time between the event and the release of a news event or any other identifiable event, action or condition. The present disclosure provides methods and systems for generating a visual that when displayed, allows an advertiser to identify, for one or more event-parameter pairs, a weighting corresponding to the attribution credits assigned to the event that are associated with the parameter. This can help advertisers optimize their advertising campaigns such that each event along a path is performed such that the event is assigned a high attribution credit based on the parameter associated with the event.

Aspects of the present disclosure relate to methods and systems for providing for display attribution data associated with one or more events. A processor identifies a plurality of paths. Each of the plurality of paths includes one or more events. Each event corresponds to a channel of a plurality of channels and to parameter data corresponding to one or more parameters associated with the event. The processor identifies, from the plurality of paths, one or more channels for which attribution credits are to be determined. The processor determines using an attribution model, for each of the channels, attribution credits assigned to each event included in the plurality of paths corresponding to the channel and a total number of attribution credits assigned to the channel. The processor identifies, from the plurality of paths, a plurality of event-parameter pairs. Each event-parameter pair corresponds to a respective channel of the identified channels and to the one or more parameters associated with the event. The processor determines, for each identified event-parameter pair, a weighting based on an aggregate of the attribution credits assigned to the events to which the event-parameter pair corresponds. The processor then provides, for display, a visual object including an indicator corresponding to the determined weighting for at least one of the event-parameter pairs.

In some implementations, the visual object includes the total number of attribution credits assigned to the channel corresponding to the indicator. In some implementations, the visual object includes a visual matrix including a plurality of cells corresponding to intersecting rows and columns. Each row of cells includes the determined weighting for a particular position corresponding to a particular channel to which the row corresponds and a total number of attribution credits assigned to the particular channel. In some implementations, the channels correspond to one or more types of events. In some implementations, the visual object includes one or more items whose visual characteristics correspond to the weighting of the event-position pair to which the item corresponds.

In some implementations, the processor determines attribution credits assigned to each event included in the plurality of paths corresponding to the channel by identifying, from the plurality of paths, candidate paths in which at least one event corresponds to the channel and determining, for each of the candidate paths, an attribution credit assigned to each event of the path based on counterfactual gains.

As such, aspects of the present disclosure relate to methods and systems for providing for display attribution data associated with one or more events. Referring again to FIG. 1, the attribution data display module 138 of the data processing system can be configured to provide attribution data associated with one or more events for display.

The attribution data display module 138 can be configured to identify a plurality of paths taken by visitors to perform a converting act, such as visiting a webpage, making a purchase at a particular website, subscribing to a service, providing an email address, or any other action that is identified as a converting act. As described above, a path corresponds to a sequence of events. In some implementations, the event corresponds to an interaction between the visitor and a media exposure, for example, a click on a paid search ad, an email ad, a social networking post, or entering a web address of the website in a web browser. In some implementations, the attribution data display module 138 or some other module of the data processing system 110 can be configured to identify the plurality of paths. In some implementations, the attribution data display module 138 can identify actions that correspond to the events of a given path. In some implementations, the website can include one or more webpages. In some implementations, each webpage for which visits are to be monitored or recorded can include a script, instructions, or some other computer-executable code, which causes the data-driven attribution model creation module 120 or other module of the data processing system 110 to create records of visits to the website. In some implementations, the data-driven attribution model creation module 120 may not store the visit related data but may be configured to access such data from the database 140.

In some implementations, the attribution data display module 138 can identify a plurality of paths responsive to receiving a request. In some implementations, the request can be received from an advertiser. In some implementations, the request can be a request to provide attribution data for display. In some implementations, the request can be a request to provide, for display, attribution data corresponding to one or more channels. In some implementations, the request can identify the one or more channels. In some implementations, the request can include a request to identify a total number of attribution credits assigned to each channel. In some implementations, the advertiser can request attribution data for a particular website. In some implementations, the request can specify a type of conversion for which attribution data is to be provided for display. In some implementations, the advertiser can submit the request for attribution data via a user interface.

Each event can correspond to one or more channels. Each event can be classified under a particular channel based on the type of event. In one example, events can result in a visitor visiting a particular webpage. Examples of channels can include paid search, display, referral, organic search, direct, social network, amongst others. Events corresponding to the paid search channel can include any event in which a visitor visits the webpage in response to taking an action on a paid search result. Events corresponding to the display channel can include any event in which a visitor visits the webpage in response to taking an action on a display ad. Events corresponding to the referral channel can include any event in which a visitor visits the webpage in response to taking an action on a referral link. Events corresponding to the organic search channel can include any event in which a visitor visits the webpage in response to performing a search and taking an action on a search result. Events corresponding to the direct channel can include any event in which a visitor visits the webpage in response to directly visiting the webpage, for example, by entering the URL of the webpage in the address bar of a browser. Events corresponding to the social network channel can include any event in which a visitor visits the webpage in response to taking an action on a social network. It should be appreciated that the granularity of these channels can be increased or decreased. For example, the social network channel can be defined more granularly by having separate channels for different social networks, for example, Facebook, Twitter, Google+, and Linkedin, among others.

In some implementations, the request can identify one or more parameters for which the attribution data is to be shown. In some implementations, the request can identify one or more parameter values. Each event can also correspond to parameter data corresponding to one or more parameters associated with the event. In some implementations, each event can be associated with one or more parameters. Parameters can be based on the occurrence of the event. For example, an event can have a position-based parameter that indicates a position along the path at which the event was performed. For instance, for a converting path, the converting event can be the last event. In some implementations, an event that does not result in a conversion can have a position relative to the converting event. In some implementations, a data driven attribution model, such as the data driven attribution models described herein, may assign a majority of the attribution credit across the last four events of a converting path. Another parameter can be based on the time of the occurrence of the event relative to the converting event. In some implementations, events happening within 24 hours of the converting event are likely to be assigned a majority of the attribution credit, while events occurring more than 24 hours prior to the converting act are likely to be assigned a minority, if any, of the attribution credit. Details of how the attribution credit is assigned for each event in a sequence have been described above.

In some implementations, the request can be a request to view attribution data corresponding to a weighting of attribution credit across a plurality of positions for each channel that received attribution credit. In some implementations, the request can be a request to view attribution data corresponding to a weighting of attribution credit across a plurality of positions for channels specified in the request. In some implementations, the request can be a request to view attribution data corresponding to a weighting of attribution credit across a plurality of positions for channels that receive an attribution credit that is greater than a predetermined threshold. In some implementations, the request can be a request to view attribution data corresponding to a weighting of attribution credit across a plurality of positions for channels that are assigned attribution credits that exceed a predetermined threshold.

The attribution data display module 138 can identify, from the plurality of paths, one or more channels for which attribution credits are to be determined. In some implementations, the attribution data display module 138 can identify the one or more channels based on the request to view attribution data. In some implementations, the attribution data display module 138 can identify the one or more channels based on the types of events included in each of the identified plurality of paths. In some implementations, the attribution data display module 138 can determine, from each path of the plurality of paths, the events included in the path. The attribution data display module 138 can then determine the type of event for each of the determined events. The attribution data display module 138 can then determine the channels to which each of the different type of events belong.

The attribution data display module 138 can determine using an attribution model, for each of the channels, attribution credits assigned to each event included in the plurality of paths corresponding to the channel. In some implementations, the attribution data display module 138 can determine using the attribution model, for each of the one or more of the channels, a total number of attribution credits assigned to the channel. In some implementations, the attribution data display module 138 or some other module of the data processing system 110, such as the attribution model creation module 120 or the conversion probability determination module 130, can determine the type of attribution model to use for assigning attribution credits to each of the events included in a given path.

In some implementations, the attribution data display module 138 can determine attribution credits assigned to each event included in the plurality of paths corresponding to a particular channel by identifying, from the plurality of paths, candidate paths in which at least one event corresponds to the channel. The attribution data display module 138 can identify candidate paths by identifying one or more possible event types that correspond to the channel. The attribution data display module 138 can then identify paths that include events that correspond to an event type that can be classified under the channel. Once the attribution data display module 138 can identify such paths, the attribution data display module 138 can determine, for each of the candidate paths, an attribution credit assigned to each event of the path based on counterfactual gains. Details of how the attribution data display module 138 can determine the attribution credit assigned to each path is described above with respect to FIGS. 2A-2D and FIG. 4.

The attribution data display module 138 can identify, from the plurality of paths, a plurality of event-parameter pairs. Each event-parameter pair corresponds to a respective channel of the identified channels and to the one or more parameters associated with the event. The attribution data display module 138 can identify, for each path of the plurality of paths, each of the events and one or more parameter values associated with parameters of the event. In some implementations, the attribution data display module 138 can identify parameter values associated with a particular parameter based on the request to display attribution data corresponding to a particular parameter. For instance, if the request corresponds to attribution data based on positions of the events, the attribution data display module 138 can identify, for each event of each path, position data associated with the event. For example, for a path 'Organic Search'-'Referral'-'Display', the attribution data display module 138 can identify the following event-parameter pairs: i) Organic Search-Position 2; ii) Referral-Position 1; and iii) Display-Position 0, where the Position 2 corresponds to 2 events prior to the converting event and Position 1 corresponds to 1 event prior to the converting event. If the attribution data to be displayed is based on some other type of parameter, for example, time before converting act, the attribution data display module 138 can identify the following event-parameter pairs: i) Organic Search-Time 22; ii) Referral-Time 5; and iii) Display-Time 0, where the Time 22 corresponds to the Organic Search event occurring 22 hours prior to the converting event and Time 5 corresponds to the Referral event occurring 5 hours prior to the converting event.

The attribution data display module 138 can determine, for each identified event-parameter pair, a weighting based on an aggregate of the attribution credits assigned to the events to which the event-parameter pair corresponds. In some implementations, the attribution data display module 138 can determine the weighting for each identified event-parameter pair by identifying, from the plurality of paths, candidate paths that include the event corresponding to the event-parameter pair. The attribution data display module 138 can then determine, for the identified candidate paths, attribution credit assigned to each event in the candidate paths. In some implementations, the attribution credit for each event can be determined using the techniques described herein and in particular, the techniques described in FIG. 4. The attribution data display module 138 can then aggregate the attribution credit assigned to each of the events in the candidate paths. The attribution data display module 138 can then aggregate the attribution credits assigned to events included in the candidate paths that correspond to the event of the event-parameter pair. The attribution data display module 138 can determine a total number of conversions for a channel under which the event of the event-parameter pair can be classified based on the aggregate of the attribution credits assigned to events included in the candidate paths that can be classified under the channel. In particular, in some implementations, the total number of conversions for the channel can be determined by aggregating the attribution credits assigned to events included in the candidate paths that can be classified under the channel. The attribution data display module 138 can then identify those events in the candidate paths that have a parameter value that matches the parameter value of the event-parameter pair. The attribution data display module 138 then determines the weighting for the identified event-parameter pair based on a ratio of the sum of the attribution credits assigned to events included in the candidate paths that have the parameter value that matches the parameter value of the event-parameter pair to the total number of conversions of the channel under which the event can be classified.

In some implementations, the attribution data display module 138 can determine the weighting for each identified event-parameter pair by determining the attribution credit assigned to each event in each of the plurality of paths. The attribution data display module 138 can then identify, for each event-parameter pair, an aggregate attribution credit for the event-parameter pair by adding the attribution credits assigned to each event that matches the event in the event-parameter pair and that has a parameter value corresponding to the event-parameter pair. For instance, for the pair Organic Search-Position 2, the attribution data display module 138 can first identify all of Organic Search events from the plurality of pairs and determine the attribution credits assigned to each of these identified Organic Search events. The attribution data display module 138 can then identify, from all of the Organic Search events, only those Organic Search events that were performed two events prior to the converting event. The attribution data display module 138 can aggregate the attribution credits for each of those Organic Search events that were performed two events prior to the converting event. The aggregate attribution credit corresponds to the event-parameter pair 'Organic Search-Position 2.' In some implementations, the weighting of each of the event-parameter pairs is based on the aggregate of the attribution credits assigned to the events regardless of their parameter values. Stated in another way, the aggregate of the attribution credits assigned to the events regardless of their parameter values is the total attribution credits assigned to events of a particular channel. In some implementations, the attribution data display module 138 determines the weighting of an event-parameter pair by determining the ratio of the aggregate attribution credit of the event-parameter pair to the total attribution credits assigned to events of a particular channel.

The attribution data display module 138 can provide, for display, a visual object including an indicator corresponding to the determined weighting for at least one of the event-parameter pairs. For example, the indicator can indicate the weighting of the Organic Search-Position 2 pair. In some implementations, the visual object can visually represent the determined weightings for each event-parameter pair included in the plurality of paths identified by the attribution data display module 138. In some implementations, the attribution data display module 138 can also display a total number of conversions attributed to the channel under which the event of the event-parameter pair can be classified. In some implementations, the attribution data display module 138 can be configured to generate the visual object responsive to a request to view attribution data. In some implementations, the request can specify the type of attribution data to be displayed. In some implementations, the request can also specify the level of granularity in which to present the attribution data. For example, the request can specify to show 'Organic Search' as a single channel. In another example, the request can specify to show 'Organic Search on Google.com' as a single channel, and 'Organic Search on Other Search Engines' as two separate channels. To process this request, the attribution data display module 138 can classify events under one of 'Organic Search on google.com' or 'Organic Search on Other Search Engines' based on whether the event was an organic search performed on google.com or another search engine.

In some implementations, the attribution data can be provided for display to an advertiser. In some implementations, the advertiser can have configuration settings in place according to which the attribution data is to be displayed. In some implementations, the advertiser can modify the configuration settings to modify the form in which the attribution data is determined or displayed. In some implementations, the attribution data display module 138 can receive the configuration settings of the advertiser along with the request for attribution data. In this way, the attribution data display module 138 can determine the level of granularity at which the attribution data for each of the channels is to be displayed.

In some implementations, the attribution data display module 138 can generate and provide, for display, a visual matrix that includes a plurality of cells corresponding to intersecting rows and columns. Each row of cells can includes the determined weighting for a particular parameter value corresponding to a particular channel to which the row corresponds and a total number of attribution credits assigned to the particular channel. In some implementations, the visual matrix can include one or more items whose visual characteristics correspond to the weighting of the event-parameter pair to which the item corresponds.

Referring now to FIG. 9, a screenshot of a portion of one implementation of a user interface that includes a visual object 902 including attribution data. The screenshot of the user interface 900 shows the weighting of various channels at a particular position in the path. Moreover, the user interface 900 shows a plurality of different channels 910a-910n. The user interface 900 also shows a total number of conversions 920a-920n attributed to event classified under each of the channels 910. Moreover, for each channel, the user interface 900 shows the weighting 930a-930n of the channel at the various positions along the path. For example, with reference to the 'Paid Search' channel 910a, the weightings across 4 different positions along the path are displayed.

The weighting 930a corresponds to events that took place four events prior to the converting event, the weighting 930b corresponds to events that took place three events prior to the converting event, the weighting 930c corresponds to events that took place two events prior to the converting event and the weighting 930d corresponds to events that took place one event prior to the converting event. As shown, events that took place four events prior to the converting event were, on average, attributed 31% of the attribution credit, while the remaining 69% was attributed across other events at other positions along the path. Similarly, events that took place three events prior to the converting event were, on average, attributed 12% of the attribution credit, while the remaining 82% was attributed across other events at other positions along the path. Similarly, events that took place two events prior to the converting event were, on average, attributed 8% of the attribution credit, while the remaining 92% was attributed across other events at other positions along the path. As the weighting for events that took place one event prior to the converting event is not shown, that may suggest that events classified as paid search was never the event prior to the converting event.

In some implementations, each of the visual objects or items associated with the weightings 930a-930n may be color coded. In some implementations, a visual color scale 940 can indicate a weighting level based on the intensity of the color of the visual objects or items. In some implementations, a darker color indicates a greater weighting than a less dark color.

As shown in the user interface, the user interface 900 is based on all paths as shown in the selectable input field 950. The paths across which to determine the attribution data can be modified by selecting a different option using the input field 950. For instance, if an option to only view paths from the last week is selected, the attribution data will be displayed based on paths that include a converting event within the last week.

Although the visual object 902 displays attribution data across various positions in the path, the visual object 902 can display attribution data based on when events were performed relative to the converting event. For example, each of the columns could correspond to time ranges, such that weighting 930a could correspond to events occurring more than 24 hours prior to the converting event, weighting 930b could correspond to events occurring less than 24 hours but more than 12 hours prior to the converting event, weighting 930a could correspond to events occurring less than 12 hours but more than 4 hours prior to the converting event and weighting 930a could correspond to events occurring less than 4 hours prior to the converting event.

Figure 10:
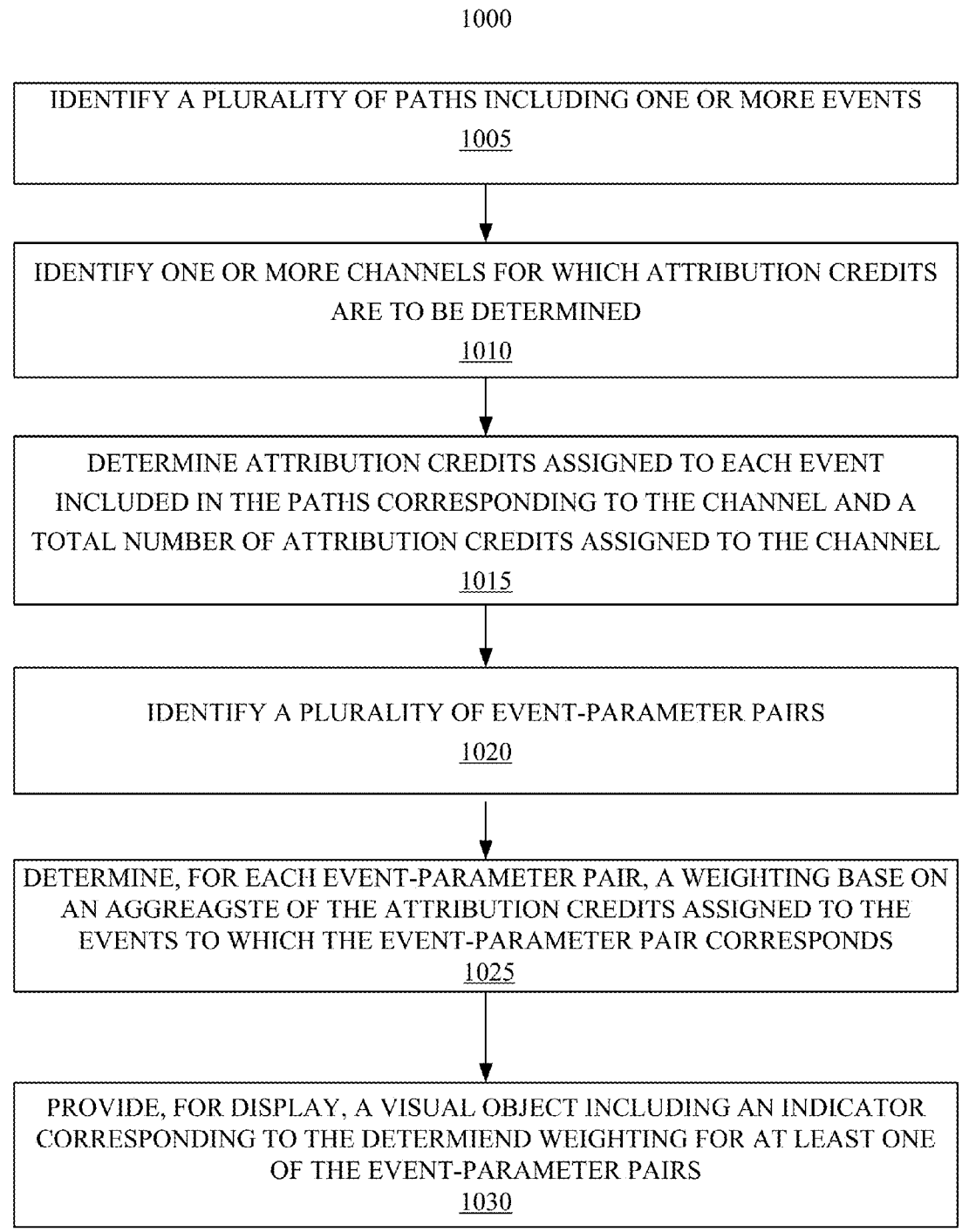
FIG. 10 is a flow diagram depicting one implementation of the steps taken to provide attribution data for display.

FIG. 10 is a flow diagram depicting one implementation of the steps taken to provide attribution data for display. In particular, the flow diagram depicts one implementation of the steps taken to provide attribution data associated with one or more events for display. The data processing system can identify a plurality of paths including one or more events (BLOCK 1005). Each event corresponds to a channel of a plurality of channels and to parameter data corresponding to one or more parameters associated with the event. The data processing system can identify, from the plurality of paths, one or more channels for which attribution credits are to be determined (BLOCK 1010). The data processing system can determine using an attribution model, for each of the channels, attribution credits assigned to each event included in the plurality of paths corresponding to the channel and a total number of attribution credits assigned to the channel (BLOCK 1015). The data processing system can identify, from the plurality of paths, a plurality of event-parameter pairs (BLOCK 1020). Each event-parameter pair corresponds to a respective channel of the identified channels and to the one or more parameters associated with the event. The data processing system can determine, for each identified event-parameter pair, a weighting based on an aggregate of the attribution credits assigned to the events to which the event-parameter pair corresponds (BLOCK 1025). The data processing system can provide, for display, a visual object including an indicator corresponding to the determined weighting for at least one of the event-parameter pairs (BLOCK 1030).

In further detail, the data processing system can identify a plurality of paths including one or more events (BLOCK 1005). Each event corresponds to a channel of a plurality of channels and to parameter data corresponding to one or more parameters associated with the event. In some implementations, the data processing system can identify a plurality of paths taken by visitors to perform a converting act, such as visiting a webpage, making a purchase at a particular website, subscribing to a service, providing an email address, or any other action that is identified as a converting act. In some implementations, the data processing system can identify a plurality of paths responsive to receiving a request. In some implementations, the request can be received from an advertiser. In some implementations, the request can be a request to provide attribution data for display. In some implementations, the request can be a request to provide, for display, attribution data corresponding to one or more channels. In some implementations, the request can identify the one or more channels. In some implementations, the request can include a request to identify a total number of attribution credits assigned to each channel. In some implementations, the advertiser can request attribution data for a particular website. In some implementations, the request can specify a type of conversion for which attribution data is to be provided for display. In some implementations, the advertiser can submit the request for attribution data via a user interface.

Each event can correspond to one or more channels. Each event can be classified under a particular channel based on the type of event. In one example, events can result in a visitor visiting a particular webpage. In another example, events can be any event that provides a user the opportunity to take an action that causes the user to visit the particular webpage.

In some implementations, the request can identify one or more parameters for which the attribution data is to be shown. In some implementations, the request can identify one or more parameter values. Each event can also correspond to parameter data corresponding to one or more parameters associated with the event. In some implementations, each event can be associated with one or more parameters. Parameters can be based on the occurrence of the event. For example, an event can have a position-based parameter that indicates a position along the path at which the event was performed. For instance, for a converting path, the converting event can be the last event. In some implementations, an event that does not result in a conversion can have a position relative to the converting event. In some implementations, a data driven attribution model, such as the data driven attribution models described herein, may assign a majority of the attribution credit across the last four events of a converting path. Another parameter can be based on the time of the occurrence of the event relative to the converting event. In some implementations, events happening within 24 hours of the converting event are likely to be assigned a majority of the attribution credit, while events occurring more than 24 hours prior to the converting act are likely to be assigned a minority, if any, of the attribution credit. Details of how the attribution credit is assigned for each event in a sequence have been described above.

In some implementations, the parameter data of each of the events identifies a position along a path at which the event is performed and wherein each event-parameter pair includes an event-position pair that corresponds to a position along the path at which the event was performed.

The data processing system can identify, from the plurality of paths, one or more channels for which attribution credits are to be determined (BLOCK 1010). In some implementations, the channels correspond to one or more types of events. In some implementations, the data processing system can identify the one or more channels based on the request to view attribution data. In some implementations, the data processing system can identify the one or more channels based on the types of events included in each of the identified plurality of paths. In some implementations, the data processing system can determine, from each path of the plurality of paths, the events included in the path. The data processing system can then determine the type of event for each of the determined events. The data processing system can then determine the channels to which each of the different type of events belong.

The data processing system can determine using an attribution model, for each of the channels, attribution credits assigned to each event included in the plurality of paths corresponding to the channel and a total number of attribution credits assigned to the channel (BLOCK 1015). In some implementations, determining, for each of the channels, attribution credits assigned to each event included in the plurality of paths corresponding to the channel includes identifying, from the plurality of paths, candidate paths in which at least one event corresponds to the channel, and determining, for each of the candidate paths, an attribution credit assigned to each event of the path based on counterfactual gains. In some implementations, the data processing system can determine using the attribution model, for each of the one or more of the channels, a total number of attribution credits assigned to the channel. In some implementations, the data processing system can determine the type of attribution model to use for assigning attribution credits to each of the events included in a given path.

In some implementations, the data processing system can determine attribution credits assigned to each event included in the plurality of paths corresponding to a particular channel by identifying, from the plurality of paths, candidate paths in which at least one event corresponds to the channel. The data processing system can identify candidate paths by identifying one or more possible event types that correspond to the channel. The data processing system can then identify paths that include events that correspond to an event type that can be classified under the channel. Once the data processing system can identify such paths, the data processing system can determine, for each of the candidate paths, an attribution credit assigned to each event of the path based on counterfactual gains. Details of how the data processing system can determine the attribution credit assigned to each path is described above with respect to FIGS. 2A-2D and FIG. 4.

The data processing system can identify, from the plurality of paths, a plurality of event-parameter pairs (BLOCK 1020). Each event-parameter pair corresponds to a respective channel of the identified channels and to the one or more parameters associated with the event. Each event-parameter pair corresponds to a respective channel of the identified channels and to the one or more parameters associated with the event. The data processing system can identify, for each path of the plurality of paths, each of the events and one or more parameter values associated with parameters of the event. In some implementations, the data processing system can identify parameter values associated with a particular parameter based on the request to display attribution data corresponding to a particular parameter. For instance, if the request corresponds to attribution data based on positions of the events, the data processing system can identify, for each event of each path, position data associated with the event. For example, for a path 'Organic Search'-'Referral'-'Display', the data processing system can identify the following event-parameter pairs: i) Organic Search-Position 2; ii) Referral-Position 1; and iii) Display-Position 0, where the Position 2 corresponds to 2 events prior to the converting event and Position 1 corresponds to 1 event prior to the converting event. If the attribution data to be displayed is based on some other type of parameter, for example, time before converting act, the data processing system can identify the following event-parameter pairs: i) Organic Search-Time 22; ii) Referral-Time 5; and iii) Display-Time 0, where the Time 22 corresponds to the Organic Search event occurring 22 hours prior to the converting event and Time 5 corresponds to the Referral event occurring 5 hours prior to the converting event.

The data processing system can determine, for each identified event-parameter pair, a weighting based on an aggregate of the attribution credits assigned to the events to which the event-parameter pair corresponds (BLOCK 1025). In some implementations, the data processing system can determine the weighting for each identified event-parameter pair by identifying, from the plurality of paths, candidate paths that include the event corresponding to the event-parameter pair. The data processing system can then determine, for the identified candidate paths, attribution credit assigned to each event in the candidate paths. In some implementations, the attribution credit for each event can be determined using the techniques described herein and in particular, the techniques described in FIG. 4. The data processing system can then aggregate the attribution credit assigned to each of the events in the candidate paths. The data processing system can then aggregate the attribution credits assigned to events included in the candidate paths that correspond to the event of the event-parameter pair. The data processing system can determine a total number of conversions for a channel under which the event of the event-parameter pair can be classified based on the aggregate of the attribution credits assigned to events included in the candidate paths that can be classified under the channel. In particular, in some implementations, the total number of conversions for the channel can be determined by aggregating the attribution credits assigned to events included in the candidate paths that can be classified under the channel. The data processing system can then identify those events in the candidate paths that have a parameter value that matches the parameter value of the event-parameter pair. The data processing system then determines the weighting for the identified event-parameter pair based on a ratio of the sum of the attribution credits assigned to events included in the candidate paths that have the parameter value that matches the parameter value of the event-parameter pair to the total number of conversions of the channel under which the event can be classified.

In some implementations, determining, for each identified event-position pair, the weighting based on the aggregate of the attribution credits assigned to the events to which the event-position pair corresponds includes identifying, from the plurality of paths, candidate paths including the event corresponding to the event-position pair and determining, for the identified candidate paths, attribution credit assigned to each event in the candidate paths. The data processing system can determine, from the attribution credit assigned to each event in the candidate paths, an aggregate of the attribution credits assigned to the event. The data processing system can aggregate, for each position along the path, the attribution credits assigned to events included in the candidate paths that are performed at the position and determine the weighting for the identified event-position pair based on a ratio of the sum of the attribution credits assigned to events included in the candidate paths that are performed at the position to the aggregate of the attribution credits assigned to the event.

The data processing system can provide, for display, a visual object including an indicator corresponding to the determined weighting for at least one of the event-parameter pairs (BLOCK 1030). For example, the indicator can indicate the weighting of the Organic Search-Position 2 pair. In some implementations, the visual object can visually represent the determined weightings for each event-parameter pair included in the plurality of paths identified by the data processing system. In some implementations, the data processing system can also display a total number of conversions attributed to the channel under which the event of the event-parameter pair can be classified. In some implementations, the data processing system can generate the visual object responsive to a request to view attribution data. In some implementations, the request can specify the type of attribution data to be displayed. In some implementations, the request can also specify the level of granularity in which to present the attribution data. For example, the request can specify to show 'Organic Search' as a single channel. In another example, the request can specify to show 'Organic Search on Google.com' as a single channel, and 'Organic Search on Other Search Engines' as two separate channels. To process this request, the data processing system can classify events under one of 'Organic Search on google.com' or 'Organic Search on Other Search Engines' based on whether the event was an organic search performed on google.com or another search engine.

In some implementations, the attribution data can be provided for display to an advertiser. In some implementations, the advertiser can have configuration settings in place according to which the attribution data is to be displayed. In some implementations, the advertiser can modify the configuration settings to modify the form in which the attribution data is determined or displayed. In some implementations, the data processing system can receive the configuration settings of the advertiser along with the request for attribution data. In this way, the data processing system can determine the level of granularity at which the attribution data for each of the channels is to be displayed.

In some implementations, the data processing system can generate and provide, for display, a visual matrix that includes a plurality of cells corresponding to intersecting rows and columns. Each row of cells can includes the determined weighting for a particular parameter value corresponding to a particular channel to which the row corresponds and a total number of attribution credits assigned to the particular channel. In some implementations, the visual matrix can include one or more items whose visual characteristics correspond to the weighting of the event-parameter pair to which the item corresponds.

In some implementations, the visual object includes the total number of attribution credits assigned to the channel corresponding to the indicator. In some implementations, the visual object includes one or more items whose visual characteristics correspond to the weighting of the event-parameter pair to which the item corresponds.

Although the present disclosure relates to providing attribution data for display, the scope of the present disclosure is not limited to the same. In particular, the converting event is not limited to website related activities, such as making a purchase, signing up for an account, amongst others, and the events are not limited to the types of events or media exposures through which a visitor lands on a website. In some implementations, the event types can be more or less granular. For example, the data-driven attribution model can be configured to assign attribution credits to different types of paid search ads. For example, for a website that sells sporting equipment and sporting apparel, the attribution model can be configured to assign different attribution credits to paid search ads that relate to sporting goods and paid search ads that relate to sporting apparel. To implement this, instead of having a single paid search ad event type, the data-driven attribution model can treat sporting equipment paid search ads as a first event type and the sporting apparel paid search ads as a second event type.

On a similar note, the types of events can also be different. Instead of assigning attribution credit to media exposure related event types, the event types can be time of day, for example, morning, afternoon, evening and night. To implement such a model, the website can record conversions and visits to the website with timestamps that correspond to different times of the day instead of recording conversions and visits according to type of media exposure. In some implementations, the types of events can be a combination of different types of events. For instance, the types of events can be based on media exposure type and a time of day. In some such implementations, the website can record visits and conversions that correspond to different types of media exposures as well different times of day. However, when combining different event types, the number of different types of events increase. For example, if there are 6 media exposure event types and 4 times of day event types, there will be 24 possible event types based on multiplying the number of media exposure event types and times of day event types.

The methods, apparatuses and systems described herein can also be configured to create a data-driven attribution model based on different types of converting acts. For example, the methods, apparatuses and systems described herein can also be configured to create a data-driven attribution model to assign attribution credit to keywords used in search queries to visit a particular website.

Figure 11:
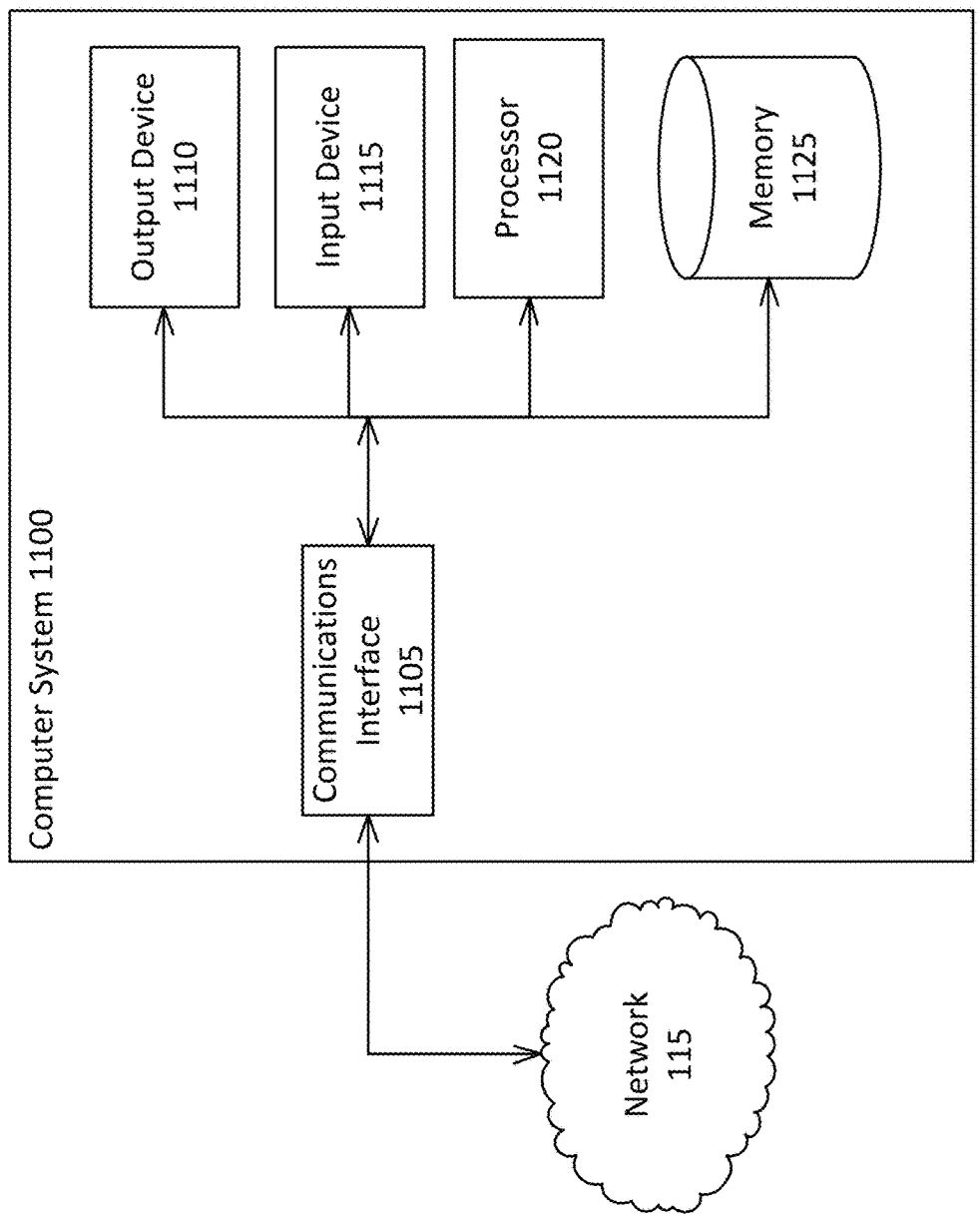
FIG. 11 is a block diagram illustrating an implementation of a general architecture for a computer system that may be employed to implement various elements of the systems and methods described and illustrated herein.

FIG. 11 shows the general architecture of an illustrative computer system 1100 that may be employed to implement any of the computer systems discussed herein (including the system 110 and its components such as the data-driven attribution model creation module 120, the rule creation module 125, the conversion probability determination module 130, the content selection module 135 and the attribution data display module 138) in accordance with some implementations. The computer system 1100 can be used to provide information via the network 115 for display. The computer system 1100 of FIG. 11 comprises one or more processors 1120 communicatively coupled to memory 1125, one or more communications interfaces 1105, and one or more output devices 1110 (e.g., one or more display units) and one or more input devices 1115. The processors 1120 can be included in the data processing system 110 or the other components of the system 110 such as the data-driven attribution model creation module 120, the rule creation module 125, the conversion probability determination module 130, the content selection module 135 and the attribution data display module 138.

In the computer system 1100 of FIG. 11, the memory 1125 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 1125 to store information related to one or more text-based content items, image-based content items, one or more images to be used to create image-based content items based on the text-based content items, and one or more statistics associated with the images, text-based content items and image-based content items. The memory 1125 can include the database 140. The processor(s) 1120 shown in FIG. 11 may be used to execute instructions stored in the memory 1125 and, in so doing, also may read from or write to the memory various information processed and or generated pursuant to execution of the instructions.

The processor 1120 of the computer system 1100 shown in FIG. 11 also may be communicatively coupled to or control the communications interface(s) 1105 to transmit or receive various information pursuant to execution of instructions. For example, the communications interface(s) 1105 may be coupled to a wired or wireless network, bus, or other communication means and may therefore allow the computer system 1100 to transmit information to or receive information from other devices (e.g., other computer systems). While not shown explicitly in the system of FIG. 1, one or more communications interfaces facilitate information flow between the components of the system 110. In some implementations, the communications interface(s) may be configured (e.g., via various hardware components or software components) to provide a website as an access portal to at least some aspects of the computer system 1100. Examples of communications interfaces 1105 include user interfaces (e.g., web pages), through which the user can communicate with the data processing system 110.

The output devices 1110 of the computer system 1100 shown in FIG. 11 may be provided, for example, to allow various information to be viewed or otherwise perceived in connection with execution of the instructions. The input device(s) 1115 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The data-driven attribution model creation module 120, the rule creation module 125, the conversion probability determination module 130, the content selection module 135 and the attribution data display module 138 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 1100 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data-driven attribution model creation module 120, the rule creation module 125, the conversion probability determination module 130, the content selection module 135 and the attribution data display module 138 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to an advertising program, the systems and methods described herein can be applied to any program in any vertical in which image-based content can be created from text-based content. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of providing, for display, attribution data associated with a plurality of events, comprising:
    identifying, by a processor, a plurality of paths, each of the plurality of paths including a plurality of events, each event corresponding to one of a plurality of channels and to parameter data comprising a plurality of parameters, each channel corresponding one or more event types, each parameter comprising at least one of:
        a position of the event within the path in which the event appears; or
        a relative time of occurrence of the event with respect to a time of occurrence of another event within the path in which the event appears;
    identifying, from the plurality of paths, a first channel of the plurality of channels for which attribution credits are to be determined, the first channel corresponding to a first set of one or more event types;
    identifying, by the processor, for the first channel, a first set of events from the plurality of events of the plurality of paths such that an event type of each event of the first set of events belongs to the first set of event types;
    determining using an attribution model, by the processor, for the first channel, an attribution credit assigned to each event of the first set of events;
    calculating, by the processor, a total attribution credit for the first channel by adding the attribution credits assigned to the first set of events;
    identifying, from the plurality of paths, a plurality of event-parameter pairs associated with the first channel, each event-parameter pair corresponding to an event of the first set of events, and one of the parameters associated with the event;
    for each event-parameter pair,
        determining a first event type of the event associated with the event-parameter pair and a parameter associated with the event;
        identifying a second set of events, each of the second set of events having the first event type and associated with the parameter;
        determining an aggregate of the attribution credits assigned to each event within the second set of events
        determining, by the processor, a weighting for the event-parameter pair of the first channel by calculating a ratio of the aggregate of the attribution credits to the total attribution credit, the weighting indicating a relative amount of attribution credits assigned to the event when the event occurs within the plurality of paths at the at least one of the position or the time of the parameter for the event-parameter pair; and
    providing, for display, a visual object representing determined weightings for each event-parameter pair of the plurality of event-parameter pairs, the visual object including an indicator indicating the determined weighting for at least one of the plurality of the event-parameter pairs.

2. The method of claim 1, wherein providing, for display, the visual object includes providing, for display, the visual object including the total attribution credit for the first channel.

3. The method of claim 1, further comprising:
    identifying, from the plurality of paths, candidate paths in which at least one event corresponds to the first channel; and
    determining, for each of the candidate paths, an attribution credit assigned to each event of the path based on counterfactual gains.

4. The method of claim 1, wherein each event-parameter pair includes an event-position pair that corresponds to a position along the path at which the event was performed.

5. The method of claim 4, wherein providing for display, the visual object includes providing, for display, a visual matrix including a plurality of cells corresponding to intersecting rows and columns, wherein each row of cells includes the determined weighting for a particular position corresponding to a particular channel to which the row corresponds and a total number of attribution credits assigned to the particular channel.

6. The method of claim 4, further comprising:
    for each identified event-position pair:
        identifying, from the plurality of paths, candidate paths including the event corresponding to the event-position pair;
        determining, for the identified candidate paths, attribution credit assigned to each event in the candidate paths;
        determining, from the attribution credit assigned to each event in the candidate paths, an aggregate of the attribution credits assigned to the event;
        aggregating, for each position along the path, the attribution credits assigned to events included in the candidate paths that are performed at the position; and
        determining the weighting for the identified event-position pair based on a ratio of the sum of the attribution credits assigned to events included in the candidate paths that are performed at the position to the aggregate of the attribution credits assigned to the event.

7. The method of claim 1, wherein providing, for display, the visual object includes providing, for display, the visual object including a plurality of items whose visual characteristics correspond to the weighting of the event-parameter pair to which the item corresponds.

8. A system of providing, for display, attribution data associated with a plurality of events, comprising:
a data processing system having an attribution data display module, the data processing system further comprising
a memory storing processor-executable instructions; and
a processor configured to execute the processor-executable instructions to:
identify a plurality of paths, each of the plurality of paths including a plurality of events, each event corresponding to one of a plurality of channels and to parameter data comprising a plurality of parameters, each channel corresponding one or more event types, each parameter comprising at least one of:
a position of the event within the path in which the event appears; or
a relative time of occurrence of the event with respect to a time of occurrence of another event within the path in which the event appears;
identify, from the plurality of paths, a first channel of the plurality of channels for which attribution credits are to be determined, the first channel corresponding to a first set of one or more event types;
identify, for the first channel, a first set of events from the plurality of events of the plurality of paths such that an event type of each event of the first set of events belongs to the first set of event types;
determine using an attribution model, for the first channel, an attribution credit assigned to each event of the first set of events;
calculate a total attribution credit for the first channel by adding the attribution credits assigned to the first set of events;
identify, from the plurality of paths, a plurality of event-parameter pairs associated with the first channel, each event-parameter pair corresponding to an event of the first set of events, and one of the one or more parameters associated with the event;
for each event-parameter pair,
determine a first event type of the event associated with the event-parameter pair and a parameter associated with the event;
identify a second set of events, each of the second set of events having the first event type and associated with the parameter;
determine an aggregate of the attribution credits assigned to each event within the second set of events
determine a weighting for the event-parameter pair of the first channel by calculating a ratio of the aggregate of the attribution credits to the total attribution credit, the weighting indicating a relative amount of attribution credits assigned to the event when the event occurs within the plurality of paths at the at least one of the position or the time of the parameter for the event-parameter pair; and
provide, for display, a visual object representing determined weightings for each event-parameter pair of the plurality of event-parameter pairs, the visual object including an indicator indicating the determined weighting for at least one of the plurality of the event-parameter pairs.

9. The system of claim 8, wherein to provide, for display, the visual object, the processor is further configured to providing, for display, the visual object including the total attribution credit for the first channel.

10. The system of claim 8, wherein the processor is further configured to:
identify, from the plurality of paths, candidate paths in which at least one event corresponds to the first channel; and
determine, for each of the candidate paths, an attribution credit assigned to each event of the path based on counterfactual gains.

11. The system of claim 8, wherein each event-parameter pair includes an event-position pair that corresponds to a position along the path at which the event was performed.

12. The system of claim 11, wherein to provide for display, the visual object, the processor is further configured to provide, for display, a visual matrix including a plurality of cells corresponding to intersecting rows and columns, wherein each row of cells includes the determined weighting for a particular position corresponding to a particular channel to which the row corresponds and a total number of attribution credits assigned to the particular channel.

13. The system of claim 11, wherein the processor is further configured to:
for each event-position pair:
identify, from the plurality of paths, candidate paths including the event corresponding to the event-position pair;
determine, for the identified candidate paths, attribution credit assigned to each event in the candidate paths;
determine, from the attribution credit assigned to each event in the candidate paths, an aggregate of the attribution credits assigned to the event;
aggregate, for each position along the path, the attribution credits assigned to events included in the candidate paths that are performed at the position; and
determine the weighting for the identified event-position pair based on a ratio of the sum of the attribution credits assigned to events included in the candidate paths that are performed at the position to the aggregate of the attribution credits assigned to the event.

14. The system of claim 8, wherein to provide, for display, the visual object, the processor is further configured to provide, for display, the visual object including a plurality of items whose visual characteristics correspond to the weighting of the event-parameter pair to which the item corresponds.

15. A non-transitory computer-readable storage medium having instructions to provide information via a computer network, the instructions comprising instructions to:
identify a plurality of paths, each of the plurality of paths including a plurality of events, each event corresponding to at least one of a plurality of channels and to parameter data comprising a plurality of parameters, each channel corresponding one or more event types, each parameter comprising at least one of:
a position identifying a position along a path at which the event was performed; or
a relative time of occurrence of the event with respect to a time of occurrence of another event within the path in which the event appears;
identify, from the plurality of paths, a first channel of the plurality of channels for which attribution credits are to be determined, the first channel corresponding to a first set of one or more event types;

identify, for the first channel, a first set of events from the plurality of events of the plurality of paths such that an event type of each event of the first set of events belongs to the first set of event types;

determine using an attribution model, for the first channel, an attribution credit assigned to each event of the first set of events;

calculate a total attribution credit for the first channel by adding the attribution credits assigned to the first set of events;

identify, from the plurality of paths, a plurality of event parameter pairs associated with the first channel, each event parameter pair corresponding to an event of the first set of events, and one of the parameters associated with the event;

for each event-parameter pair,
- determine a first event type of the event associated with the event-parameter pair and a parameter associated with the event;
- identify a second set of events, each of the second set of events having the first event type and associated with the parameter;
- determine an aggregate of the attribution credits assigned to each event within the second set of events
- determine a weighting for the event parameter pair of the first channel by calculating a ratio of the aggregate of the attribution credits to the total attribution credit, the weighting indicating a relative amount of attribution credits assigned to the event when the event occurs within the plurality of paths at the at least one of the position or the time of the parameter for the event-parameter pair; and provide, for display, a visual object representing determined weightings for each event-parameter pair of the plurality of event-parameter pairs, the visual object including an indicator indicating the determined weighting for at least one of the plurality of the event parameter pairs.

16. The non-transitory computer-readable storage medium of claim 15, wherein providing, for display, the visual object includes providing, for display, the visual object including the total attribution credit for the first channel.

17. The non-transitory computer-readable storage medium of claim 15, wherein providing for display, the visual object includes providing, for display, a visual matrix including a plurality of cells corresponding to intersecting rows and columns, wherein each row of cells includes the determined weighting for a particular position corresponding to a particular channel to which the row corresponds and a total number of attribution credits assigned to the particular channel.

18. The non-transitory computer-readable storage medium of claim 15, wherein the instructions comprises instructions to:
identify, from the plurality of paths, candidate paths in which at least one event corresponds to the channel; and
determine, for each of the candidate paths, an attribution credit assigned to each event of the path based on counterfactual gains.

19. The non-transitory computer-readable storage medium of claim 15, wherein each event-parameter pair includes an event-position pair that corresponds to a position along the path at which the event was performed.

20. The non-transitory computer-readable storage medium of claim 19, wherein the instructions comprises instructions to:
identify, from the plurality of paths, candidate paths including the event corresponding to the event-position pair;
determine, for the identified candidate paths, attribution credit assigned to each event in the candidate paths;
determine, from the attribution credit assigned to each event in the candidate paths, an aggregate of the attribution credits assigned to the event;
aggregate, for each position along the path, the attribution credits assigned to events included in the candidate paths that are performed at the position; and
determine the weighting for the identified event-position pair based on a ratio of the sum of the attribution credits assigned to events included in the candidate paths that are performed at the position to the aggregate of the attribution credits assigned to the event.

* * * * *